United States Patent
Shimizu et al.

(10) Patent No.: US 6,781,143 B2
(45) Date of Patent: Aug. 24, 2004

(54) BIOCHEMICAL ANALYSIS DATA PRODUCING METHOD, BIOCHEMICAL ANALYSIS DATA PRODUCING APPARATUS AND STIMULABLE PHOSPHOR SHEET USED THEREFOR

(75) Inventors: Hitoshi Shimizu, Kanagawa (JP); Nobuhiko Ogura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 16 days.

(21) Appl. No.: 10/116,701

(22) Filed: Apr. 5, 2002

(65) Prior Publication Data

US 2002/0162980 A1 Nov. 7, 2002

(30) Foreign Application Priority Data

Apr. 6, 2001 (JP) .......................... 2001-108968
Jun. 25, 2001 (JP) .......................... 2001-191253

(51) Int. Cl.⁷ .......................... G03B 42/00; G01N 21/76
(52) U.S. Cl. .................... 250/583; 250/252.1; 250/582; 250/586; 250/486.1
(58) Field of Search .................. 250/583, 586, 250/582, 584, 585, 252.1, 486.1, 484.4

(56) References Cited

U.S. PATENT DOCUMENTS

| 5,028,793 | A | * | 7/1991 | Lindmayer et al. ...... 250/484.4 |
| 5,136,165 | A | * | 8/1992 | Lumma ................... 250/361 R |
| 5,449,921 | A | * | 9/1995 | Baba .......................... 250/583 |
| 5,672,514 | A | * | 9/1997 | Tsuchiya et al. ............... 436/86 |
| 5,780,857 | A | * | 7/1998 | Harju et al. .............. 250/458.1 |
| 5,832,055 | A | * | 11/1998 | Dewaele ....................... 376/62 |
| 6,333,513 | B1 | * | 12/2001 | Iwabuchi ..................... 250/587 |
| 6,570,150 | B2 | * | 5/2003 | Tsujii ....................... 250/252.1 |

FOREIGN PATENT DOCUMENTS

GB        2246197 A   *   1/1992   .......... G01N/21/76

* cited by examiner

*Primary Examiner*—Albert Gagliardi
(74) *Attorney, Agent, or Firm*—Sughrue Mion, PLLC

(57) ABSTRACT

A biochemical analysis data producing method includes the steps of exposing stimulable phosphor layer regions formed in a stimulable phosphor sheet and spaced from each other using standard light, irradiating the stimulable phosphor layer regions with a stimulating ray, detecting stimulated emission to produce correction data for the individual stimulable phosphor layer regions, superposing the stimulable phosphor sheet on a biochemical analysis unit including spot-like regions formed in the same pattern as that of the stimulable phosphor layer regions and selectively containing a radioactive labeling substance, exposing the stimulable phosphor layer regions to the radioactive labeling substance, scanning the stimulable phosphor layer regions with a stimulating ray, detecting stimulated emission to produce biochemical analysis data, and correcting the biochemical analysis data using the correction data. According to this biochemical analysis data producing method, it is possible to produce biochemical analysis data having excellent quantitative characteristics.

26 Claims, 27 Drawing Sheets

BIOCHEMICAL ANALYSIS DATA PRODUCING METHOD, BIOCHEMICAL ANALYSIS DATA PRODUCING APPARATUS AND STIMULABLE PHOSPHOR SHEET USED THEREFOR

BACKGROUND OF THE INVENTION

The present invention relates to a biochemical analysis data producing method and apparatus and a stimulable phosphor sheet used therefor and, particularly, to a biochemical analysis data producing method and apparatus and a stimulable phosphor sheet used therefor, which can read radiation data or chemiluminescent data and produce biochemical analysis data having excellent quantitative characteristics with high resolution even in the case of forming at a high density on the surface of a carrier such as a membrane filter a plurality of spot-like regions containing specific binding substances which can specifically bind with a substance derived from a living organism and whose sequence, base length, composition and the like are known and selectively labeling the plurality of spot-like regions with a radioactive labeling substance, thereby recording radiation data therein or in the case of forming at a high density on the surface of a carrier such as a membrane filter a plurality of spot-like regions containing specific binding substanceswhich can specifically bind with a substance derived from a living organism and whose sequence, base length, composition and the like are known and selectively labeling the plurality of spot-like regions with a labeling substance which generates chemiluminescent emission when it contacts a chemiluminescent substrate, thereby recording chemiluminescent data therein.

DESCRIPTION OF THE PRIOR ART

An autoradiographic analyzing system using as a detecting material for detecting radiation a stimulable phosphor which can absorb, store and record the energy of radiation when it is irradiated with radiation and which, when it is then stimulated by an electromagnetic wave having a specified wavelength, can release stimulated emission whose light amount corresponds to the amount of radiation with which it was irradiated is known, which comprises the steps of introducing a radioactively labeled substance into an organism, using the organism or a part of the tissue of the organism as a specimen, superposing the specimen and a stimulable phosphor sheet formed with a stimulable phosphor layer for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Publication No. 1-60784, Japanese Patent Publication No. 1-60782, Japanese Patent Publication No. 4-3952 and the like).

There is further known chemiluminescence analysis system comprising the steps of employing, as a detecting material for light, a stimulable phosphor which can absorb and store the energy of light upon being irradiated therewith and release a stimulated emission whose amount is proportional to that of the received light upon being stimulated with an electromagnetic wave having a specific wavelength range, selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, storing and recording the chemiluminescent emission in the wavelength of visible light generated by the contact of the chemiluminescent substance and the labeling substance in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital signals, effecting data processing on the obtained digital signals, and reproducing data on displaying means such as a CRT or a recording material such as a photographic film (see for example, U.S. Pat. No. 5,028,793, UK Patant Application 2,246,197 A and the like).

Unlike the system using a photographic film, according to these systems using the stimulable phosphor as a detecting material, development, which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescence analyzing system using a fluorescent substance as a labeling substance instead of a radioactive labeling substance in the autoradiographic analyzing system is known. According to this system, it is possible to study a genetic sequence, study the expression level of a gene, and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed, or distributing a plurality of DNA fragments on a gel support containing a fluorescent dye, or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescent light, detecting the released fluorescent light to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can Abe easily detected without using a radioactive substance.

Similarly, there is known a chemiluminescence detecting system comprising the steps of fixing a substance derived from a living organism such as a protein or a nucleic acid sequence on a support, selectively labeling the substance derived from a living organism with a labeling substance which generates chemiluminescent emission when it contacts a chemiluminescent substrate, contacting the substance derived from a living organism and selectively labeled with the labeling substance and the chemiluminescent substrate, photoelectrically detecting the chemiluminescent emission in the wavelength of visible light generated by the contact of the chemiluminescent substrate and the labeling substance to produce digital image signals, effecting image processing thereon, and reproducing a chemiluminescent image on a display means such as a CRT or a recording material such as a photographic film, thereby obtaining information relating to the high molecular substance such as genetic information Further, a micro-array analyzing system has been recently developed, which comprises the steps of using a spotting device to drop at different positions on the surface of a carrier such as a slide glass plate, a membrane filter or the like specific binding substances, which can specifically bind with a substance derived from a living organism such as a cell, virus, hormone, tumor marker, enzyme, antibody, antigen, abzyme, other protein, a nuclear acid, cDNA, DNA, RNA or the like and whose sequence, base length, composition and the like are known, thereby forming a number of independent spots, specifically binding the specific binding substances using a hybridization method or the like with a substance derived from a living organism such as a cell, virus, hormone, tumor marker, enzyme, antibody, antigen, abzyme, other protein, a nuclear acid, cDNA, DNA or mRNA by extraction, isolation or the like and optionally further subjected to chemical processing, chemical modification or the like and which is labeled with a labeling substance such as a fluorescent substance, dye or the like, thereby forming a micro-array, irradiating the micro-array with a stimulating ray, photoelectrically detecting light such as fluorescence emission released from a labeling substance such as a fluorescent substance, dye or the like, and analyzing the substance derived from a living organism. This micro-array analyzing system is advantageous in that a substance derived from a living organism can be analyzed in a short time period by forming a number of spots of specific binding substances at different positions of the surface of a carrier such as a slide glass plate at high density and hybridizing them with a substance derived from a living organism and labeled with a labeling substance.

In addition, a macro-array analyzing system using a radioactive labeling substance as a labeling substance has been further developed, which comprises the steps of using a spotting device to drop at different positions on the surface of a carrier such as a membrane filter or the like specific binding substances, which can specifically bind with a substance derived from a living organism such as a cell, virus, hormone, tumor marker, enzyme, antibody, antigen, abzyme, other protein, a nuclear acid, cDNA, DNA, RNA or the like and whose sequence, base length, composition and the like are known, thereby forming a number of independent spots, specifically binding the specific binding substance using a hybridization method or the like with a substance derived from a living organism such as a cell, virus, hormone, tumor marker, enzyme, antibody, antigen, abzyme, other protein, a nuclear acid, cDNA, DNA or mRNA by extraction, isolation or the like and optionally further subjected to chemical processing, chemical modification or the like and which is labeled with a radioactive labeling substance, thereby forming a macro-array, superposing the macro-array and a stimulable phosphor sheet formed with a stimulable phosphor layer, exposing the stimulable phosphor layer to a radioactive labeling substance, irradiating the stimulable phosphor layer with a stimulating ray to excite the stimulable phosphor, photoelectrically detecting the stimulated emission released from the stimulable phosphor to produce biochemical analysis data, and analyzing the substance derived from a living organism.

However, in the macro-array analyzing system using a radioactive labeling substance as a labeling substance, when the stimulable phosphor layer is exposed to a radioactive labeling substance, since the radiation energy of the radioactive labeling substance contained in spot-like regions formed on the surface of a carrier such as a membrane filter is very large, electron beams ($\beta$ rays) released from the radioactive labeling substance contained in the individual spot-like regions are scattered in the carrier such as a membrane filter, thereby impinging on regions of the stimulable phosphor layer that should be exposed only to the radioactive labeling substance contained in neighboring spot-like regions, or electron beams released from the radioactive labeling substance adhering to the surface of the carrier such as a membrane filter between neighboring spot-like regions impinge on the stimulable phosphor layer, to generate noise in biochemical analysis data produced by photoelectrically detecting stimulated emission, thus making data of neighboring spot-like regions hard to separate and lowering resolution, and to lower the accuracy of biochemical analysis when a substance derived from a living organism is analyzed by quantifying the radiation amount of each spot. The degradation of the resolution and accuracy of biochemical analysis is particularly pronounced when spots are formed close to each other at high density.

Furthermore, in the field of biochemical analysis, it is often required to analyze a substance derived from a living organism by forming a plurality of spot-like regions containing specific binding substances at different positions on the surface of a carrier such as a membrane filter or the like, which can specifically bind with a substance derived from a living organism such as a cell, virus, hormone, tumor marker, enzyme, antibody, antigen, abzyme, other protein, a nuclear acid, cDNA, DNA, RNA or the like and whose sequence, base length, composition and the like are known, specifically binding, using a hybridization method or the like, the specific binding substances contained in the plurality of spot-like regions with a substance derived from a living organism labeled with a labeling substance which generates chemiluminescent emission when it contacts a chemiluminescent substrate, thereby selectively labeling the plurality of spot-like regions, causing the plurality of spot-like regions to come into contact with a chemiluminescent substrate, exposing a stimulable phosphor layer to chemiluminescent emission in the wavelength of visible light generated by the contact of the chemiluminescent substance and the labeling substance, thereby storing the energy of chemiluminescent emission in the stimulable phosphor layer, irradiating the stimulable phosphor layer with a stimulating ray, and photoelectrically detecting stimulated emission released from the stimulable phosphor layer, thereby effecting biochemical analysis. In this case, chemiluminescent emission released from any particular spot-like region is scattered in the carrier such as a membrane filter and mixed with chemiluminescent emission released from neighboring spot-like regions, thereby generating noise in biochemical analysis data produced by photoelectrically detecting chemiluminescent emission.

SUMMARY OF THE INVENTION

It is therefore an object of the present invention to provide a biochemical analysis data producing method and apparatus and a stimulable phosphor sheet used therefor, which can read radiation data or chemiluminescent data and produce biochemical analysis data having excellent quantitative characteristics with high resolution even in the case of forming at a high density on the surface of a carrier such as a membrane filter a plurality of spot-like regions containing specific binding substances which can specifically bind with a substance derived from a living organism and whose sequence, base length, composition and the like are known and selectively labeling the plurality of spot-like regions with a radioactive labeling substance, thereby recording radiation data therein or in the case of forming at a high density on the surface of a carrier such as a membrane filter a plurality of spot-like regions containing specific binding substanceswhich can specifically bind with a substance derived from a living organism and whose sequence, base length, composition and the like are known and selectively labeling the plurality of spot-like regions with a labeling substance which generates chemiluminescent emission when it contacts a chemiluminescent substrate, thereby recording chemiluminescent data therein.

The above other objects of the present invention can be accomplished by a biochemical analysis data producing method comprising the steps of irradiating a stimulable phosphor sheet including a support in which a plurality of stimulable phosphor layer regions are formed spaced apart from each other with light emitted from a standard light source or radiation emitted from a standard radiation source to expose the plurality of stimulable phosphor layer regions, irradiating the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions to produce correction data for the individual stimulable phosphor layer regions, superposing the stimulable phosphor sheet on a biochemical analysis unit including a plurality of spot-like regions formed in the same pattern as that of the plurality of stimulable phosphor layer regions of the stimulable phosphor sheet and selectively containing a radioactive labeling substance, exposing the plurality of stimulable phosphor layer regions to the radioactive labeling substance selectively contained in the plurality of spot-like regions, scanning the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions to produce biochemical analysis data, and correcting the thus produced biochemical analysis data using the correction data for the individual stimulable phosphor layer regions.

According to the present invention, since the plurality of stimulable phosphor layer regions of the stimulable phosphor sheet and the plurality of spot-like regions of the biochemical analysis unit are formed in the same pattern, even in the case where a plurality of spot-like regions selectively labeled with a radioactive labeling substance by specifically binding specific binding substances whose sequence, base length, composition and the like are known and a substance derived from a living organism are formed in a biochemical analysis unit at a high density, electron beams ($\beta$ rays) released from the radioactive labeling substance contained in the individual spot-like regions when the stimulable phosphor sheet is superposed on the biochemical analysis unit to expose the plurality of stimulable phosphor layer regions of the stimulable phosphor sheet to the radioactive labeling substance selectively contained in the plurality of spot-like regions of the biochemical analysis unit can be effectively prevented from entering stimulable phosphor layer regions other than that to be exposed to electron beams ($\beta$ rays) released from the radioactive labeling substance contained in the spot-like region and, therefore, it is possible to produce biochemical analysis data having an excellent quantitative characteristic with high resolution by scanning the plurality of the thus exposed stimulable phosphor layer regions with a stimulating ray and photoelectrically detecting stimulated emission released from the plurality of stimulable phosphor layer regions.

Further, in the case where a stimulable phosphor sheet is formed by forming a plurality of stimulable phosphor layer regions in a support, since it is difficult to form the plurality of stimulable phosphor layer regions so that each of them contains the same amount of stimulable phosphor, the amounts of radiation energy stored in the individual stimulable phosphor layer regions differ from each other even if the regions are exposed to the same radiation energy and, therefore, there is some risk of degradation of the quantitative characteristic of biochemical analysis data produced by exposing the plurality of stimulable phosphor layer regions of the stimulable phosphor sheet to electron beams ($\beta$ rays) released from the radioactive labeling substance contained in the plurality of spot-like regions of the biochemical analysis unit, scanning the plurality of the thus exposed stimulable phosphor layer regions with a stimulating ray and photoelectrically detecting stimulated emission released from the stimulable phosphor layer regions. In the present invention, however, correction data for correcting dispersion in signal intensity generated in biochemical analysis data caused by the difference in amounts of stimulable phosphor contained in the individual stimulable phosphor layer regions are produced for the individual stimulable phosphor layer regions by irradiating the plurality of stimulable phosphor layer regions of the stimulable phosphor sheet with light emitted from a standard light source or radiation emitted from a standard radiation source to expose the plurality of stimulable phosphor layer regions, irradiating the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions and biochemical analysis data are corrected using the correction data for each of the stimulable phosphor layer regions. The accuracy of quantitative analysis can therefore be markedly improved.

In a preferred aspect of the present invention, the standard light source is constituted by a light source selected from a group consisting of an ultra-violet ray source, a flash lamp and a stroboscopic lamp.

In another preferred aspect of the present invention, the standard radiation source is constituted by a radiation source selected from a group consisting of an X-ray source, a soft X-ray source and a β-ray source.

In a preferred aspect of the present invention, the support of the stimulable phosphor sheet is formed of material capable of attenuating radiation energy.

According to this preferred aspect of the present invention, since the support of the stimulable phosphor sheet is formed of material capable of attenuating radiation energy, when the plurality of stimulable phosphor layer regions of the stimulable phosphor sheet are exposed to light emitted from a standard light source or radiation emitted from a standard radiation source, it is possible to efficiently prevent light emitted from the standard light source or radiation emitted from the standard radiation source from scattering in the support of the stimulable phosphor sheet and entering the neighboring stimulable phosphor layer regions that should not be exposed and, therefore, correction data having an excellent quantitative characteristic can be produced.

In a preferred aspect of the present invention, the plurality of stimulable phosphor layer regions of the stimulable phosphor sheet are uniformly exposed to light emitted from a standard light source or radiation emitted from a standard radiation source.

In a preferred aspect of the present invention, the standard light source or the standard radiation source is constituted as a planar light source or a planar radiation source.

In another preferred aspect of the present invention, the standard light source or the standard radiation source is constituted as a linear light source or a linear radiation source and the plurality of stimulable phosphor layer regions of the stimulable phosphor sheet are linearly scanned with a line beam emitted from the standard light source or the standard radiation source, thereby exposing the plurality of stimulable phosphor layer regions.

In another preferred aspect of the present invention, the plurality of stimulable phosphor layer regions of the stimulable phosphor sheet are two-dimensionally scanned with light emitted from the standard light source or radiation emitted from the standard radiation source, thereby exposing the plurality of stimulable phosphor layer regions.

The above and other objects of the present invention can be also accomplished by a biochemical analysis data producing method comprising the steps of irradiating a stimulable phosphor sheet including a support in which a plurality of stimulable phosphor layer regions are formed spaced apart from each other with light emitted from a standard light source to expose the plurality of stimulable phosphor layer regions, irradiating the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions to produce correction data for the individual stimulable phosphor layer regions, superposing the stimulable phosphor sheet on a biochemical analysis unit including a plurality of spot-like regions formed in the same pattern as that of the plurality of stimulable phosphor layer regions of the stimulable phosphor sheet and selectively releasing chemiluminescent emission, exposing the plurality of stimulable phosphor layer regions to the chemiluminescent emission selectively released from the plurality of spot-like regions, scanning the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions to produce biochemical analysis data, and correcting the thus produced biochemical analysis data using the correction data for the individual stimulable phosphor layer regions.

According to the present invention, since the plurality of stimulable phosphor layer regions of the stimulable phosphor sheet and the plurality of spot-like regions of the biochemical analysis unit are formed in the same pattern, even in the case where a plurality of spot-like regions selectively labeled with a labeling substance which generates chemiluminescent emission when it contacts a chemiluminescent substrate are formed in a biochemical analysis unit at a high density, chemiluminescent emission in the wavelength of visible light released from the individual spot-like regions of a biochemical analysis unit when the stimulable phosphor sheet is superposed on the biochemical analysis unit formed with the plurality of spot-like regions releasing chemiluminescent emission generated by the contact of the chemiluminescent substance and the labeling substance to expose the plurality of stimulable phosphor layer regions of the stimulable phosphor sheet to the chemiluminescent emission can be effectively prevented from entering stimulable phosphor layer regions other than that to be exposed to chemiluminescent emission released from the spot-like region and, therefore, it is possible to produce biochemical analysis data having an excellent quantitative characteristic with high resolution by scanning the plurality of the thus exposed stimulable phosphor layer regions with a stimulating ray and photoelectrically detecting stimulated emission released from the plurality of stimulable phosphor layer regions.

Further, in the case where a stimulable phosphor sheet is formed by forming a plurality of stimulable phosphor layer regions in a support, since it is difficult to form the plurality of stimulable phosphor layer regions so that each of them contains the same amount of stimulable phosphor, the amounts of light energy stored in the individual stimulable phosphor layer regions differ from each other even if the regions are exposed to the same energy of chemiluminescent emission and, therefore, there is some risk of degradation of the quantitative characteristic of biochemical analysis data produced by exposing the plurality of stimulable phosphor layer regions of the stimulable phosphor sheet to chemiluminescent emission released from the plurality of spot-like regions of the biochemical analysis unit, scanning the plurality of the thus exposed stimulable phosphor layer regions with a stimulating ray and photoelectrically detecting stimulated emission released from the stimulable phosphor layer regions. In the present invention, however, correction data for correcting dispersion in signal intensity generated in biochemical analysis data caused by the difference in amounts of stimulable phosphor contained in the individual stimulable phosphor layer regions are produced for the individual stimulable phosphor layer regions by irradiating the plurality of stimulable phosphor layer regions of the stimulable phosphor sheet with light emitted from a standard light source to expose the plurality of stimulable phosphor layer regions, irradiating the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions and biochemical analysis data are corrected using the correction data for each of the stimulable phosphor layer regions. The accuracy of quantitative analysis can therefore be markedly improved.

In a preferred aspect of the present invention, the standard light source is constituted by a light source selected from a group consisting of an ultra-violet ray source, a flash lamp and a stroboscopic lamp.

In a preferred aspect of the present invention, the support of the stimulable phosphor sheet is formed of material capable of attenuating light energy.

According to this preferred aspect of the present invention, since the support of the stimulable phosphor sheet is formed of material capable of attenuating light energy, when the plurality of stimulable phosphor layer regions of the stimulable phosphor sheet are exposed to light emitted from a standard light source, it is possible to efficiently prevent light emitted from the standard light source from scattering in the support of the stimulable phosphor sheet and entering the neighboring stimulable phosphor layer regions that should not be exposed and, therefore, correction data having an excellent quantitative characteristic can be produced.

In a preferred aspect of the present invention, the plurality of stimulable phosphor layer regions of the stimulable phosphor sheet are uniformly exposed to light emitted from a standard light source.

In a preferred aspect of the present invention, the standard light source is constituted as a planar light source.

In another preferred aspect of the present invention, the standard light source is constituted as a linear light source and the plurality of stimulable phosphor layer regions of the stimulable phosphor sheet are linearly scanned with a line beam emitted from the standard light source, thereby exposing the plurality of stimulable phosphor layer regions.

In another preferred aspect of the present invention, the plurality of stimulable phosphor layer regions of the stimulable phosphor sheet are two-dimensionally scanned with light emitted from the standard light source, thereby exposing the plurality of stimulable phosphor layer regions.

In a preferred aspect of the present invention, the correction data for the individual stimulable phosphor layer regions are stored in a biochemical analysis data producing apparatus and biochemical analysis data are corrected by the biochemical analysis data producing apparatus.

In another preferred aspect of the present invention, the correction data for the individual stimulable phosphor layer regions are stored in a recording medium and the correction data for the individual stimulable phosphor layer regions are read from the recording medium by the biochemical analysis data producing apparatus, whereby biochemical analysis data are corrected.

In a further preferred aspect of the present invention, the correction data for the individual stimulable phosphor layer regions are stored in a CDROM or a floppy disk.

In a preferred aspect of the present invention, the plurality of stimulable phosphor layer regions of the stimulable phosphor sheet are formed by charging stimulable phosphor in holes formed in the support.

In a further preferred aspect of the present invention, the plurality of stimulable phosphor layer regions of the stimulable phosphor sheet are formed by embedding stimulable phosphor in holes formed in the support.

In another preferred aspect of the present invention, the plurality of stimulable phosphor layer regions of the stimulable phosphor sheet are formed by embedding stimulable phosphor in recesses formed in the support.

In a further preferred aspect of the present invention, the plurality of stimulable phosphor layer regions of the stimulable phosphor sheet are formed by embedding stimulable phosphor in through-holes formed in the support.

In another preferred aspect of the present invention, the plurality of stimulable phosphor layer regions of the stimulable phosphor sheet are formed by pressing a stimulable phosphor membrane containing stimulable phosphor in through-holes formed in the support.

In another preferred aspect of the present invention, the plurality of stimulable phosphor layer regions of the stimulable phosphor sheet are formed on the support.

In another preferred aspect of the present invention, the support of the stimulable phosphor sheet is formed with 10 or more stimulable phosphor layer regions.

In a further preferred aspect of the present invention, the support of the stimulable phosphor sheet is formed with 50 or more stimulable phosphor layer regions.

In a further preferred aspect of the present invention, the support of the stimulable phosphor sheet is formed with 100 or more stimulable phosphor layer regions.

In a further preferred aspect of the present invention, the support of the stimulable phosphor sheet is formed with 500 or more stimulable phosphor layer regions.

In a further preferred aspect of the present invention, the support of the stimulable phosphor sheet is formed with 1,000 or more stimulable phosphor layer regions.

In a further preferred aspect of the present invention, the support of the stimulable phosphor sheet is formed with 5,000 or more stimulable phosphor layer regions.

In a further preferred aspect of the present invention, the support of the stimulable phosphor sheet is formed with 10,000 or more stimulable phosphor layer regions.

In a further preferred aspect of the present invention, the support of the stimulable phosphor sheet is formed with 50,000 or more stimulable phosphor layer regions.

In a further preferred aspect of the present invention, the support of the stimulable phosphor sheet is formed with 10,0000 or more stimulable phosphor layer regions.

In a preferred aspect of the present invention, each of the plurality of stimulable phosphor layer regions is formed in the support of the stimulable phosphor sheet to have a size of less than 5 mm$^2$.

In a further preferred aspect of the present invention, each of the plurality of stimulable phosphor layer regions is formed in the support of the stimulable phosphor sheet to have a size of less than 1 mm$^2$.

In a further preferred aspect of the present invention, each of the plurality of stimulable phosphor layer regions is formed in the support of the stimulable phosphor sheet to have a size of less than 0.5 mm$^2$.

In a further preferred aspect of the present invention, each of the plurality of stimulable phosphor layer regions is formed in the support of the stimulable phosphor sheet to have a size of less than 0.1 mm$^2$.

In a further preferred aspect of the present invention, each of the plurality of stimulable phosphor layer regions is formed in the support of the stimulable phosphor sheet to have a size of less than 0.05 mm$^2$.

In a further preferred aspect of the present invention, each of the plurality of stimulable phosphor layer regions is formed in the support of the stimulable phosphor sheet to have a size of less than 0.01 mm$^2$.

In the present invention, the density of the stimulable phosphor layer regions formed in the stimulable phosphor sheet can be determined based upon the material of the support, the kind of electron beam released from the radioactive labeling substance and the like.

In a preferred aspect of the present invention, the plurality of stimulable phosphor layer regions are formed in the stimulable phosphor sheet at a density of 10 or more per $cm^2$.

In a further preferred aspect of the present invention, the plurality of stimulable phosphor layer regions are formed in the stimulable phosphor sheet at a density of 50 or more per $cm^2$.

In a further preferred aspect of the present invention, the plurality of stimulable phosphor layer regions are formed in the stimulable phosphor sheet at a density of 100 or more per $cm^2$.

In a further preferred aspect of the present invention, the plurality of stimulable phosphor layer regions are formed in the stimulable phosphor sheet at a density of 500 or more per $cm^2$.

In a further preferred aspect of the present invention, the plurality of stimulable phosphor layer regions are formed in the stimulable phosphor sheet at a density of 1,000 or more per $cm^2$.

In a further preferred aspect of the present invention, the plurality of stimulable phosphor layer regions are formed in the stimulable phosphor sheet at a density of 5,000 or more per $cm^2$.

In a further preferred aspect of the present invention, the plurality of stimulable phosphor layer regions are formed in the stimulable phosphor sheet at a density of 10,000 or more per $cm^2$.

In a preferred aspect of the present invention, the plurality of stimulable phosphor layer regions are formed according to a regular pattern in the stimulable phosphor sheet.

In a preferred aspect of the present invention, the support of the stimulable phosphor sheet is made of material that reduces the energy of radiation to $1/5$ or less when the radiation travels in the support by a distance equal to that between neighboring stimulable phosphor layer regions.

In a further preferred aspect of the present invention, the support of the stimulable phosphor sheet is made of material that reduces the energy of radiation to $1/10$ or less when the radiation travels in the support by a distance equal to that between neighboring stimulable phosphor layer regions.

In a further preferred aspect of the present invention, the support of the stimulable phosphor sheet is made of material that reduces the energy of radiation to $1/50$ or less when the radiation travels in the support by a distance equal to that between neighboring stimulable phosphor layer regions.

In a further preferred aspect of the present invention, the support of the stimulable phosphor sheet is made of material that reduces the energy of radiation to $1/100$ or less when the radiation travels in the support by a distance equal to that between neighboring stimulable phosphor layer regions.

In a further preferred aspect of the present invention, the support of the stimulable phosphor sheet is made of material that reduces the energy of radiation to $1/500$ or less when the radiation travels in the support by a distance equal to that between neighboring stimulable phosphor layer regions.

In a further preferred aspect of the present invention, the support of the stimulable phosphor sheet is made of material that reduces the energy of radiation to $1/1000$ or less when the radiation travels in the support by a distance equal to that between neighboring stimulable phosphor layer regions.

In a preferred aspect of the present invention, the support of the stimulable phosphor sheet is made of material that reduces the energy of light to $1/5$ or less when the light travels in the support by a distance equal to that between neighboring stimulable phosphor layer regions.

In a further preferred aspect of the present invention, the support of the stimulable phosphor sheet is made of material that reduces the energy of light to $1/10$ or less when the light travels in the support by a distance equal to that between neighboring stimulable phosphor layer regions.

In a further preferred aspect of the present invention, the support of the stimulable phosphor sheet is made of material that reduces the energy of light to $1/50$ or less when the light travels in the support by a distance equal to that between neighboring stimulable phosphor layer regions.

In a further preferred aspect of the present invention, the support of the stimulable phosphor sheet is made of material that reduces the energy of light to $1/100$ or less when the light travels in the support by a distance equal to that between neighboring stimulable phosphor layer regions.

In a further preferred aspect of the present invention, the support of the stimulable phosphor sheet is made of material that reduces the energy of light to $1/500$ or less when the light travels in the support by a distance equal to that between neighboring stimulable phosphor layer regions.

In a further preferred aspect of the present invention, the support of the stimulable phosphor sheet is made of material that reduces the energy of light to $1/1000$ or less when the light travels in the support by a distance equal to that between neighboring stimulable phosphor layer regions.

In the present invention, the material for forming the support of the stimulable phosphor is preferably capable of attenuating radiation energy and/or light energy but is not particularly limited. The material for forming the support of the stimulable phosphor may be any type of inorganic compound material or organic compound material and the support of the stimulable phosphor sheet can preferably be formed of metal material, ceramic material or plastic material.

Illustrative examples of inorganic compound materials preferably usable for forming the support of the stimulable phosphor sheet and capable of attenuating radiation energy and/or light energy in the present invention include metals such as gold, silver, copper, zinc, aluminum, titanium, tantalum, chromium, iron, nickel, cobalt, lead, tin, selenium and the like; alloys such as brass, stainless steel, bronze and the like; silicon materials such as silicon, amorphous silicon, glass, quartz, silicon carbide, silicon nitride and the like; metal oxides such as aluminum oxide, magnesium oxide, zirconium oxide and the like; and inorganic salts such as tungsten carbide, calcium carbide, calcium sulfate, hydroxy apatite, gallium arsenide and the like. These may have either a monocrystal structure or a polycrystal sintered structure such as amorphous, ceramic or the like.

In the present invention, a high molecular compound can preferably be used as an organic compound material preferably usable for forming the support of the stimulable phosphor sheet and capable of attenuating radiation energy and/or light energy. Illustrative examples of high molecular compounds preferably usable for forming the support of the stimulable, phosphor sheet in the present invention include polyolefins such as polyethylene, polypropylene and the like; acrylic resins such as polymethyl methacrylate, polybutylacrylate/polymethyl methacrylate copolymer and the like; polyacrylonitrile; polyvinyl chloride; polyvinylidene chloride; polyvinylidene fluoride; polytetrafluoroethylene; polychlorotrifuluoroethylene; polycarbonate; polyesters such as polyethylene naphthalate, polyethylene terephthalate and the like; nylons such as nylon-6, nylon-6,6, nylon-4,10 and the like; polyimide; polysulfone; polyphenylene sulfide; silicon resins such as polydiphenyl siloxane and the like; phenol resins such as novolac and the like; epoxy resin; polyurethane; polystyrene, butadienestyrene copolymer; polysaccharides such as cellulose, acetyl cellulose, nitrocellulose, starch, calcium alginate, hydroxypropyl methyl cellulose and the like; chitin; chitosan; urushi (Japanese lacquer); polyamides such as gelatin, collagen, keratin and the like; and copolymers of these high molecular materials. These may be a composite compound, and metal oxide particles, glass fiber or the like may be added thereto as occasion demands. Further, an organic compound material may be blended therewith.

Since the capability of attenuating radiation energy generally increases as specific gravity increases, the support of the stimulable phosphor sheet is preferably formed of a compound material or a composite material having specific gravity of $1.0$ $g/cm^3$ or more and more preferably formed of a compound material or a composite material having specific gravity of $1.5$ $g/cm^3$ to $23$ $g/cm^3$.

Since the capability of attenuating light energy generally increases as scattering and/or absorption of light increases, the support of the stimulable phosphor sheet preferably has absorbance of 0.3 per cm (thickness) or more and more preferably has absorbance of 1 per cm (thickness) or more. The absorbance can be determined by placing an integrating sphere immediately behind a plate-like member having a thickness of T cm, measuring an amount A of transmitted light at a wavelength of probe light or emission light used for measurement by a spectrophotometer, and calculating $A/T$. In the present invention, a light scattering substance or a light absorbing substance may be added to the support of the stimulable phosphor sheet in order to improve the capability of attenuating light energy. Particles of a material different from a material forming the support of the stimulable phosphor sheet may be preferably used as a light scattering substance and a pigment or dye may be preferably used as a light absorbing substance.

In a further preferred aspect of the present invention, the support of the stimulable phosphor sheet is formed of plastic material in which metal particles are dispersed.

In a further preferred aspect of the present invention, the biochemical analysis unit includes a substrate made of material capable of attenuating radiation energy and a plurality of absorptive regions formed spaced apart from each other in the substrate and constituting the plurality of spot-like regions and the plurality of absorptive regions are formed in the substrate in the same pattern as that of the plurality of stimulable phosphor layer regions of the stimulable phosphor sheet.

According to this preferred aspect of the present invention, since the biochemical analysis unit includes the substrate made of material capable of attenuating radiation energy and a plurality of absorptive regions formed spaced apart from each other in the substrate and constituting the plurality of spot-like regions and the plurality of absorptive regions are formed in the substrate in the same pattern as that of the plurality of stimulable phosphor layer regions of the stimulable phosphor sheet, it is possible to effectively prevent electron beams ($\beta$ rays) released from the radioactive labeling substance contained in each of the absorptive regions from scattering in the substrate of the biochemical analysis unit and to effectively prevent noise caused by the scattering of electron beams ($\beta$ rays) from being generated in biochemical analysis data.

In a further preferred aspect of the present invention, the biochemical analysis unit includes a substrate made of material capable of attenuating light energy and a plurality of absorptive regions formed spaced apart from each other in the substrate and constituting the plurality of spot-like regions and the plurality of absorptive regions are formed in the substrate in the same pattern as that of the plurality of stimulable phosphor layer regions of the stimulable phosphor sheet.

According to this preferred aspect of the present invention, since the biochemical analysis unit includes the substrate made of material capable of attenuating light energy and a plurality of absorptive regions formed spaced apart from each other in the substrate and constituting the plurality of spot-like regions and the plurality of absorptive regions are formed in the substrate in the same pattern as that of the plurality of stimulable phosphor layer regions of the stimulable phosphor sheet, it is possible to effectively prevent chemiluminescent emission released from each of the absorptive regions from scattering in the substrate of the biochemical analysis unit and to effectively prevent noise caused by the scattering of chemiluminescent emission from being generated in biochemical analysis data.

In a preferred aspect of the present invention, the plurality of absorptive regions of the biochemical analysis unit are formed by charging absorptive material in a plurality holes formed in the substrate.

In a further preferred aspect of the present invention, the plurality of absorptive regions of the biochemical analysis unit are formed by embedding absorptive material in the plurality holes formed in the substrate.

In a further preferred aspect of the present invention, the plurality of absorptive regions of the biochemical analysis unit are formed by embedding absorptive material in a plurality through-holes formed in the substrate.

In another preferred aspect of the present invention, the plurality of absorptive regions of the biochemical analysis unit are formed by pressing an absorptive membrane containing absorptive material in a plurality through-holes formed in the substrate.

According to this preferred aspect of the present invention, since the plurality of absorptive regions of the biochemical analysis unit are formed by pressing an absorptive membrane containing absorptive material in a plurality through-holes formed in the substrate, the biochemical analysis unit can be easily manufactured.

In a further preferred aspect of the present invention, the plurality of absorptive regions of the biochemical analysis unit are formed by embedding absorptive material in a plurality recesses formed in the substrate.

In a preferred aspect of the present invention, the substrate of the biochemical analysis unit is made of material having a property of reducing the energy of radiation to $\frac{1}{5}$ or less when the radiation travels in the substrate by a distance equal to that between neighboring absorptive regions.

In a further preferred aspect of the present invention, the substrate of the biochemical analysis unit is made of material having a property of reducing the energy of radiation to $\frac{1}{10}$ or less when the radiation travels in the substrate by a distance equal to that between neighboring absorptive regions.

In a further preferred aspect of the present invention, the substrate of the biochemical analysis unit is made of material having a property of reducing the energy of radiation to $\frac{1}{50}$ or less when the radiation travels in the substrate by a distance equal to that between neighboring absorptive regions.

In a further preferred aspect of the present invention, the substrate of the biochemical analysis unit is made of material having a property of reducing the energy of radiation to $1/100$ or less when the radiation travels in the substrate by a distance equal to that between neighboring absorptive regions.

In a further preferred aspect of the present invention, the substrate of the biochemical analysis unit is made of material having a property of reducing the energy of radiation to $1/500$ or less when the radiation travels in the substrate by a distance equal to that between neighboring absorptive regions.

In a further preferred aspect of the present invention, the substrate of the biochemical analysis unit is made of material having a property of reducing the energy of radiation to $1/1000$ or less when the radiation travels in the substrate by a distance equal to that between neighboring absorptive regions.

In a preferred aspect of the present invention, the substrate of the biochemical analysis unit is made of material having a property of reducing the energy of light to $1/5$ or less when the light travels in the substrate by a distance equal to that between neighboring absorptive regions.

In a further preferred aspect of the present invention, the substrate of the biochemical analysis unit is made of material having a property of reducing the energy of light to $1/10$ or less when the light travels in the substrate by a distance equal to that between neighboring absorptive regions.

In a further preferred aspect of the present invention, the substrate of the biochemical analysis unit is made of material having a property of reducing the energy of light to $1/50$ or less when the light travels in the substrate by a distance equal to that between neighboring absorptive regions.

In a further preferred aspect of the present invention, the substrate of the biochemical analysis unit is made of material having a property of reducing the energy of light to $1/100$ or less when the light travels in the substrate by a distance equal to that between neighboring absorptive regions.

In a further preferred aspect of the present invention, the substrate of the biochemical analysis unit is made of material having a property of reducing the energy of light to $1/500$ or less when the light travels in the substrate by a distance equal to that between neighboring absorptive regions.

In a further preferred aspect of the present invention, the substrate of the biochemical analysis unit is made of material having a property of reducing the energy of light to $1/1000$ or less when the light travels in the substrate by a distance equal to that between neighboring absorptive regions.

In the present invention, the material for forming the substrate of the biochemical analysis unit is not particularly limited but may be any type of inorganic compound material or organic compound material insofar as it can attenuate radiation energy and/or light energy. The substrate of the biochemical analysis unit can preferably be formed of metal material, ceramic material or plastic material.

Illustrative examples of inorganic compound materials preferably usable for forming the substrate of the biochemical analysis unit and capable of attenuating radiation energy and/or light energy in the present invention include metals such as gold, silver, copper, zinc, aluminum, titanium, tantalum, chromium, iron, nickel, cobalt, lead, tin, selenium and the like; alloys such as brass, stainless steel, bronze and the like; silicon materials such as silicon, amorphous silicon, glass, quartz, silicon carbide, silicon nitride and the like; metal oxides such as aluminum oxide, magnesium oxide, zirconium oxide and the like; and inorganic salts such as tungsten carbide, calcium carbide, calcium sulfate, hydroxy apatite, gallium arsenide and the like. These may have either a monocrystal structure or a polycrystal sintered structure such as amorphous, ceramic or the like.

In the present invention, a high molecular compound is preferably used as an organic compound material preferably usable for forming the substrate of the biochemical analysis unit and capable of attenuating radiation energy and/or light energy. Illustrative examples of high molecular compounds preferably usable for forming the substrate of the biochemical analysis unit in the present invention include polyolefins such as polyethylene, polypropylene and the like; acrylic resins such as polymethyl methacrylate, polybutylacrylate/polymethyl methacrylate copolymer and the like; polyacrylonitrile; polyvinyl chloride; polyvinylidene chloride; polyvinylidene fluoride; polytetrafluoroethylene; polychlorotrifuluoroethylene; polycarbonate; polyesters such as polyethylene naphthalate, polyethylene terephthalate and the like; nylons such as nylon-6, nylon-6,6, nylon-4,10 and the like; polyimide; polysulfone; polyphenylene sulfide; silicon resins such as polydiphenyl siloxane and the like; phenol resins such as novolac and the like; epoxy resin; polyurethane; polystyrene, butadienestyrene copolymer; polysaccharides such as cellulose, acetyl cellulose, nitrocellulose, starch, calcium alginate, hydroxypropyl methyl cellulose and the like; chitin; chitosan; urushi (Japanese lacquer); polyamides such as gelatin, collagen, keratin and the like; and copolymers of these high molecular materials. These may be a composite compound, and metal oxide particles, glass fiber or the like may be added thereto as occasion demands. Further, an organic compound material may be blended therewith.

Since the capability of attenuating radiation energy generally increases as specific gravity increases, the substrate of the biochemical analysis unit is preferably formed of a compound material or a composite material having specific gravity of 1.0 g/cm$^3$ or more and more preferably formed of a compound material or a composite material having specific gravity of 1.5 g/cm$^3$ to 23 g/cm$^3$.

Since the capability of attenuating light energy generally increases as scattering and/or absorption of light increases, in the case where the substrate of the biochemical analysis unit is made of a material capable of attenuating light energy, the substrate of the biochemical analysis unit preferably has absorbance of 0.3 per cm (thickness) or more and more preferably has absorbance of 1 per cm (thickness) or more. The absorbance can be determined by placing an integrating sphere immediately behind a plate-like member having a thickness of T cm, measuring an amount A of transmitted light at a wavelength of probe light or emission light used for measurement by a spectrophotometer, and calculating A/T. In the present invention, a light scattering substance or a light absorbing substance may be added to the substrate of the biochemical analysis unit in order to improve the capability of attenuating light energy. Particles of a material different from a material forming the substrate of the biochemical analysis unit may be preferably used as a light scattering substance and a pigment or dye may be preferably used as a light absorbing substance.

In a further preferred aspect of the present invention, the substrate the biochemical analysis unit is formed of plastic material in which metal particles are dispersed.

In the present invention, a porous material or a fiber material may be preferably used as the absorptive material for forming the absorptive regions of the biochemical analysis unit. The absorptive substrate may be formed by combining a porous material and a fiber material.

In the present invention, a porous material for forming the absorptive regions of the biochemical analysis unit may be any type of an organic material or an inorganic material and may be an organic/inorganic composite material.

In the present invention, an organic porous material used for forming the absorptive regions of the biochemical analysis unit is not particularly limited but a carbon porous material such as an activated carbon or a porous material capable of forming a membrane filter is preferably used. Illustrative examples of porous materials capable of forming a membrane filter include nylons such as nylon-6, nylon-6,6, nylon-4,10; cellulose derivatives such as nitrocellulose, acetyl cellulose, butyric-acetyl cellulose; collagen; alginic acids such as alginic acid, calcium alginate, alginic acid/poly-L-lysine polyionic complex; polyolefins such as polyethylene, polypropylene; polyvinyl chloride; polyvinylidene chloride; polyfluoride such as polyvinylidene fluoride, polytetrafluoride; and copolymers or composite materials thereof.

In the present invention, an inorganic porous material used for forming the absorptive regions of the biochemical analysis unit is not particularly limited. Illustrative examples of inorganic porous materials preferably usable in the present invention include metals such as platinum, gold, iron, silver, nickel, aluminum and the like; metal oxides such as alumina, silica, titania, zeolite and the like; metal salts such as hydroxy apatite, calcium sulfate and the like; and composite materials thereof.

In the present invention, a fiber material used for forming the absorptive regions of the biochemical analysis unit is not particularly limited. Illustrative examples of fiber materials preferably usable in the present invention include nylons such as nylon-6, nylon-6,6, nylon-4,10; and cellulose derivatives such as nitrocellulose, acetyl cellulose, butyric-acetyl cellulose.

In the present invention, the absorptive region may be formed using an oxidization process such as an electrolytic process, a plasma process, an arc discharge process or the like; a primer process using a silane coupling agent, titanium coupling agent or the like; and a surface-active agent process or the like.

In a preferred aspect of the present invention, the plurality of spot-like regions of the biochemical analysis unit are selectively labeled with a radioactive labeling substance by spotting specific binding substances whose sequence, base length, composition and the like are known therein and specifically binding a substance derived from an living organism labeled with the radioactive labeling substance with the specific binding substances.

In another preferred aspect of the present invention, the plurality of spot-like regions of the biochemical analysis unit are selectively labeled with a labeling substance which generates chemiluminescent emission when it contacts a chemiluminescent substrate In the present invention, the case where a plurality of absorptive regions are selectively labeled with a labeling substance which generates chemiluminescent emission when it contacts a chemiluminescent substrate as termed herein includes the case where a plurality of absorptive regions are selectively labeled with a labeling substance which generates chemiluminescent emission when it contacts a chemiluminescent substrate by selectively binding a substance derived from a living organism and labeled with a labeling substance which generates chemiluminescent emission when it contacts a chemiluminescent substrate and the case where a plurality of absorptive regions are selectively labeled with a labeling substance which generates chemiluminescent emission when it contacts a chemiluminescent substrate by selectively binding a substance derived from a living organism and labeled with a hapten, and binding an antibody for the hapten labeled with an enzyme which generates chemiluminescent emission when it contacts a chemiluminescent substrate with the hapten by an antigen-antibody reaction.

In the present invention, illustrative examples of the combination of hapten and antibody include digoxigenin and anti-digoxigenin antibody, theophylline and anti-theophylline antibody, fluorosein and anti-fluorosein antibody, and the like. Further, the combination of biotin and avidin, antigen and antibody may be utilized instead of the combination of hapten and antibody.

In a preferred aspect of the present invention, the substance derived from a living organism is specifically bound with specific binding substances by a reaction selected from a group consisting of hybridization, antigen-antibody reaction and receptor-ligand reaction.

The above and other objects of the present invention can be also accomplished by a biochemical analysis data producing apparatus comprising a stimulating ray source for emitting a stimulating ray, a sample stage on which a stimulable phosphor sheet including a plurality of stimulable phosphor layer regions formed spaced apart from each other and selectively storing radiation energy is to be placed, a light detector for photoelectrically detecting stimulated emission released from the plurality of stimulable phosphor layer regions of the stimulable phosphor sheet stimulated by the stimulating ray emitted from the stimulating ray source and producing analog data, an A/D converter for digitizing the analog data produced by the light detector to produce digital data, data memory for storing correction data for each of the plurality of stimulable phosphor layer regions produced by irradiating the plurality of stimulable phosphor layer regions with a stimulating ray and photoelectrically detecting stimulated emission released from the plurality of stimulable phosphor layer regions, and data correcting means for correcting digital data for each of the plurality of stimulable phosphor layer regions produced by irradiating the plurality of stimulable phosphor layer regions with a stimulating ray emitted from the stimulating ray source, photoelectrically detecting stimulated emission released from each of the plurality of stimulable phosphor layer regions by the light detector and digitized by the A/D converter using the correction data for each of the plurality of stimulable phosphor layer regions stored in the data memory, the correction data for each of the plurality of stimulable phosphor layer regions being produced based on digital data for each of the plurality of stimulable phosphor layer regions by irradiating the plurality of stimulable phosphor layer regions of the stimulable phosphor sheet with light emitted from a standard light source or radiation emitted from a standard radiation source to expose the plurality of stimulable phosphor layer regions, irradiating the plurality of stimulable phosphor layer regions of the stimulable phosphor sheet with a stimulating ray emitted from the stimulating ray source to excite the plurality of stimulable phosphor layer regions and photoelectrically detecting stimulated emission released from the plurality of stimulable phosphor layer regions.

In the case where a stimulable phosphor sheet is formed by forming a plurality of stimulable phosphor layer regions in a support, since it is difficult to form the plurality of stimulable phosphor layer regions so that each of them contains the same amount of stimulable phosphor, the amounts of radiation energy stored in the individual stimulable phosphor layer regions differ from each other even if they are exposed to the same radiation energy and, therefore, there is some risk of degradation of the quantitative characteristic of biochemical analysis data produced by exposing the plurality of stimulable phosphor layer regions of the stimulable phosphor sheet to electron beams ($\beta$ rays) released from the radioactive labeling substance contained in the plurality of spot-like regions of the biochemical analysis unit, scanning the plurality of the thus exposed stimulable phosphor layer regions with a stimulating ray and photoelectrically detecting stimulated emission released from the stimulable phosphor layer regions. In the present invention, however, correction data for correcting dispersion in signal intensity generated in biochemical analysis data caused by the difference in amounts of stimulable phosphor contained in the individual stimulable phosphor layer regions are produced for the individual stimulable phosphor layer regions by irradiating the plurality of stimulable phosphor layer regions of the stimulable phosphor sheet with light emitted from a standard light source or radiation emitted from a standard radiation source to expose the plurality of stimulable phosphor layer regions, irradiating the plurality of stimulable phosphor layer regions with a stimulating ray to excite stimulable phosphor contained in the plurality of stimulable phosphor layer regions and photoelectrically detecting stimulated emission released from the plurality of stimulable phosphor layer regions and are stored in the data memory and digital data for each of the plurality of stimulable phosphor layer regions produced by scanning the plurality of stimulable phosphor layer regions selectively exposed to a radioactive labeling substance contained in a plurality of spot-like regions formed in a biochemical analysis unit with a stimulating ray emitted from the stimulating ray source to excite the plurality of stimulable phosphor layer regions and photoelectrically detecting stimulated emission released from the plurality of stimulable phosphor layer regions are corrected by the data correcting means using the correction data for each of the stimulable phosphor layer regions stored in the data memory. The accuracy of quantitative analysis can therefore be markedly improved.

Further, in the case where a stimulable phosphor sheet is formed by forming a plurality of stimulable phosphor layer regions in a support, since it is difficult to form the plurality of stimulable phosphor layer regions so that each of them contains the same amount of stimulable phosphor, the amounts of energy of chemiluminescent emission stored in the individual stimulable phosphor layer regions differ from each other even if they are exposed to the same energy of the chemiluminescent emission and, therefore, there is some risk of degradation of the quantitative characteristic of biochemical analysis data produced by exposing the plurality of stimulable phosphor layer regions of the stimulable phosphor sheet to chemiluminescent emission released from the plurality of spot-like regions of the biochemical analysis unit, scanning the plurality of the thus exposed stimulable phosphor layer regions with a stimulating ray and photoelectrically detecting stimulated emission released from the stimulable phosphor layer regions. In the present invention, however, correction data for correcting dispersion in signal intensity generated in biochemical analysis data caused by the difference in amounts of stimulable phosphor contained in the individual stimulable phosphor layer regions are produced for the individual stimulable phosphor layer regions by irradiating the plurality of stimulable phosphor layer regions of the stimulable phosphor sheet with light emitted from a standard light source to expose the plurality of stimulable phosphor layer regions, irradiating the plurality of stimulable phosphor layer regions with a stimulating ray to excite stimulable phosphor contained in the plurality of stimulable phosphor layer regions and photoelectrically detecting stimulated emission released from the plurality of stimulable phosphor layer regions and are stored in the data memory and digital data for each of the plurality of stimulable phosphor layer regions produced by scanning the plurality of stimulable phosphor layer regions selectively exposed to a radioactive labeling substance contained in a plurality of spot-like regions formed in a biochemical analysis unit with a stimulating ray emitted from the stimulating ray source to excite the plurality of stimulable phosphor layer regions and photoelectrically detecting stimulated emission released from the plurality of stimulable phosphor layer regions are corrected by the data correcting means using the correction data for each of the stimulable phosphor layer regions stored in the data memory. The accuracy of quantitative analysis can therefore be markedly improved.

In a preferred aspect of the present invention, the biochemical analysis data producing apparatus further comprises a stimulating ray irradiation optical system for directing the stimulating ray emitted from the stimulating ray source toward the sample stage, and a scanning mechanism for moving the stimulating ray irradiation optical system and the sample stage relative to each other in a main scanning direction and a sub-scanning direction perpendicular to the main scanning direction so that the plurality of stimulable phosphor layer regions are sequentially irradiated with the stimulating ray emitted from the stimulating ray source.

In a preferred aspect of the present invention, the biochemical analysis data producing apparatus further comprises a standard light source constituted by a light source selected from a group consisting of an ultra-violet ray source, a flash lamp and a stroboscopic lamp.

According to this preferred aspect of the present invention, since the biochemical analysis data producing apparatus further comprises a standard light source constituted by a light source selected from a group consisting of an ultra-violet ray source, a flash lamp and a stroboscopic lamp, the correction data can be produced solely by the biochemical analysis data producing apparatus and stored in the data memory.

In another preferred aspect of the present invention, the biochemical analysis data producing apparatus further comprises a standard radiation source constituted by a radiation source selected from a group consisting of an X-ray source, a soft X-ray source and a $\beta$-ray source.

According to this preferred aspect of the present invention, since the biochemical analysis data producing apparatus further comprises a standard radiation source constituted by a radiation source selected from a group consisting of an X-ray source, a soft X-ray source and a $\beta$-ray source, the correction data can be produced solely by the biochemical analysis data producing apparatus and stored in the data memory.

In a further preferred aspect of the present invention, the standard light source or the standard radiation source is constituted as a planar light source or a planar radiation source.

In another preferred aspect of the present invention, the biochemical analysis data producing apparatus further comprises an exposure irradiation optical system for directing light emitted from the standard light source or radiation emitted from the standard radiation source toward the sample stage, the exposure irradiation optical system being adapted for directing light emitted from the standard light source or radiation emitted from the standard radiation source toward the sample stage in a linear manner and the scanning mechanism being constituted so as to move the exposure irradiation optical system and the sample stage relative to each other in the main scanning direction or the sub-scanning direction so that the plurality of stimulable phosphor layer regions are linearly scanned with the linear light or radiation.

In another preferred aspect of the present invention, the biochemical analysis data producing apparatus further comprises an exposure irradiation optical system for directing light emitted from the standard light source or radiation emitted from the standard radiation source toward the sample stage, the scanning mechanism is being constituted so as to move the exposure irradiation optical system and the sample stage relative to each other in the main scanning direction and the sub-scanning direction so that the plurality of stimulable phosphor layer regions are sequentially irradiated with light emitted from the standard light source or radiation emitted from the standard radiation source.

In a preferred aspect of the present invention, the biochemical analysis data producing apparatus further comprises stimulation control means for controlling the stimulating ray source and the scanning mechanism and position detecting means for detecting a relative positional relationship between the stimulating ray irradiation optical system and the sample stage in the main scanning direction, the stimulation control means being constituted so as to control the stimulating ray source and the scanning mechanism based on the relative positional relationship between the stimulating ray irradiation optical system and the sample stage in the main scanning direction detected by the position detecting means so that energy of the stimulating ray projected onto the plurality of stimulable phosphor layer regions per unit area is higher than that projected on regions other than the plurality of stimulable phosphor layer regions.

According to this preferred aspect of the present invention, since the stimulation control means is constituted so as to control the stimulating ray source and the scanning mechanism based on the relative positional relationship between the stimulating ray irradiation optical system and the sample stage in the main scanning direction detected by the position detecting means so that energy of the stimulating ray projected onto the plurality of stimulable phosphor layer regions per unit area is higher than that projected on regions other than the plurality of stimulable phosphor layer regions, it is possible to effectively prevent the stimulating ray from entering a neighboring stimulable phosphor layer region to be next stimulated as the stimulating ray is scanned and thus prevent stimulable phosphor contained in the neighboring stimulable phosphor layer region from being excited to release radiation energy or light energy stored therein, and, therefore, biochemical analysis data having an excellent quantitative characteristic can be produced in a desired manner.

In a further preferred aspect of the present invention, the stimulation control means is constituted so as to control the scanning mechanism so that the stimulating ray irradiation optical system and the sample stage are intermittently moved relative to each other in the main scanning direction and to control the stimulating ray source so that each of the plurality of stimulable phosphor layer regions is irradiated with the stimulating ray for a predetermined time.

According to this preferred aspect of the present invention, since the stimulation control means is constituted so as to control the scanning mechanism so that the stimulating ray irradiation optical system and the sample stage are intermittently moved relative to each other in the main scanning direction and to control the stimulating ray source so that each of the plurality of stimulable phosphor layer regions is irradiated with the stimulating ray for a predetermined time, it is possible to effectively prevent the stimulating ray from entering a neighboring stimulable phosphor layer region to be next stimulated as the stimulating ray is scanned and thus prevent stimulable phosphor contained in the neighboring stimulable phosphor layer region from being excited to release radiation energy or light energy stored therein, and, therefore, biochemical analysis data having an excellent quantitative characteristic can be produced in a desired manner.

In a further preferred aspect of the present invention, the stimulation control means is constituted so as to control the stimulating ray source so that the stimulable phosphor sheet is constantly irradiated with the stimulating ray, while the stimulating ray irradiation optical system and the sample stage are intermittently moved relative to each other in the main scanning direction by the scanning mechanism.

According to this preferred aspect of the present invention, although the stimulation control means is constituted so as to control the stimulating ray source so that the stimulable phosphor sheet is constantly irradiated with the stimulating ray, since the scanning mechanism is controlled by the stimulation control means so that the stimulating ray irradiation optical system and the sample stage are intermittently moved relative to each other in the main scanning direction, it is possible to effectively prevent the stimulating ray from entering a neighboring stimulable phosphor layer region to be next stimulated as the stimulating ray is scanned and thus prevent stimulable phosphor contained in the neighboring stimulable phosphor layer region from being excited to release radiation energy or light energy stored therein, and, therefore, biochemical analysis data having an excellent quantitative characteristic can be produced in a desired manner.

In another preferred aspect of the present invention, the stimulation control means is constituted so as to control an on and off operation of the stimulating ray source so that only the plurality of stimulable phosphor layer regions are irradiated with the stimulating ray and regions other than the plurality of stimulable phosphor layer regions are not irradiated with the stimulating ray.

According to this preferred aspect of the present invention, since the stimulation control means is constituted so as to control an on and off operation of the stimulating ray source so that only the plurality of stimulable phosphor layer regions are irradiated with the stimulating ray and regions other than the plurality of stimulable phosphor layer regions are not irradiated with the stimulating ray, only the stimulable phosphor layer region to be excited is irradiated with the stimulating ray at every moment and, therefore, since it is possible to effectively prevent the stimulating ray from entering a neighboring stimulable phosphor layer region to be next stimulated as the stimulating ray is scanned and thus prevent stimulable phosphor contained in the neighboring stimulable phosphor layer region from being excited to release radiation energy or light energy stored therein, biochemical analysis data having an excellent quantitative characteristic can be produced in a desired manner.

In a further preferred aspect of the present invention, the scanning mechanism is constituted so as to intermittently move the stimulating ray irradiation optical system and the sample stage relative to each other in the main scanning direction by a pitch equal to a distance between neighboring stimulable phosphor layer regions in the main scanning direction.

In a preferred aspect of the present invention, the scanning mechanism is constituted so as to continuously move the stimulating ray irradiation optical system and the sample stage relative to each other in the main scanning direction and the stimulation control means is constituted so as to control an on and off operation of the stimulating ray source so that only the plurality of stimulable phosphor layer regions are substantially irradiated with the stimulating ray and regions other than the plurality of stimulable phosphor layer regions are not substantially irradiated with the stimulating ray.

According to this preferred aspect of the present invention, although the scanning mechanism is constituted so as to continuously move the stimulating ray irradiation optical system and the sample stage relative to each other in the main scanning direction, since the stimulation control means is constituted so as to control an on and off operation of the stimulating ray source so that only the plurality of stimulable phosphor layer regions are substantially irradiated with the stimulating ray and regions other than the plurality of stimulable phosphor layer regions are not substantially irradiated with the stimulating ray, it is possible to effectively prevent the stimulating ray from entering a neighboring stimulable phosphor layer region to be next stimulated as the stimulating ray is scanned and thus prevent stimulable phosphor contained in the neighboring stimulable phosphor layer region from being excited to release radiation energy or light energy stored therein, and, therefore, biochemical analysis data having an excellent quantitative characteristic can be produced in a desired manner.

In a further preferred aspect of the present invention, the biochemical analysis data producing apparatus further comprises integrating means for integrating analog data produced by the light detector.

According to this preferred aspect of the present invention, since the biochemical analysis data producing apparatus further comprises integrating means for integrating analog data produced by the light detector, it is possible to produce biochemical analysis data having high signal intensity with high sensitivity by integrating analog signals produced by irradiating the plurality of stimulable phosphor layer regions with a stimulating ray to excite stimulable phosphor contained in the plurality of stimulable phosphor layer regions and photoelectrically detecting stimulated emission released from the stimulable phosphor and digitizing the integrated analog signals even when the radiation energy or light energy stored in the stimulable phosphor layer region is low and the intensity of stimulated emission released from the stimulable phosphor layer region is low.

In another preferred embodiment of the present invention, the biochemical analysis data producing apparatus further comprises summing means for adding digital signals produced by the A/D converter.

According to this preferred aspect of the present invention, since the biochemical analysis data producing apparatus further comprises summing means for adding digital signals produced by the A/D converter, it is possible to produce biochemical analysis data having high signal intensity with high sensitivity by adding digital signals produced by irradiating the plurality of stimulable phosphor layer regions with a stimulating ray to excite stimulable phosphor contained in the plurality of stimulable phosphor layer regions, photoelectrically detecting stimulated emission released from the stimulable phosphor to produce analog signals and digitizing the analog signals even when the radiation energy or light energy stored in the stimulable phosphor layer region is low and the intensity of stimulated emission released from the stimulable phosphor layer region is low.

In a preferred aspect of the present invention, the stimulating ray source is constituted by a laser stimulating ray source.

In another preferred aspect of the present invention, the stimulating ray source is constituted by an LED (light emitting diode) stimulating ray source.

The above and other objects of the present invention can be also accomplished by a stimulable phosphor sheet comprising a support, the support being provided with a plurality of stimulable phosphor layer regions formed spaced apart from each other and a memory area formed at a region thereof where no stimulable phosphor layer region is formed and capable of storing at least data relating to the plurality of stimulable phosphor layer regions.

According to the present invention, even in the case where a plurality of spot-like regions selectively labeled with a radioactive labeling substance by specifically binding specific binding substances whose sequence, base length, composition and the like are known and a substance derived from a living organism are formed in a biochemical analysis unit at a high density, if the plurality of stimulable phosphor layer regions are formed in the support of the stimulable phosphor sheet in the same pattern as that of the plurality of spot-like regions of the biochemical analysis unit, electron beams (β rays) released from the radioactive labeling substance contained in the individual spot-like regions when the stimulable phosphor sheet is superposed on the biochemical analysis unit to expose the plurality of stimulable phosphor layer regions of the stimulable phosphor sheet to the radioactive labeling substance selectively contained in the plurality of spot-like regions of the biochemical analysis unit can be effectively prevented from entering stimulable phosphor layer regions other than that to be exposed to electron beams (β rays) released from the radioactive labeling substance contained in the spot-like region and, therefore, it is possible to produce biochemical analysis data having an excellent quantitative characteristic with high resolution by scanning the plurality of the thus exposed stimulable phosphor layer regions with a stimulating ray and photoelectrically detecting stimulated emission released from the plurality of stimulable phosphor layer regions.

Further, in the case where a stimulable phosphor sheet is formed by forming a plurality of stimulable phosphor layer regions in a support, since it is difficult to form the plurality of stimulable phosphor layer regions so that each of them contains the same amount of stimulable phosphor, the amounts of radiation energy stored in the individual stimulable phosphor layer regions differ from each other even if they are exposed to the same radiation energy and, therefore, there is some risk of degradation of the quantitative characteristic of biochemical analysis data produced by exposing the plurality of stimulable phosphor layer regions of the stimulable phosphor sheet to electron beams (β rays) released from the radioactive labeling substance contained in the plurality of spot-like regions of the biochemical analysis unit, scanning the plurality of the thus exposed stimulable phosphor layer regions with a stimulating ray and photoelectrically detecting stimulated emission released from the stimulable phosphor layer regions. In the present invention, however, since the stimulable phosphor sheet includes a memory area formed at a region thereof where no stimulable phosphor layer region is formed and capable of storing at least data relating to the plurality of stimulable phosphor layer regions, the accuracy of quantitative analysis can be markedly improved by producing correction data for correcting dispersion in signal intensity generated in biochemical analysis data caused by the difference in amounts of stimulable phosphor contained in the individual stimulable phosphor layer regions based on the signal intensity of data obtained by exposing the plurality of stimulable phosphor layer regions using a correlation sample containing $^{14}C$, tritium or the like for emitting uniform radiation energy, scanning the plurality of the thus exposed stimulable phosphor layer regions with a stimulating ray and photoelectrically detecting stimulated emission released from each of the stimulable phosphor layer regions, and storing the correction data in the memory area formed in the support of the stimulable phosphor sheet.

Moreover, according to the present invention, even in the case where a plurality of spot-like regions selectively labeled with a labeling substance which generates chemiluminescent emission when it contacts a chemiluminescent substrate are formed in a biochemical analysis unit at a high density, if the plurality of stimulable phosphor layer regions are formed in the support of the stimulable phosphor sheet in the same pattern as that of the plurality of spot-like regions of the biochemical analysis unit, chemiluminescent emission in the wavelength of visible light released from the the individual spot-like regions when the stimulable phosphor sheet is superposed on the biochemical analysis unit formed with the plurality of spot-like regions releasing chemiluminescent emission generated by the contact of the chemiluminescent substance and the labeling substance to expose the plurality of stimulable phosphor layer regions of the stimulable phosphor sheet to the chemiluminescent emission released from the plurality of spot-like regions of the biochemical analysis unit can be effectively prevented from entering stimulable phosphor layer regions other than that to be exposed to chemiluminescent emission released from the spot-like region and, therefore, it is possible to produce biochemical analysis data having an excellent quantitative characteristic with high resolution by scanning the plurality of the thus exposed stimulable phosphor layer regions with a stimulating ray and photoelectrically detecting stimulated emission released from the plurality of stimulable phosphor layer regions.

Furthermore, in the case where a stimulable phosphor sheet is formed by forming a plurality of stimulable phosphor layer regions in a support, since it is difficult to form the plurality of stimulable phosphor layer regions so that each of them contains the same amount of stimulable phosphor, the amounts of the energy of chemiluminescent emission stored in the individual stimulable phosphor layer regions differ from each other even if they are exposed to the same energy of the chemiluminescent emission and, therefore, there is some risk of degradation of the quantitative characteristic of biochemical analysis data produced by exposing the plurality of stimulable phosphor layer regions of the stimulable phosphor sheet to chemiluminescent emission released from the plurality of spot-like regions of the biochemical analysis unit, scanning the plurality of the thus exposed stimulable phosphor layer regions with a stimulating ray and photoelectrically detecting stimulated emission released from the stimulable phosphor layer regions. In the present invention, however, since the stimulable phosphor sheet includes a memory area formed at a region thereof where no stimulable phosphor layer region is formed and capable of storing at least data relating to the plurality of stimulable phosphor layer regions, the accuracy of quantitative analysis can be markedly improved by producing correction data for correcting dispersion in signal intensity generated in biochemical analysis data caused by the difference in amounts of stimulable phosphor contained in the individual stimulable phosphor layer regions based on the signal intensity of data obtained by exposing the plurality of stimulable phosphor layer regions to light having unform energy, scanning the plurality of the thus exposed stimulable phosphor layer regions with a stimulating ray and photoelectrically detecting stimulated emission released from each of the stimulable phosphor layer regions, and storing the correction data in the memory area formed in the support of the stimulable phosphor sheet.

The above and other objects of the present invention can be also accomplished by a stimulable phosphor sheet comprising a support, the support being provided with a plurality of stimulable phosphor layer regions formed spaced apart from each other and a memory area that is formed at a region thereof where no stimulable phosphor layer region is formed and records correction data for correcting dispersion in signal intensities obtained by exposing the plurality of stimulable phosphor layer regions to uniform radiation energy, then exciting the plurality of stimulable phosphor layer regions with a stimulating ray and photoelectrically detecting stimulated emission released from the plurality of stimulable phosphor layer regions.

According to the present invention, the stimulable phosphor sheet includes the memory area that is formed at a region thereof where no stimulable phosphor layer region is formed and records correction data for correcting dispersion in signal intensities obtained by exposing the plurality of stimulable phosphor layer regions to uniform radiation energy, then exciting the plurality of stimulable phosphor layer regions with a stimulating ray and photoelectrically detecting stimulated emission released from the plurality of stimulable phosphor layer regions and, therefore, in the case where, owing to the difficulty of forming the plurality of stimulable phosphor layer regions so that each of them contains the same amount of stimulable phosphor, the amounts of radiation energy stored in the individual stimulable phosphor layer regions differ from each other even if they are exposed to the same radiation energy, it is possible to extremely easily and efficiently correct, based on the correction data recorded in the memory area, dispersion in signal intensities caused by the unevenness of amounts of stimulable phosphor contained in the individual stimulable phosphor layer regions and generated in biochemical analysis data produced by superposing the stimulable phosphor sheet on a biochemical analysis unit formed with a plurality of spot-like regions selectively labeled with a radioactive labeling substance, exposing the plurality of stimulable phosphor layer regions of the stimulable phosphor sheet to the radioactive labeling substance selectively contained in the plurality of absorptive regions of the biochemical analysis unit, scanning the plurality of stimulable phosphor layer regions of the stimulable phosphor sheet with a stimulating ray to excite stimulable phosphor contained in the plurality of stimulable phosphor layer regions, and photoelectrically detecting stimulated emission released from the plurality of stimulable phosphor layer regions and improve the accuracy of quantitative analysis.

The above and other objects of the present invention can be also accomplished by a stimulable phosphor sheet comprising a support, the support being provided with a plurality of stimulable phosphor layer regions formed spaced apart from each other and a memory area that is formed at a region thereof where no stimulable phosphor layer region is formed and records correction data for correcting dispersion in signal intensities obtained by exposing the plurality of stimulable phosphor layer regions to uniform light energy, then exciting the plurality of stimulable phosphor layer regions with a stimulating ray and photoelectrically detecting stimulated emission released from the plurality of stimulable phosphor layer regions.

According to the present invention, the stimulable phosphor sheet includes the memory area that is formed at a region thereof where no stimulable phosphor layer region is formed and records correction data for correcting dispersion in signal intensities obtained by exposing the plurality of stimulable phosphor layer regions to uniform light energy, then exciting the plurality of stimulable phosphor layer regions with a stimulating ray and photoelectrically detecting stimulated emission released from the plurality of stimulable phosphor layer regions and, therefore, in the case where, owing to the difficulty of forming the plurality of stimulable phosphor layer regions so that each of them contains the same amount of stimulable phosphor, the amounts of the energy of chemiluminescent emission stored in the individual stimulable phosphor layer regions differ from each other even if they are exposed to the same energy of the chemiluminescent emission, it is possible to extremely easily and efficiently correct, based on the correction data recorded in the memory area, dispersion in signal intensities caused by the unevenness of amounts of stimulable phosphor contained in the individual stimulable phosphor layer regions and generated in biochemical analysis data produced by superposing the stimulable phosphor sheet on a biochemical analysis unit formed with a plurality of spot-like regions selectively releasing chemiluminescent emission in the wavelength of visible light generated by the contact of the chemiluminescent substrate and the labeling substance, exposing the plurality of stimulable phosphor layer regions of the stimulable phosphor sheet to the chemiluminescent emission released from the plurality of absorptive regions of the biochemical analysis unit, scanning the plurality of stimulable phosphor layer regions of the stimulable phosphor sheet with a stimulating ray to excite stimulable phosphor contained in the plurality of stimulable phosphor layer regions, and photoelectrically detecting stimulated emission released from the plurality of stimulable phosphor layer regions and improve the accuracy of quantitative analysis.

In a preferred aspect of the present invention, the memory area is constituted by an IC chip.

In a further preferred aspect of the present invention, the stimulable phosphor sheet further comprises an interface through which data recorded in the memory area can be output.

According to this preferred aspect of the present invention, since the stimulable phosphor sheet further comprises an interface through which data recorded in the memory area can be output, the correction data can be easily read from the memory area.

In another preferred aspect of the present invention, the memory area is formed of a magnetic material.

In another preferred aspect of the present invention, the memory area is constituted by a bar code.

In a further preferred aspect of the present invention, ID data are recorded in the memory area.

According to this preferred aspect of the present invention, since ID data are recorded in the memory area, biochemical analysis data produced based on the stimulable phosphor sheet can be easily handled.

In the present invention, the stimulable phosphor usable for storing radiation energy may be of any type insofar as it can store radiation energy or electron beam energy and can be stimulated by an electromagnetic wave to release the radiation energy or the electron beam energy stored therein in the form of light. More specifically, preferably employed stimulable phosphors include alkaline earth metal fluorohalide phosphors $(Ba_{1-x}, M^{2+}_x)FX:yA$ (where $M^{2+}$ is at least one alkaline earth metal selected from the group consisting of Mg, Ca, Sr, Zn and Cd; X is at least one element selected from the group consisting of Cl, Br and I, A is at least one element selected from the group consisting of Eu, Tb, Ce, Tm, Dy, Pr, Ho, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; Z is at least one of Eu and Ce) disclosed in Japanese Patent Application Laid Open No. 2-276997, europium activated complex halide phosphors BaFXxNaX':aEu$^{2+}$ (where each of X or X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br and I; and x is greater than 0 and equal to or less than 0.1) disclosed in U.S. Pat. No. 4,539,137, and europium activated complex halide phosphors $M''FXaM'X'bM'''X''_2cM''''''_3xA:yEu^{2+}$ (where $M''$ is at least one alkaline earth metal selected from the group consisting of Ba, Sr and Ca; $M'$ is at least one alkaline metal selected from the group consisting of Li, Na, K, Rb and Cs; $M'''$ is at least one divalent metal selected from the group consisting of Be and Mg; $M''''$ is at least one trivalent metal selected from the group consisting of Al, Ga, In and Ti; A is at least one metal oxide; X is at least one halogen selected from the group consisting of Cl, Br and I; each of X', X" and X'" is at least one halogen selected from the group consisting of F, Cl, Br and I; a is is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2) disclosed in U.S. Pat. No. 4,962,047.

In the present invention, the stimulable phosphor usable for storing the energy of chemiluminescence emission may be of any type insofar as it can store the energy of light in the wavelength band of visible light and can be stimulated by an electromagnetic wave to release in the form of light the energy of light in the wavelength band of visible light stored therein. More specifically, preferably employed stimulable phosphors include at least one selected from the group consisting of metal halophosphates, rare-earth-activated sulfide-host phosphors, aluminate-host phosphors, silicate-host phosphors, fluoride-host phosphors and mixtures of two, three or more of these phosphors. Among them, rare-earth-activated sulfide-host phosphors are more preferable and, particularly, rare-earth-activated alkaline earth metal sulfide-host phosphors disclosed in U.S. Pat. Nos. 5,029,253 and 4,983,834, zinc germanate such as $Zn_2GeO_4$:Mn, V; $Zn_2GeO_4$:Mn disclosed in Japanese Patent Application Laid Open No. 2001-131545, alkaline-earth aluminate such as $Sr_4Al_{14}O_{25}$:Ln (wherein Ln is a rare-earth element) disclosed in Japanese Patent Application Laid Open No. 2001-123162, $Y_{0.8}Lu_{1.2}SiO_5$:Ce, Zr; GdOCl:Ce disclosed in Japanese Patent Publication No. 6-31904 and the like are most preferable.

The above and other objects and features of the present invention will become apparent from the following description made with reference to the accompanying drawings.

DESCRIPTION OF THE PREFERRED EMBODIMENTS

Figure 1:
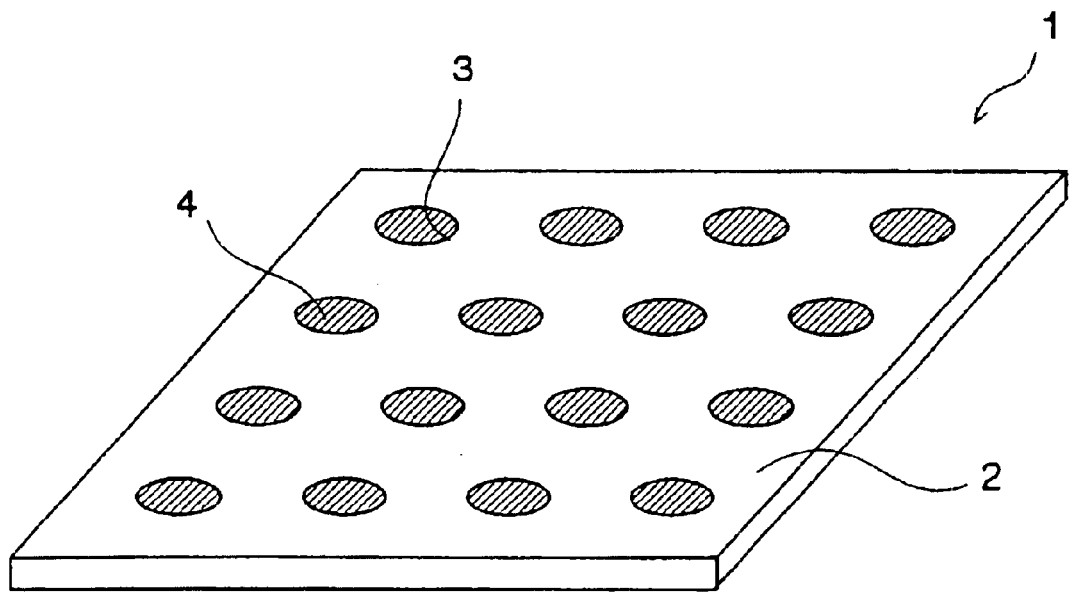
FIG. 1 is a schematic perspective view showing a biochemical analysis unit used in a biochemical analysis data producing method which is a preferred embodiment of the present invention.

FIG. 1 is a schematic perspective view showing a biochemical analysis unit used in a biochemical analysis data producing method which is a preferred embodiment of the present invention.

As shown in FIG. 1, a biochemical analysis unit 1 includes a substrate 2 formed of stainless steel and formed with a number of substantially circular through-holes 3 at a high density, and a number of absorptive regions 4 are dot-like formed by charging nylon-6 in the through-holes 3.

Although not accurately shown in FIG. 1, in this embodiment, the through-holes 3 are formed in the substrate 2 so that substantially circular absorptive regions 4 having a size of about 0.07 cm² are regularly formed in the manner of a matrix of 120 columns×160 lines and, therefore, 19,200 absorptive regions 4 are formed.

A number of absorptive regions 4 are formed by charging absorptive material 4 in the through-holes 3 formed in the substrate in such a manner that the surfaces of the absorptive regions 4 coincide with that of the substrate.

Figure 2:
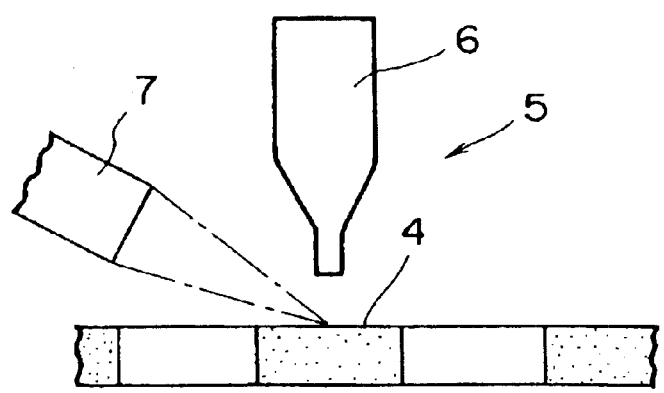
FIG. 2 is a schematic front view showing a spotting device.

FIG. 2 is a schematic front view showing a spotting device.

As shown in FIG. 2, when biochemical analysis is performed, a solution containing specific binding substances such as a plurality of cDNAs whose sequences are known but differ from each other are spotted using a spotting device 5 onto a number of the absorptive regions 4 of the biochemical analysis unit 1 and the specific binding substances are fixed therein.

As shown in FIG. 2, the spotting device 5 includes an injector 6 for ejecting a solution of specific binding substances toward the biochemical analysis unit 1 and a CCD camera 7 and is constituted so that the solution of specific binding substances such as cDNAs are spotted from the injector 6 when the tip end portion of the injector 6 and the center of the absorptive region 4 into which the solution containing specific binding substances is to be spotted are determined to coincide with each other as a result of viewing them using the CCD camera, thereby ensuring that the solution of specific binding substances can be accurately spotted into a number of the absorptive regions 4 of the biochemical analysis unit 1.

Figure 3:
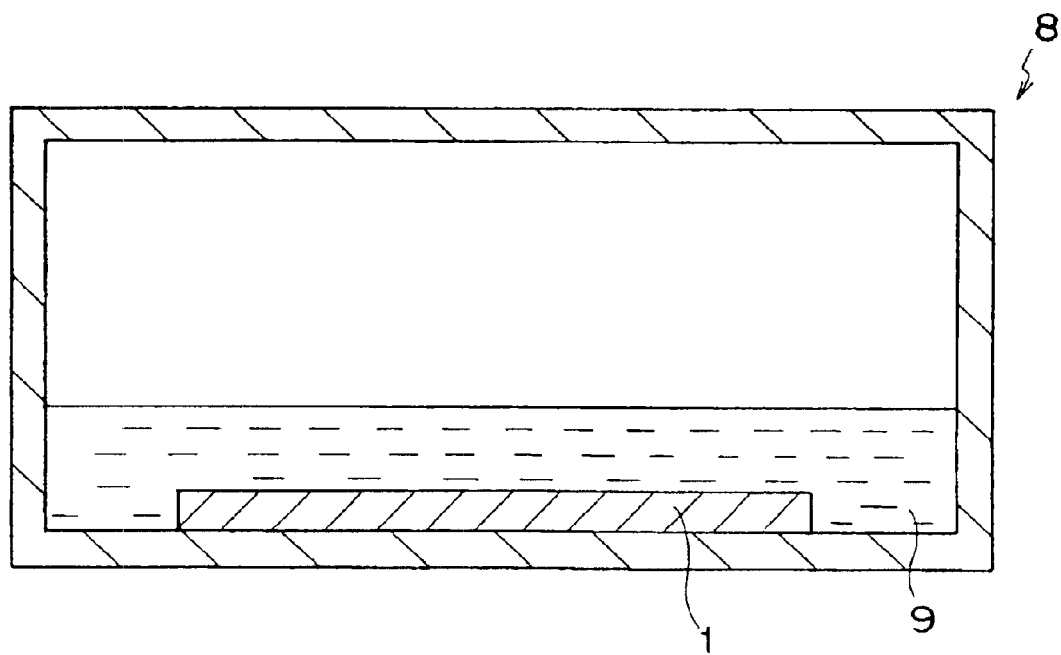
FIG. 3 is a schematic longitudinal cross sectional view showing a hybridization reaction vessel.

FIG. 3 is a schematic longitudinal cross sectional view showing a hybridization reaction vessel.

As shown in FIG. 3, a hybridization reaction vessel 8 is formed to have a substantially rectangular cross section and accommodates a hybridization solution 9 containing a substance derived from a living organism labeled with a labeling substance as a probe therein.

In the case where a specific binding substance such as cDNA is to be labeled with a radioactive labeling substance, a hybridization solution 9 containing a substance derived from a living organism labeled with a radioactive labeling substance as a probe is prepared and is accommodated in the hybridization reaction vessel 8.

On the other hand, in the case where a specific binding substance such as cDNA is to be labeled with a labeling substance which generates chemiluminescent emission when it contacts a chemiluminescent substrate, a hybridization solution 9 containing a substance derived from a living organism labeled with a labeling substance which generates chemiluminescent emission when it contacts a chemiluminescent substrate as a probe is prepared and is accommodated in the hybridization reaction vessel 8.

Further, in the case where a specific binding substance such as cDNA is to be labeled with a fluorescent substance such as a fluorescent dye, a hybridization solution 9 containing a substance derived from a living organism labeled with a fluorescent substance such as a fluorescent dye as a probe is prepared and is accommodated in the hybridization reaction vessel 8.

It is possible to prepare a hybridization solution 9 containing two or more substances derived from a living organism among a substance derived from a living organism labeled with a radioactive labeling substance, a substance derived from a living organism labeled with a labeling substance which generates chemiluminescent emission when it contacts a chemiluminescent substrate and a substance derived from a living organism labeled with a fluorescent substance such as a fluorescent dye and accommodate it in the hybridization vessel 8. In this embodiment, a hybridization solution 9 containing a substance derived from a living organism labeled with a radioactive labeling substance and a substance derived from a living organism labeled with a fluorescent substance such as a fluorescent dye is prepared and accommodated in the hybridization reaction vessel 8.

When hybridization is to be performed, the biochemical analysis unit 1 containing specific binding substances such as a plurality of cDNAs spotted into a number of absorptive regions 4 is accommodated in the hybridization reaction vessel 8.

As a result, specific binding substances spotted in a number of the absorptive regions 4 of the biochemical analysis unit 1 can be selectively hybridized with a substance derived from a living organism labeled with a radioactive labeling substance and a substance derived from a living organism labeled with a fluorescent substance such as a fluorescent dye.

In this manner, radiation data of a radioactive labeling substance and fluorescence data of a fluorescent substance such as a fluorescent dye are recorded in a number of absorptive regions 4 formed in the biochemical analysis unit 1. Fluorescence data recorded in the biochemical analysis unit 1 are read by a scanner described later, thereby producing biochemical analysis data.

On the other hand, radiation data of the radioactive labeling substance recorded in a number of absorptive regions 4 formed in the biochemical analysis unit 1 are transferred onto a stimulable phosphor layer of a stimulable phosphor sheet and read by the scanner described later, thereby producing biochemical analysis data.

Figure 4:
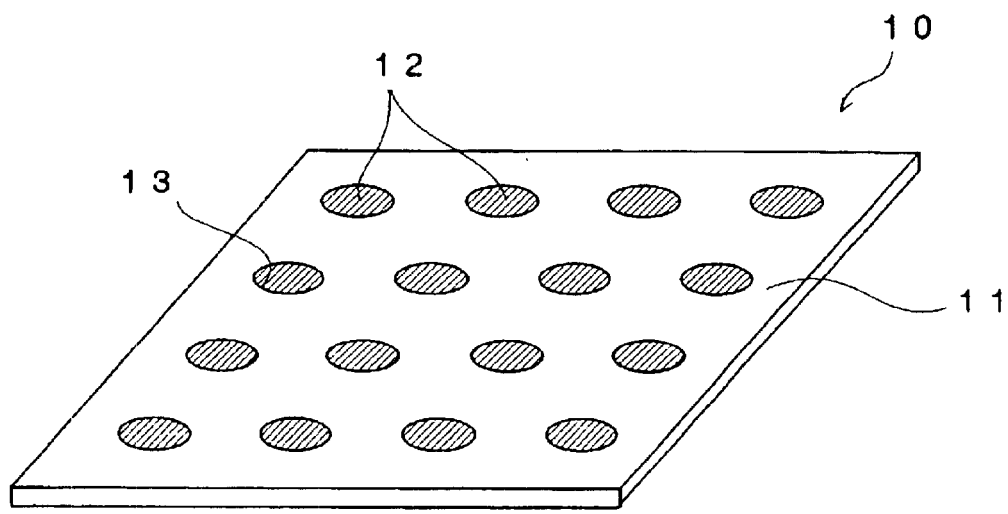
FIG. 4 is a schematic perspective view showing a stimulable phosphor sheet used for a biochemical analysis data producing method which is a preferred embodiment of the present invention.
Figure 5:
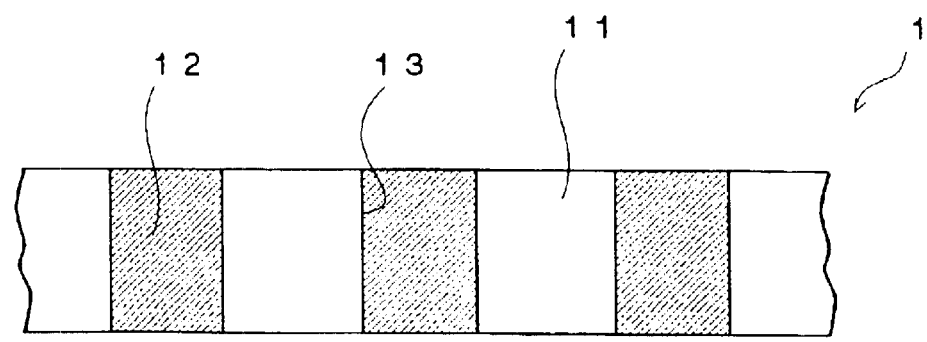
FIG. 5 is a schematic partial cross-sectional view a stimulable phosphor sheet used for a biochemical analysis data producing method which is a preferred embodiment of the present invention.

FIG. 4 is a schematic perspective view showing a stimulable phosphor sheet used for a biochemical analysis data producing method which is a preferred embodiment of the present invention and FIG. 5 is a schematic partial cross-sectional view thereof.

As shown in FIGS. 4 and 5, a stimulable phosphor sheet 10 according to this embodiment includes a support 11 made of stainless steel and regularly formed with a number of substantially circular through-holes 13 and a number of stimulable phosphor layer regions 12 are dot-like formed by embedding stimulable phosphor in the through-holes 13.

A number of the through-holes 13 are formed in the support 11 in the same pattern as that of a number of the absorptive regions 4 formed in the substrate 2 of the biochemical analysis unit 1 and each of them has the same size as that of the absorptive region 4 formed in the substrate 2 of the biochemical analysis unit 1.

Therefore, although not accurately shown in FIG. 4, in this embodiment, substantially circular stimulable phosphor layer regions 12 having a size of about 0.07 cm$^2$ are regularly formed in the manner of a matrix of 120 columns× 160 lines in the support 11 and, therefore, 19,200 stimulable phosphor layer regions 12 are dot-like formed.

Further, as shown in FIG. 5, in this embodiment, the stimulable phosphor sheet 10 is formed by embedding stimulable phosphor in the through-holes 13 formed in the support 11 so that the surface of the support 11 and the surfaces of the stimulable phosphor layer regions 12 lie at the same height level.

Figure 6:
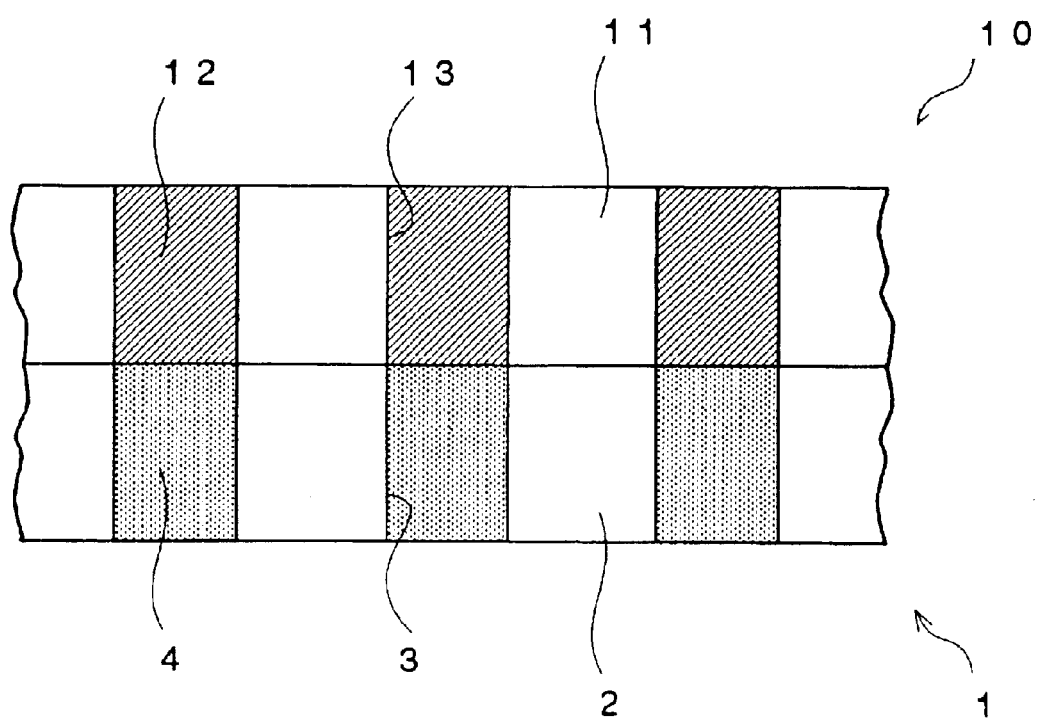
FIG. 6 is a schematic cross-sectional view showing a method for exposing a number of stimulable phosphor layer regions formed in a stimulable phosphor sheet to a radioactive labeling substance contained in a number of absorptive regions formed in the biochemical analysis unit.

FIG. 6 is a schematic cross-sectional view showing a method for exposing a number of the stimulable phosphor layer regions 12 formed in the stimulable phosphor sheet 10 to a radioactive labeling substance contained in a number of the absorptive regions 4 formed in the biochemical analysis unit 1.

As shown in FIG. 6, when the stimulable phosphor layer regions 12 of a stimulable phosphor sheet 10 are to be exposed, the stimulable phosphor sheet 10 is superposed on the biochemical analysis unit 1 in such a manner that a number of the stimulable phosphor layer regions 12 formed in the support 11 of the stimulable phosphor sheet 10 face the corresponding absorptive regions 4 formed in the biochemical analysis unit 1.

In this, embodiment, since the biochemical analysis unit 1 is formed by embedding nylon-6 in a number of the through-holes 3 formed in the substrate 2 made of stainless steel, the biochemical analysis unit 1 hardly stretches or shrinks even when it is subjected to liquid processing such as hybridization and, therefore, it is possible to easily and accurately superpose the stimulable phosphor sheet 10 on the biochemical analysis unit 1 so that each of the stimulable phosphor layer regions 12 formed in the support 11 of the stimulable phosphor sheet 10 accurately faces the corresponding absorptive region 4 formed in the substrate 2 of the biochemical analysis unit 1, thereby exposing the stimulable phosphor layer regions 12.

In this manner, each of the stimulable phosphor layer regions 12 formed in the support 11 of the stimulable phosphor sheet 10 is kept to face the corresponding absorptive region 4 formed in the substrate 2 of the biochemical analysis unit 1 for a predetermined time period, whereby a number of the stimulable phosphor layer regions 12 formed in the support 11 of the stimulable phosphor sheet 10 are exposed to the radioactive labeling substance contained in a number of the absorptive regions 4 formed in the substrate 2 of the biochemical analysis unit 1.

During the exposure operation, electron beams (β rays) are released from the radioactive labeling substance contained in the absorptive regions 4 of the biochemical analysis unit 1. However, since a number of the absorptive regions 4 of the biochemical analysis unit 1 are formed spaced apart from each other in the substrate 2 made of stainless steel and the substrate 2 made of stainless steel capable of attenuating radiation energy is present around each of the absorptive regions 4, electron beams (β rays) released from the radioactive labeling substance contained in the absorptive regions 4 of the biochemical analysis unit 1 can be efficiently prevented from scattering in the substrate 2 of the biochemical analysis unit 1. Further, since a number of the stimulable phosphor layer regions 12 of the stimulable phosphor sheet 10 are formed by embedding stimulable phosphor in a number of the through-holes 13 formed in the support 11 made of stainless steel and the support 11 made of stainless steel capable of attenuating radiation energy is present around each of the stimulable phosphor layer regions 12, electron beams (β rays) released from the radioactive labeling substance contained in the absorptive regions 4 of the biochemical analysis unit 1 can be efficiently prevented from scattering in the support 11 of the stimulable phosphor sheet 10. Therefore, it is possible to selectively expose only the stimulable phosphor layer region 12 each of the absorptive regions 4 faces to the electron beams (β rays) released from the radioactive labeling substance contained in each of the absorptive regions 4.

In this manner, radiation data of a radioactive labeling substance are recorded in a number of the stimulable phosphor layer regions 12 formed in the support 11 of the stimulable phosphor sheet 10.

Figure 7:
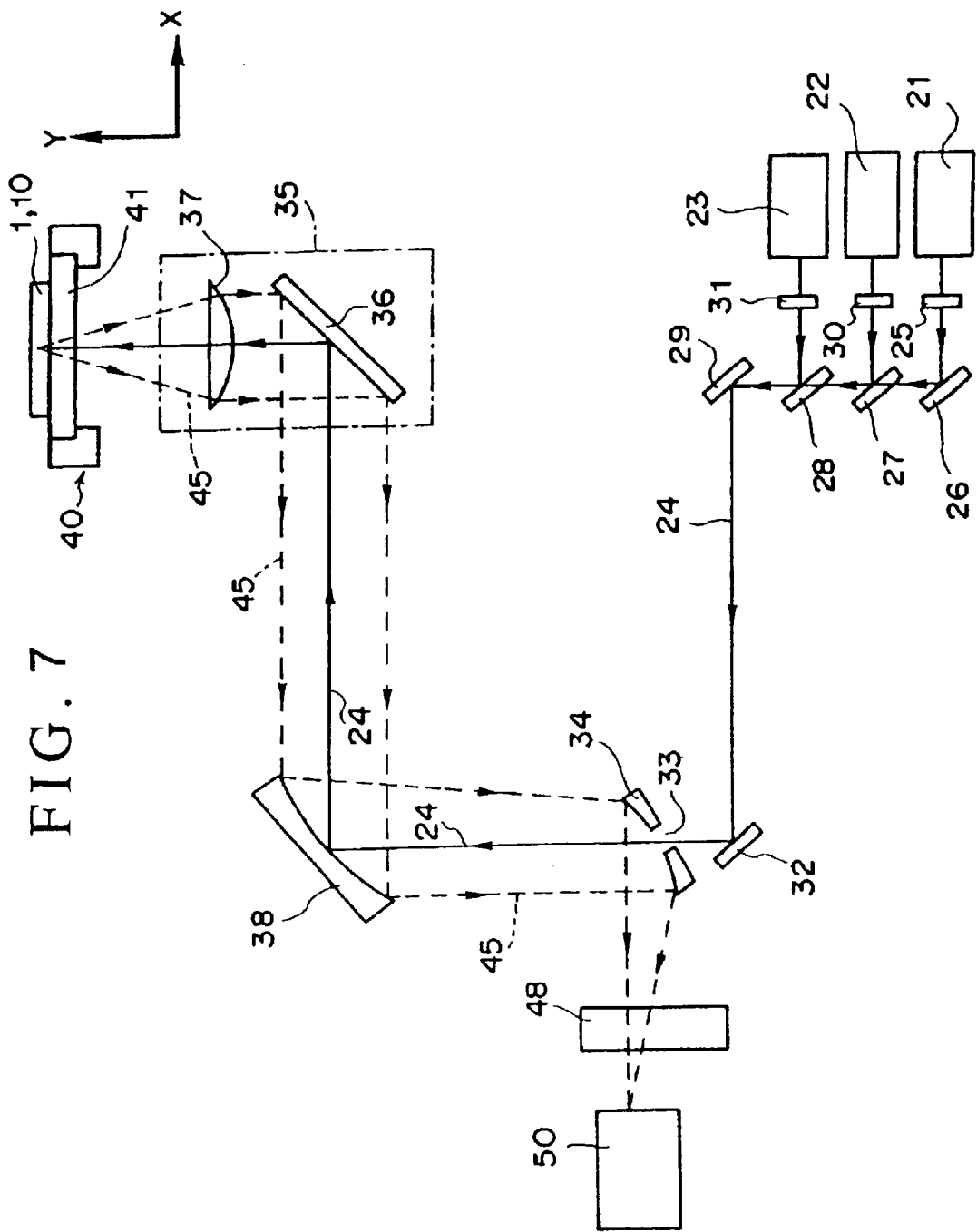
FIG. 7 is a schematic view showing a scanner for reading radiation data of a radioactive labeling substance recorded in a number of the stimulable phosphor layer regions 12 formed in the support 11 of the stimulable phosphor sheet 10 and fluorescence data recorded in a number of the absorptive regions 4 formed in the biochemical analysis unit 1 and producing biochemical analysis data.
Figure 8:
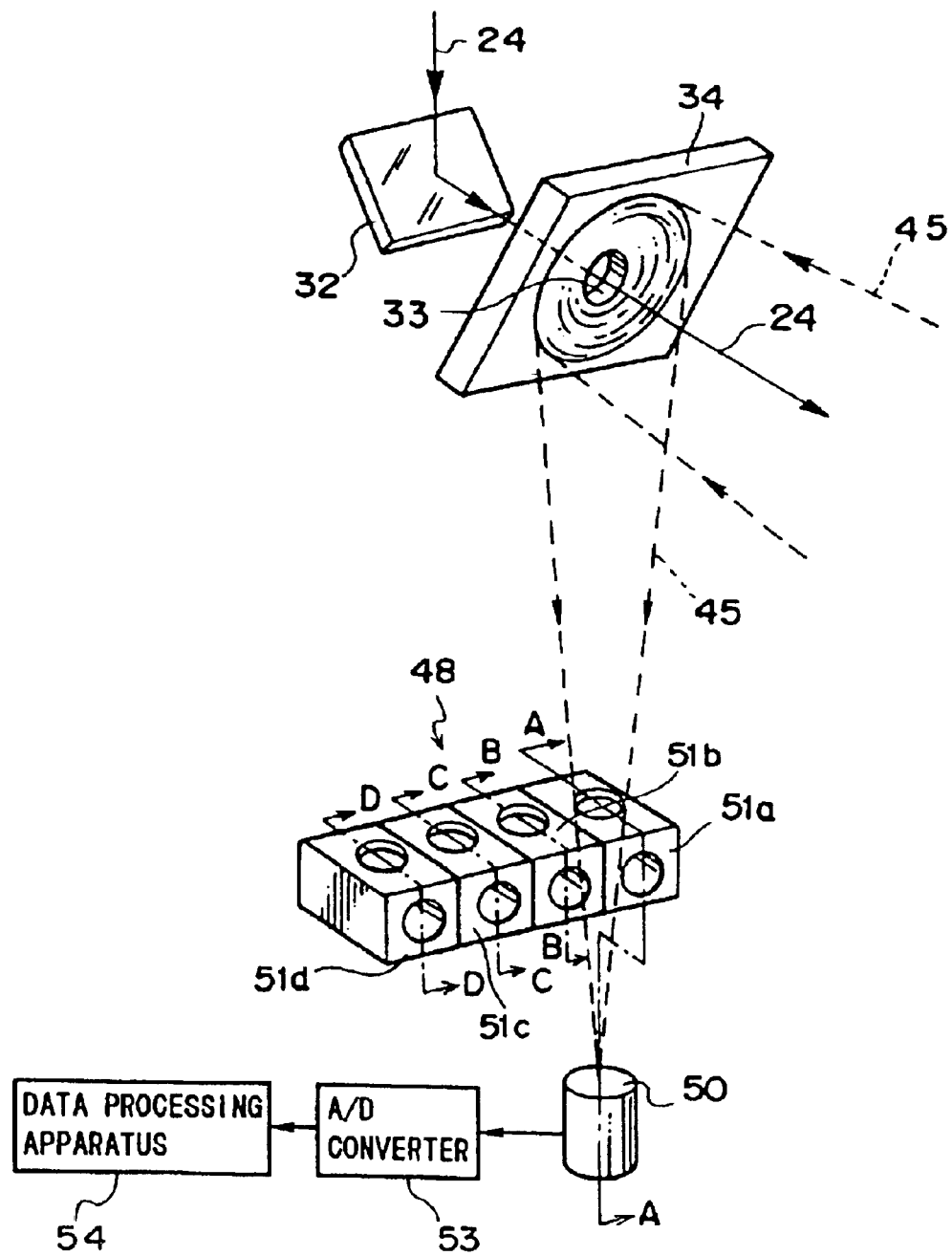
FIG. 8 is a schematic perspective view showing details in the vicinity of a photomultiplier of a scanner shown in FIG. 7.

FIG. 7 is a schematic view showing a scanner for reading radiation data of a radioactive labeling substance recorded in a number of the stimulable phosphor layer regions 12 formed in the support 11 of the stimulable phosphor sheet 10 and fluorescence data recorded in a number of the absorptive regions 4 formed in the biochemical analysis unit 1 and producing biochemical analysis data, and FIG. 8 is a schematic perspective view showing details in the vicinity of a photomultiplier.

The scanner shown in FIG. 7 is constituted so as to read radiation data of a radioactive labeling substance recorded in a number of the stimulable phosphor layer regions 12 formed in the support 11 of the stimulable phosphor sheet 10 and fluorescence data recorded in a number of the absorptive regions 4 of the biochemical analysis unit 1 and includes a first laser stimulating ray source 21 for emitting a laser beam having a wavelength of 640 nm, a second laser stimulating ray source 22 for emitting a laser beam having a wavelength of 532 nm and a third laser stimulating ray source 23 for emitting a laser beam having a wavelength of 473 nm.

In this embodiment, the first laser stimulating ray source 21 is constituted by a semiconductor laser beam source and the second laser stimulating ray source 22 and the third laser stimulating ray source 23 are constituted by a second harmonic generation element.

A laser beam 24 emitted from the first laser stimulating source 21 passes through a collimator lens 25, thereby being made a parallel beam, and is reflected by a mirror 26. A first dichroic mirror 27 for transmitting light having a wavelength of 640 nm but reflecting light having a wavelength of 532 nm and a second dichroic mirror 28 for transmitting light having a wavelength equal to and longer than 532 nm but reflecting light having a wavelength of 473 nm are provided in the optical path of the laser beam 24 emitted from the first laser stimulating ray source 21. The laser beam 24 emitted from the first laser stimulating ray source 21 and reflected by the mirror 26 passes through the first dichroic mirror 27 and the second dichroic mirror 28 and advances to a mirror 29.

On the other hand, the laser beam 24 emitted from the second laser stimulating ray source 22 passes through a collimator lens 30, thereby being made a parallel beam, and is reflected by the first dichroic mirror 27, thereby changing its direction by 90 degrees. The laser beam 24 then passes through the second dichroic mirror 28 and advances to the mirror 29.

Further, the laser beam 24 emitted from the third laser stimulating ray source 23 passes through a collimator lens 31, thereby being made a parallel beam, and is reflected by the second dichroic mirror 28, thereby changing its direction by 90 degrees. The laser beam 24 then advances to the mirror 29.

The laser beam 24 advancing to the mirror 29 is reflected by the mirror 29 and advances to a mirror 32 to be reflected thereby.

A perforated mirror 34 formed with a hole 33 at the center portion thereof is provided in the optical path of the laser beam 24 reflected by the mirror 32. The laser beam 24 reflected by the mirror 32 passes through the hole 33 of the perforated mirror 34 and advances to a concave mirror 38.

The laser beam 24 advancing to the concave mirror 38 is reflected by the concave mirror 38 and enters an optical head 35.

The optical head 35 includes a mirror 36 and an aspherical lens 37. The laser beam 24 entering the optical head 35 is reflected by the mirror 36 and condensed by the aspherical lens 37 onto the stimulable phosphor sheet 10 or the biochemical analysis unit 1 placed on the glass plate 41 of a stage 40.

When the laser beam 24 impinges on the stimulable phosphor layer region 12 of the stimulable phosphor sheet 10, stimulable phosphor contained in the stimulable phosphor layer region 12 formed in the support 11 of the stimulable phosphor 10 is excited, thereby releasing stimulated emission 45. On the other hand, when the laser beam 24 impinges on the absorptive region 4 formed in the substrate 2 of the biochemical analysis unit 1, a fluorescent dye or the like contained in the absorptive region 4 is excited, thereby releasing fluorescence emission 45.

The stimulated emission 45 released from the stimulable phosphor layer region 12 of the stimulable phosphor 10 or the fluorescence emission 45 released from the absorptive region 4 of the biochemical analysis unit 1 is condensed onto the mirror 36 by the aspherical lens 37 provided in the optical head 35 and reflected by the mirror 36 on the side of the optical path of the laser beam 24, thereby being made a parallel beam to advance to the concave mirror 38.

The stimulated emission 45 or the fluorescence emission 45 advancing to the concave mirror 38 is reflected by the concave mirror 38 and advances to the perforated mirror 34.

As shown in FIG. 8, the stimulated emission 45 or the fluorescence emission 45 advancing to the perforated mirror 34 is reflected downward by the perforated mirror 34 formed as a concave mirror and advances to a filter unit 48, whereby light having a predetermined wavelength is cut. The stimulated emission 45 or the fluorescence emission 45 then impinges on a photomultiplier 50, thereby being photoelectrically detected.

As shown in FIG. 8, the filter unit 48 is provided with four filter members 51a, 51b, 51c and 51d and is constituted to be laterally movable in FIG. 7 by a motor (not shown).

Figure 9:
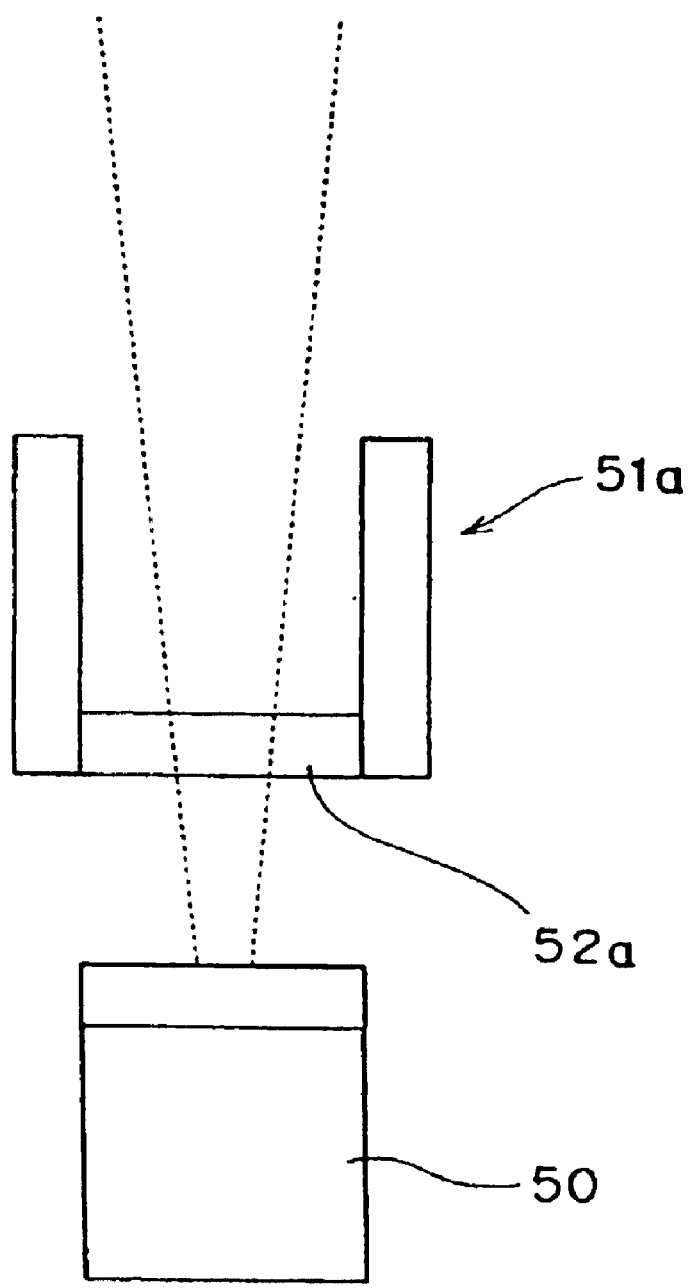
FIG. 9 is a schematic cross-sectional view taken along a line A—A in FIG. 8.

FIG. 9 is a schematic cross-sectional view taken along a line A—A in FIG. 8.

As shown in FIG. 9, the filter member 51a includes a filter 52a and the filter 52a is used for reading fluorescence emission 45 by stimulating a fluorescent substance such as a fluorescent dye contained in a number of the absorptive regions 4 formed in the substrate 2 of the biochemical analysis unit I using the first laser stimulating ray source 21 and has a property of cutting off light having a wavelength of 640 nm but transmitting light having a wavelength longer than 640 nm.

Figure 10:
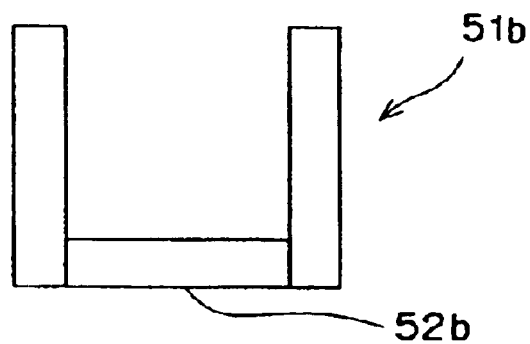
FIG. 10 is a schematic cross-sectional view taken along a line B—B in FIG. 8.

FIG. 10 is a schematic cross-sectional view taken along a line B—B in FIG. 8.

As shown in FIG. 10, the filter member 51b includes a filter 52b and the filter 52b is used for reading fluorescence emission 45 by stimulating a fluorescent substance such as a fluorescent dye contained in a number of the absorptive regions 4 formed in the substrate 2 of the biochemical analysis unit 1 using the second laser stimulating ray source 22 and has a property of cutting off light having a wavelength of 532 nm but transmitting light having a wavelength longer than 532 nm.

Figure 11:
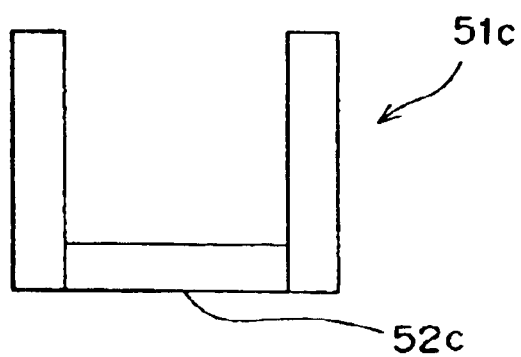
FIG. 11 is a schematic cross-sectional view taken along a line C—C in FIG. 8.

FIG. 11 is a schematic cross-sectional view taken along a line C—C in FIG. 8.

As shown in FIG. 11, the filter member 51c includes a filter 52c and the filter 52c is used for reading fluorescence emission 45 by stimulating a fluorescent substance such as a fluorescent dye contained in in a number of the absorptive regions 4 formed in the substrate 2 of the biochemical analysis unit 1 using the third laser stimulating ray source 23 and has a property of cutting off light having a wavelength of 473 nm but transmitting light having a wavelength longer than 473 nm.

Figure 12:
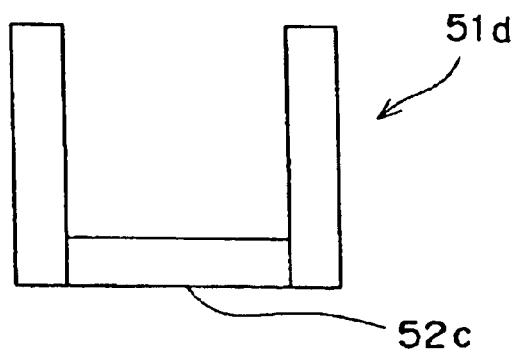
FIG. 12 is a schematic cross-sectional view taken along a line D—D in FIG. 8.

FIG. 12 is a schematic cross-sectional view taken along a line D—D in FIG. 8.

As shown in FIG. 12, the filter member 51d includes a filter 52d and the filter 52d is used for reading stimulated emission released from stimulable phosphor contained in the stimulable phosphor layer 12 formed in the support II of the stimulable phosphor sheet 10 upon being stimulated using the first laser stimulating ray source 1 and has a property of transmitting only light having a wavelength corresponding to that of stimulated emission emitted from stimulable phosphor and cutting off light having a wavelength of 640 nm.

Therefore, in accordance with the kind of a stimulating ray source to be used, one of these filter members 51a, 511b, 51c, 51d is selectively positioned in front of the photomultiplier 50, thereby enabling the photomultiplier 50 to photoelectrically detect only light to be detected.

The analog data produced by photoelectrically detecting light with the photomultiplier 50 are converted by an A/D converter 53 into digital data and the digital data are fed to a data processing apparatus 54.

Although not shown in FIG. 7, the optical head 35 is constituted to be movable by a scanning mechanism in a main scanning direction indicated by an arrow 7 and a sub-scanning direction indicated by an arrow Y in FIG. 7 so that all of the stimulable phosphor layer regions 12 formed in the support 11 of the stimulable phosphor sheet 10 or all of the absorptive regions 4 formed in the substrate 2 of the biochemical analysis unit 1 can be scanned by the laser beam 24.

Figure 13:
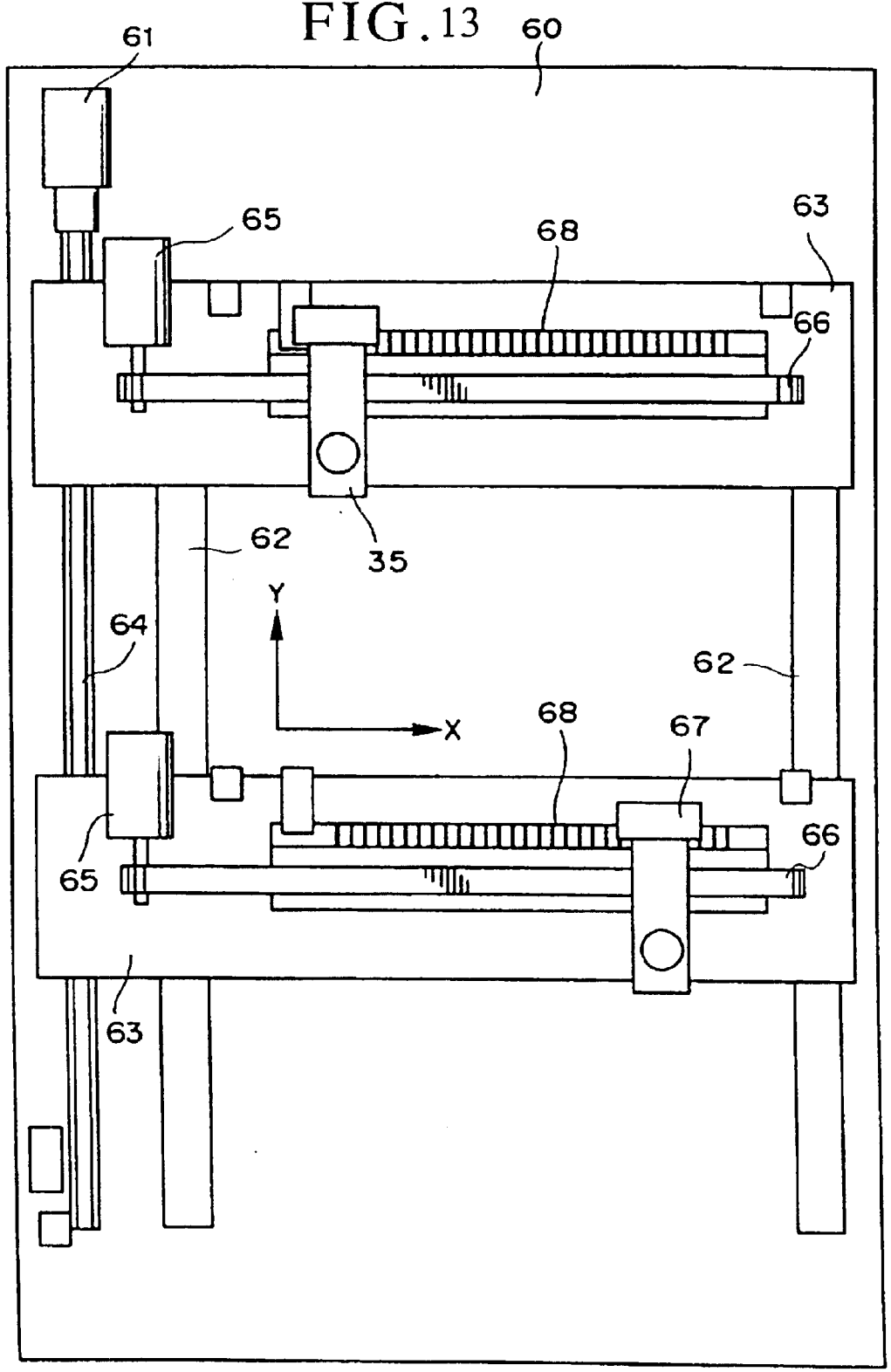
FIG. 13 is a schematic plan view of a scanning mechanism of an optical head.

FIG. 13 is a schematic plan view showing the scanning mechanism of the optical head 35.

In FIG. 13, optical systems other than the optical head 35 and the paths of the laser beam 24 and stimulated emission 45 or fluorescence emission 45 are omitted for simplification.

As shown in FIG. 13, the scanning mechanism of the optical head 35 includes a base plate 60, and a sub-scanning pulse motor 61 and a pair of rails 62, 62 are fixed on the base plate 60. A movable base plate 63 is further provided so as to be movable in the sub-scanning direction indicated by an arrow Y in FIG. 13.

The movable base plate 63 is formed with a threaded hole (not shown) and a threaded rod 64 rotated by the sub-scanning pulse motor 61 is engaged with the inside of the hole.

A main scanning stepping motor 65 is provided on the movable base plate 63. The main scanning stepping motor 65 is adapted for intermittently driving an endless belt 66 by a pitch equal to the distance between neighboring absorptive regions 4 formed in the biochemical analysis unit 1.

The optical head 35 is fixed to the endless belt 66 and when the endless belt 66 is driven by the main scanning stepping motor 65, the optical head 35 is moved in the main scanning direction indicated by an arrow X in FIG. 13. In FIG. 13, the reference numeral 67 designates a linear encoder for detecting the position of the optical head 35 in the main scanning direction and the reference numeral 68 designates slits of the linear encoder 67.

Therefore, the optical head 35 is moved in the main scanning direction indicated by the arrow X and the sub-scanning direction indicated by the arrow Y in FIG. 13 by driving the endless belt 66 in the main scanning direction by the main scanning stepping motor 65 and intermittently moving the movable base plate 63 in the sub-scanning direction by the sub-scanning pulse motor 61, thereby scanning all of the stimulable phosphor layer regions 12 formed in the support 11 of the stimulable phosphor sheet 10 or all of the absorptive regions 4 formed in the substrate 2 of the biochemical analysis unit 1 with the laser beam 24.

Figure 14:
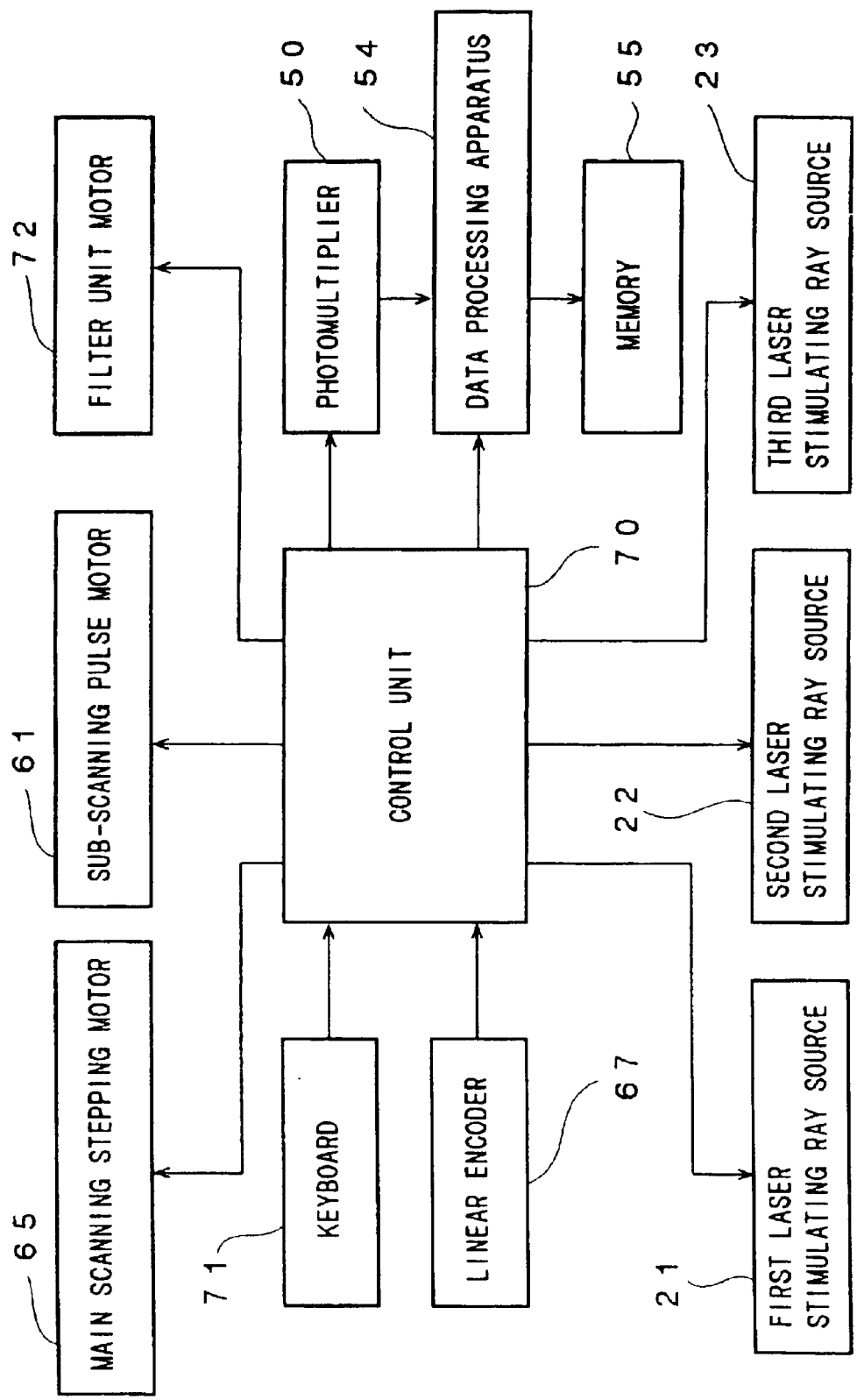
FIG. 14 is a block diagram of a control system, an input system, a drive system and a detection system of the scanner which is a preferred embodiment of the present invention.

FIG. 14 is a block diagram of a control system, an input system, a drive system and a detection system of the scanner which is a preferred embodiment of the present invention.

As shown in FIG. 14, the control system of the scanner includes a control unit 70 for controlling the overall operation of the scanner, the data processing apparatus 54 and a memory 55, and the input system of the scanner includes a keyboard 71 which can be operated by a user and through which various instruction signals can be input.

As shown in FIG. 14, the drive system of the scanner includes the main scanning stepping motor 65 for moving the optical head 35 in the main scanning direction, the sub-scanning pulse motor 61 for moving the optical head 35 in the sub-scanning direction and a filter unit motor 72 for moving the filter unit 48 provided with the four filter members 51a, 51b, 51c and 5d.

The control unit 70 is adapted for selectively outputting a drive signal to the first laser stimulating ray source 21, the second laser stimulating ray source 22 or the third laser stimulating ray source 23 and outputting a drive signal to the filter unit motor 72.

As shown in FIG. 14, the detection system of the scanner includes the photomultiplier 50 and the linear encoder 67.

In this embodiment, the control unit 70 is adapted to control the on and off operation of the first laser stimulating ray source 21, the second laser stimulating ray source 22 or the third laser stimulating ray source 23 in accordance with a detection signal indicating the position of the optical head 35 input from the linear encoder 67.

The radiation data recorded in a number of the stimulable phosphor layer regions 12 of the stimulable phosphor sheet 10 by exposing a number of the stimulable phosphor layer regions 12 of the stimulable phosphor sheet 10 to the radioactive labeling substance contained in a number of the absorptive regions 4 of the biochemical analysis unit 1 are read by the thus constituted scanner. However, in the stimulable phosphor sheet 10 according to this embodiment, since it is difficult to embed stimulable phosphor in a number of the through-holes 13 formed in the support 11 so that the amount of stimulable phosphor contained in each of the stimulable phosphor layer regions 12 is constant, the amounts of radiation energy stored in the individual stimulable phosphor layer regions 12 differ from each other even if they are exposed to the same radiation energy and, therefore, dispersion in signal intensity is generated in biochemical analysis data produced by reading radiation data recorded in a number of the stimulable phosphor layer regions 12 of the stimulable phosphor sheet 10 by the scanner due to the fact that amounts of stimulable phosphor contained in the stimulable phosphor layer regions 12 differ from each other.

Therefore, in this embodiment, prior to exposing a number of the stimulable phosphor layer regions 12 of the stimulable phosphor sheet 10 to the radioactive labeling substance selectively contained in a number of the absorptive regions 4 formed in the biochemical analysis unit 1, a number of the stimulable phosphor layer regions 12 of the stimulable phosphor sheet 10 are exposed using a planar P-ray source to record radiation data therein, the radiation data recorded in a number of the stimulable phosphor layer regions 12 of the stimulable phosphor sheet 10 are read by the scanner to produce correction data for correcting dispersion in signal intensity to be generated in biochemical analysis data and the correction data are stored in a memory 55 of the data processing apparatus 54.

Figure 15:
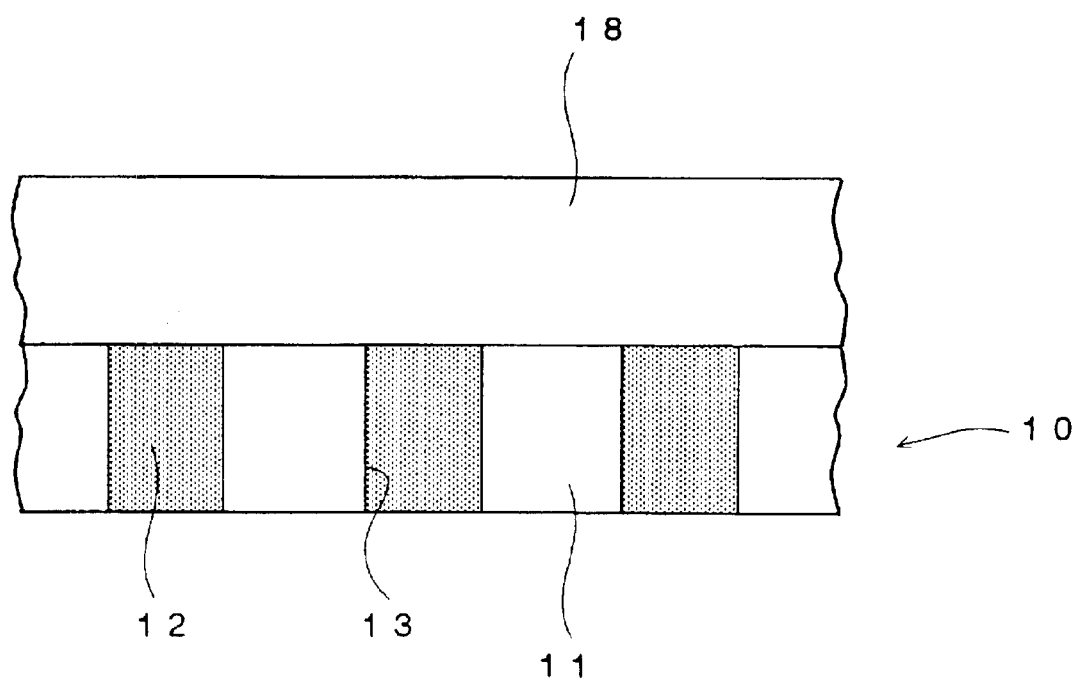
FIG. 15 is a schematic partial cross sectional view showing one example of an exposure device for exposing a number of stimulable phosphor layer regions formed in a support of a stimulable phosphor sheet in order to produce correction data for each of stimulable phosphor layer regions.

FIG. 15 is a schematic partial cross sectional view showing one example of an exposure device for exposing a number of the stimulable phosphor layer regions 12 formed in the support 11 of the stimulable phosphor sheet 10 in order to produce correction data for each of the stimulable phosphor layer regions 12.

As shown in FIG. 15, the exposure device for producing correction data for each of the stimulable phosphor layer regions 12 is constituted as a planar P-ray source 18 for uniformly emitting β rays.

When correction data are to be produced, the stimulable phosphor sheet 10 is superposed on the planar P-ray source 18 and a number of the stimulable phosphor layer regions 12 formed in the support 11 of the stimulable phosphor sheet 10 are exposed to β rays uniformly emitted from the planar β-ray source 18, thereby recording radiation data for correction therein.

The stimulable phosphor sheet 10 wherein recording radiation data for correction are recorded in a number of the stimulable phosphor layer regions 12 is placed on the glass plate 41 of the stage 40.

An instruction signal indicating that correction data are to be produced is then input through the keyboard 71 by the user and the instruction signal is output to the control unit 70.

When the control unit 70 receives the instruction signal, it outputs a drive signal to the filter unit motor 72 in accordance with the instruction signal, thereby moving the filter unit 48 to locate the filter member 51d provided with the filter 52d having a property of transmitting only light having a wavelength corresponding to that of stimulated emission emitted from stimulable phosphor and cutting off light having a wavelength of 640 nm in the optical path of stimulated emission released from the stimulable phosphor layer regions 12.

The control unit 70 further outputs a drive signal to the main scanning stepping motor 65 to move the optical head 35 in the main scanning direction and when it judges based on a detection signal indicating the position of the optical head 35 input from the linear encoder 67 that the optical head 35 has reached a position where a laser beam 24 can be projected onto a first stimulable phosphor layer region 12 among a number of the stimulable phosphor layer regions 12 formed in the support 11 of the stimulable phosphor sheet 10, it outputs a drive stop signal to the main scanning stepping motor 65 and a drive signal to the first stimulating ray source 21, thereby actuating it to emit a laser beam 24 having a wavelength of 640 nm.

A laser beam 24 emitted from the first laser stimulating source 21 passes through the collimator lens 25, thereby being made a parallel beam, and is reflected by the mirror 26.

The laser beam 24 reflected by the mirror 26 passes through the first dichroic mirror 27 and the second dichroic mirror 28 and advances to the mirror 29.

The laser beam 24 advancing to the mirror 29 is reflected by the mirror 29 and advances to the mirror 32 to be reflected thereby.

The laser beam 24 reflected by the mirror 32 passes through the hole 33 of the perforated mirror 34 and advances to the concave mirror 38.

The laser beam 24 advancing to the concave mirror 38 is reflected by the concave mirror 38 and enters the optical head 35.

The laser beam 24 entering the optical head 35 is reflected by the mirror 36 and condensed by the aspherical lens 37 onto the first stimulable phosphor layer region 12 of the stimulable phosphor sheet 10 placed on the glass plate 41 of a stage 40.

In this embodiment, since the stimulable phosphor layer regions 12 are formed by embedding stimulable phosphor in the through-holes 13 formed in the support 11 made of stainless steel, it is possible to effectively prevent the laser beam 24 from scattering in each of the stimulable phosphor layer regions 12 and entering the neighboring stimulable phosphor layer regions 12 to excite stimulable phosphor contained in the neighboring stimulable phosphor layer regions 12.

When the laser beam 24 impinges onto the first stimulable phosphor layer region 12 formed in the support 11 of the stimulable phosphor sheet 10, stimulable phosphor contained in the first stimulable phosphor layer region 12 formed in the stimulable phosphor sheet 10 is excited by the laser beam 24, thereby releasing stimulated emission 45 from the first stimulable phosphor layer region 12.

The stimulated emission 45 released from the first stimulable phosphor layer region 12 is condensed onto the mirror 36 by the aspherical lens 37 provided in the optical head 35 and reflected by the mirror 36 on the side of the optical path of the laser beam 24, thereby being made a parallel beam to advance to the concave mirror 38.

The stimulated emission 45 advancing to the concave mirror 38 is reflected by the concave mirror 38 and advances to the perforated mirror 34.

As shown in FIG. 8, the stimulated emission 45 advancing to the perforated mirror 34 is reflected downward by the perforated mirror 34 formed as a concave mirror and advances to the filter 52d of the filter unit 48.

Since the filter 52d has a property of transmitting only light having a wavelength corresponding to that of stimulated emission emitted from stimulable phosphor and cutting off light having a wavelength of 640 nm, light having a wavelength of 640 nm corresponding to that of the stimulating ray is cut off by the filter 52d and only light having a wavelength corresponding to that of stimulated emission passes through the filter 52d to be photoelectrically detected by the photomultiplier 50.

When a predetermined time has passed after the first stimulating ray source 21 was turned on, the control unit 70 outputs a drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 12.

When the control unit 70 judges based on a detection signal indicating the position of the optical head 35 input from the linear encoder 67 that the optical head 35 has been moved by one pitch equal to the distance between neighboring stimulable phosphor layer regions 12, it outputs a drive signal to the first stimulating ray source 21 to turn it on, thereby causing the laser beam 24 to excite stimulable phosphor contained in a second stimulable phosphor layer region 12 formed in the support 11 of the stimulable phosphor sheet 10 next to the first stimulable phosphor layer region 12.

Similarly to the above, the second stimulable phosphor layer region 12 formed in the support 11 of the stimulable phosphor sheet 10 is irradiated with the laser beam 24 for a predetermined time and when stimulated emission 45 released from the second stimulable phosphor layer region 12 is photoelectrically detected by the photomultiplier 50, the control unit 70 outputs a drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 12.

In this manner, the on and off operation of the first stimulating ray source 21 is repeated in synchronism with the intermittent movement of the optical head 35 and when the control unit 70 judges based on a detection signal indicating the position of the optical head 35 input from the linear encoder 67 that the optical head 35 has been moved by one scanning line in the main scanning direction and that the stimulable phosphor layer regions 12 included in a first line of the stimulable phosphor layer regions 12 formed in the support 11 of the stimulable phosphor sheet 10 have been scanned with the laser beam 24, it outputs a drive signal to the main scanning stepping motor 65, thereby returning the optical head 35 to its original position and outputs a drive signal to the sub-scanning pulse motor 61, thereby causing it to move the movable base plate 63 by one scanning line in the sub-scanning direction.

When the control unit 70 judges based on a detection signal indicating the position of the optical head 35 input from the linear encoder 67 that the optical head 35 has been returned to its original position and judges that the movable base plate 63 has been moved by one scanning line in the sub-scanning direction, similarly to the manner in which the stimulable phosphor layer regions 12 included in the first line of the stimulable phosphor layer regions 12 formed in the support 11 of the stimulable phosphor sheet 10 were sequentially irradiated with the laser beam 24 emitted from the first laser stimulating ray source 21, the stimulable phosphor layer regions 12 included in a second line of the stimulable phosphor layer regions 12 formed in the support 11 of the stimulable phosphor sheet 10 are sequentially irradiated with the laser beam 24 emitted from the first laser stimulating ray source 21, thereby exciting stimulable phosphor contained in the stimulable phosphor layer regions 12 included in the second line and stimulated emission 45 released from the stimulable phosphor layer regions 12 is sequentially and photoelectrically detected by the photomultiplier 50.

When all of the stimulable phosphor layer regions 12 formed in the support 11 of the stimulable phosphor sheet 10 have been scanned with the laser beam 24 in this manner, the first laser stimulating ray source 21 is turned off and analog data produced by photoelectrically detecting stimulated emission by the photomultiplier 50 are converted by the A/D converter 53 to digital data to be forwarded to the data processing apparatus 54.

Since the digital data have been produced by exposing a number of the stimulable phosphor layer regions 12 formed in the support 11 of the stimulable phosphor sheet 10 using the planar β-ray source 18 for uniformly emitting β rays, the signal intensities corresponding to the individual stimulable phosphor layer regions 12 ought to be equal to each other in rerum natura. However, in the case where the stimulable phosphor layer regions 12 cannot be formed by embedding stimulable phosphor in the through-holes 13 so that all of them contain the same amount of stimulable phosphor, even if they are exposed to the same radiation energy, since the radiation energy stored in the individual stimulable phosphor layer regions 12 differs depending upon the amount of stimulable phosphor contained therein, the signal intensities for the individual stimulable phosphor layer regions 12 are not equal to each other. Therefore, when the stimulable phosphor sheet 10 is superposed on the biochemical analysis unit 1, thereby exposing a number of the stimulable phosphor layer regions 12 formed in the support 11 of the stimulable phosphor sheet 10 to the radioactive labeling substance contained in a number of the absorptive regions 4 formed in the substrate 2 of the biochemical analysis unit 1, the stimulable phosphor layer regions 12 are scanned with the laser beam 24, the stimulated emission 45 released therefrom is detected to produce analog data and the analog data are digitized to produce digital data for biochemical analysis, it is impossible to perform quantitative analysis with a high accuracy based on the digital data.

Therefore, in this embodiment, the data processing apparatus 54 is constituted so as to normalize the digital data produced by exposing all of the stimulable phosphor layer regions 12 formed in the support 11 of the stimulable phosphor sheet 10 using the planar β-ray source 18 for uniformly emitting β rays so that the average value of the signal intensities for all of the stimulable phosphor layer regions 12 becomes 1, thereby producing a correction coefficient αi for each of the individual stimulable phosphor layer regions 12 wherein i indicates the position of the individual stimulable phosphor layer regions 12 and to write it in the memory 55.

When biochemical analysis is to be performed, a solution containing specific binding substances such as a plurality of cDNAs are spotted in a number of the absorptive regions 4 formed in the substrate 2 of the biochemical analysis unit 1 shown in FIG. 1 using the spotting device 5 shown in FIG. 2 and a substance derived from a living organism is hybridized with the specific binding substances contained in a number of absorptive regions 4 of the biochemical analysis unit 1 using the hybridization reaction vessel 8. As shown in FIG. 6, the stimulable phosphor sheet 10 is then superposed on the biochemical analysis unit 1, thereby exposing a number of the stimulable phosphor layer regions 12 formed in the support 11 of the stimulable phosphor sheet 10 to the radioactive labeling substance contained in a number of the absorptive regions 4 of the biochemical analysis unit 1.

When the exposure operation is completed, the stimulable phosphor sheet 10 is placed on the glass plate 41 of the stage 40 by the user.

An instruction signal indicating that the stimulable phosphor layer regions 12 formed in the support 11 of the stimulable phosphor sheet 10 are to be scanned with a laser beam 24 is then input by the user through the keyboard 71.

The instruction signal input through the keyboard is output to the control unit 70 and when the control unit 70 receives the instruction signal, it outputs a drive signal to the filter unit motor 72 in accordance with the instruction signal, thereby moving the filter unit 48 to locate the filter member 51d provided with the filter 52d having a property of transmitting only light having a wavelength corresponding to that of stimulated emission emitted from stimulable phosphor and cutting off light having a wavelength of 640 nm in the optical path of stimulated emission released from the stimulable phosphor layer regions 12.

The control unit 70 further outputs a drive signal to the main scanning stepping motor 65 to move the optical head 35 in the main scanning direction and when it judges based on a detection signal indicating the position of the optical head 35 input from the linear encoder 67 that the optical head 35 has reached a position where a laser beam 24 can be projected onto a first stimulable phosphor layer region 12 among a number of the stimulable phosphor layer regions 12 formed in the support 11 of the stimulable phosphor sheet 10, it outputs a drive stop signal to the main scanning stepping motor 65 and a drive signal to the first stimulating ray source 21, thereby actuating it to emit a laser beam 24 having a wavelength of 640 nm.

A laser beam 24 emitted from the first laser stimulating source 21 passes through the collimator lens 25, thereby being made a parallel beam, and is reflected by the mirror 26.

The laser beam 24 reflected by the mirror 26 passes through the first dichroic mirror 27 and the second dichroic mirror 28 and advances to the mirror 29.

The laser beam 24 advancing to the mirror 29 is reflected by the mirror 29 and advances to the mirror 32 to be reflected thereby.

The laser beam 24 reflected by the mirror 32 passes through the hole 33 of the perforated mirror 34 and advances to the concave mirror 38.

The laser beam 24 advancing to the concave mirror 38 is reflected by the concave mirror 38 and enters the optical head 35.

The laser beam 24 entering the optical head 35 is reflected by the mirror 36 and condensed by the aspherical lens 37 onto the first stimulable phosphor layer region 12 of the stimulable phosphor sheet 10 placed on the glass plate 41 of a stage 40.

In this embodiment, since the stimulable phosphor layer regions 12 are formed by embedding stimulable phosphor in the through-holes 13 formed in the support 11 made of stainless steel, it is possible to effectively prevent the laser beam 24 from scattering in each of the stimulable phosphor layer regions 12 and entering the neighboring stimulable phosphor layer regions 12 to excite stimulable phosphor contained in the neighboring stimulable phosphor layer regions 12.

When the laser beam 24 impinges onto the first stimulable phosphor layer region 12 formed in the support 11 of the stimulable phosphor sheet 10, stimulable phosphor contained in the first stimulable phosphor layer region 12 formed in the stimulable phosphor sheet 10 is excited by the laser beam 24, thereby releasing stimulated emission 45 from the first stimulable phosphor layer region 12.

The stimulated emission 45 released from the first stimulable phosphor layer region 12 is condensed onto the mirror 36 by the aspherical lens 37 provided in the optical head 35 and reflected by the mirror 36 on the side of the optical path of the laser beam 24, thereby being made a parallel beam to advance to the concave mirror 38.

The stimulated emission 45 advancing to the concave mirror 38 is reflected by the concave mirror 38 and advances to the perforated mirror 34.

As shown in FIG. 8, the stimulated emission 45 advancing to the perforated mirror 34 is reflected downward by the perforated mirror 34 formed as a concave mirror and advances to the filter 52d of the filter unit 48.

Since the filter 52d has a property of transmitting only light having a wavelength corresponding to that of stimulated emission emitted from stimulable phosphor and cutting off light having a wavelength of 640 nm, light having a wavelength of 640 nm corresponding to that of the stimulating ray is cut off by the filter 52d and only light having a wavelength corresponding to that of stimulated emission passes through the filter 52d to be photoelectrically detected by the photomultiplier 50.

Analog data produced by photoelectrically detecting stimulated emission by the photomultiplier 50 are converted by the A/D converter 53 to digital data to be forwarded to the data processing apparatus 54.

When the digital data are input from the A/D converter 53, the data processing apparatus 54 reads the correction coefficient $\alpha 1$ corresponding to the first stimulable phosphor layer region 12 from the memory 55 based on a detection signal indicating the position of the optical head 35 input from the linear encoder 67 and corrects the digital data, thereby producing biochemical analysis data corresponding to the first stimulable phosphor layer region 12 to store them in the memory 55.

When a predetermined time, for example, several microseconds, has passed after the first stimulating ray source 21 was turned on, the control unit 70 outputs an drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 12.

When the control unit 70 judges based on a detection signal indicating the position of the optical head 35 input from the linear encoder 67 that the optical head 35 has been moved by one pitch equal to the distance between neighboring stimulable phosphor layer regions 12 and located the position where the second stimulable phosphor layer region 12 formed in the support 11 of the stimulable phosphor sheet 10 can be irradiated with the laser beam 24, it outputs a drive signal to the first stimulating ray source 21 to turn it on, thereby causing the laser beam 24 to excite stimulable phosphor contained in the second stimulable phosphor layer region 12 formed in the support 11 of the stimulable phosphor sheet 10 next to the first stimulable phosphor layer region 12.

Similarly to the above, the second stimulable phosphor layer region 12 formed in the support 11 of the stimulable phosphor sheet 10 is irradiated with the laser beam 24 for a predetermined time, thereby exciting stimulable phosphor contained in the second stimulable phosphor layer region 12 and stimulated emission 45 released from the second stimulable phosphor layer region 12 is photoelectrically detected by the photomultiplier 50 to produce analog data and the analog data are digitized by the A/D converter 53 to digital data.

When the digital data are input from the A/D converter 53, the data processing apparatus 54 reads the correction coefficient $\alpha 2$ corresponding to the second stimulable phosphor layer region 12 from the memory 55 based on a detection signal indicating the position of the optical head 35 input from the linear encoder 67 and corrects the digital data, thereby producing biochemical analysis data corresponding to the second stimulable phosphor layer region 12 to store them in the memory 55.

At the same time, the control unit 70 outputs an drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 12.

In this manner, the on and off operation of the first stimulating ray source 21 is repeated in synchronism with the intermittent movement of the optical head 35 and biochemical analysis data corresponding to the stimulable phosphor layer regions 12 included in the first line of the stimulable phosphor layer regions 12 formed in the support 11 of the stimulable phosphor sheet 10 are sequentially produced and stored in the memory 55.

As a result, when the control unit 70 judges based on a detection signal indicating the position of the optical head 35 input from the linear encoder 67 that the optical head 35 has been moved by one scanning line in the main scanning direction and that the stimulable phosphor layer regions 12 included in a first line of the stimulable phosphor layer regions 12 formed in the support 11 of the stimulable phosphor sheet 10 have been scanned with the laser beam 24, it outputs a drive signal to the main scanning stepping motor 65, thereby returning the optical head 35 to its original position and outputs a drive signal to the sub-scanning pulse motor 61, thereby causing it to move the movable base plate 63 by one scanning line in the sub-scanning direction.

When the control unit 70 judges based on a detection signal indicating the position of the optical head 35 input from the linear encoder 67 that the optical head 35 has been returned to its original position and judges that the movable base plate 63 has been moved by one scanning line in the sub-scanning direction, similarly to the manner that the stimulable phosphor layer regions 12 included in the first line of the stimulable phosphor layer regions 12 formed in the support 11 of the stimulable phosphor sheet 10 were sequentially irradiated with the laser beam 24 emitted from the first laser stimulating ray source 21, the stimulable phosphor layer regions 12 included in a second line of the stimulable phosphor layer regions 12 formed in the support 11 of the stimulable phosphor sheet 10 are sequentially irradiated with the laser beam 24 emitted from the first laser stimulating ray source 21, thereby exciting stimulable phosphor contained in the stimulable phosphor layer regions 12 included in the second line and stimulated emission 45 released from the stimulable phosphor layer regions 12 is sequentially and photoelectrically detected by the photomultiplier 50.

When all of the stimulable phosphor layer regions 12 formed in the support 11 of the stimulable phosphor sheet 10 have been scanned with the laser beam 24, the first laser stimulating ray source 21 is turned off and analog data produced by photoelectrically detecting stimulated emission by the photomultiplier 50 are converted by the A/D converter 53 to digital data to be forwarded to the data processing apparatus 54.

Each time digital data are input, the data processing apparatus 54 reads from the memory 55, based on a detection signal indicating the position of the optical head 35 input from the linear encoder 67, the correction coefficient αi corresponding to the stimulable phosphor layer region 12 based on which the digital data are produced and corrects the digital data to produce biochemical analysis data corresponding to the stimulable phosphor layer region 12 and stores them in the memory 55.

In this manner, when all of the stimulable phosphor layer regions 12 formed in the support 11 of the stimulable phosphor sheet 10 have been scanned with the laser beam 24 emitted from the first laser stimulating ray source 21, thereby exciting stimulable phosphor contained in the stimulable phosphor layer regions 12, analog data produced by photoelectrically detecting stimulated emission 45 released from the stimulable phosphor by the photomultiplier 50 are converted to digital data by the A/D converter 53 to be forwarded to the data processing apparatus 54, the digital data are corrected, thereby producing biochemical analysis data corresponding to each of the stimulable phosphor layer regions 12 formed in the support 11 of the stimulable phosphor sheet 10 and they are stored in the memory 55, the control unit 70 outputs a drive stop signal to the first laser stimulating ray source 21, thereby turning it off.

On the other hand, when fluorescence data of a fluorescent substance recorded in a number of the absorptive regions 4 formed in the substrate 2 of the biochemical analysis unit 1 are to be read to produce biochemical analysis data, the biochemical analysis unit 1 is first set by the user on the glass plate 41 of the stage 40.

An instruction signal identifying the kind of a fluorescent substance such as a fluorescent dye labeling a substance derived from a living organism is then input by the user through the keyboard 71.

When the kind of fluorescent substance is input by the user through the keyboard 71, the control unit 70 selects a laser stimulating ray source for emitting a laser beam 24 of a wavelength capable of efficiently stimulating the input fluorescent substance from among the first laser stimulating ray source 21, the second laser stimulating ray source 22 and the third laser stimulating ray source 23 and selects the filter member for cutting light having a wavelength of the laser beam 24 to be used for stimulating the input fluorescent substance and transmitting light having a longer wavelength than that of the laser beam to be used for stimulation from among the three filter members 51a, 51b and 51c.

Similarly to the case where radiation data recorded in a number of the stimulable phosphor layer regions 12 of the stimulable phosphor sheet 10 are read, all of the absorptive regions 4 formed in the substrate 2 of the biochemical analysis unit 1 are scanned by the laser beam 24, thereby stimulating a fluorescent substance contained in the absorptive regions 4, fluorescence emission 45 released from the fluorescent substance is photoelectrically detected by the photomultiplier 50 to produce analog data and the analog data are digitized by the A/D converter 53 to be forwarded to the data processing apparatus 54.

According to the above described embodiment, when a number of the stimulable phosphor layer regions 12 formed in the support 11 of the stimulable phosphor sheet 10 are exposed to the radioactive labeling substance contained in a number of the absorptive regions 4 formed in the substrate 2 of the biochemical analysis unit 1, although electron beams (β rays) having high energy are released from the radioactive labeling substance contained in the absorptive regions 4 of the biochemical analysis unit 1, since the substrate 2 of the biochemical analysis unit 1 is made of stainless steel and capable of attenuating radiation energy, electron beams (β rays) released from the radioactive labeling substance contained in the absorptive regions 4 of the biochemical analysis unit 1 can be effectively prevented from scattering in the substrate 2 of the biochemical analysis unit 1. Further, since a number of the stimulable phosphor layer regions 12 of the stimulable phosphor sheet 10 are formed by embedding stimulable phosphor in a number of the through-holes 13 formed in the support 11 made of stainless steel and the support 11 made of stainless steel capable of attenuating radiation energy in the same pattern as that of a number of the absorptive regions 4 formed in the substrate 2 of the biochemical analysis unit 1 and the stimulable phosphor 10 is superposed on the biochemical analysis unit 1 in such a manner that each of the stimulable phosphor layer regions 12 faces the corresponding absorptive region 4 formed in the substrate 2 of the biochemical analysis unit 1, electron beams (β rays) released from the radioactive labeling substance contained in the absorptive regions 4 of the biochemical analysis unit 1 can be effectively prevented from scattering in the support 11 of the stimulable phosphor sheet 10. Therefore, since it is possible to selectively expose only the stimulable phosphor layer region 12 each of the absorptive regions 4 faces to the electron beams (β rays) released from the radioactive labeling substance contained in each of the absorptive regions 4, it is possible to prevent noise from being generated in biochemical analysis data produced by photoelectrically detecting stimulated emission 45 released from the stimulable phosphor layer regions 12 of the stimulable phosphor sheet 10 in response to the stimulation with the laser beam 24 and to produce biochemical analysis data having a high quantitative accuracy.

Further, since it is difficult to embed stimulable phosphor in a number of the through-holes 13 formed in the support 11 so that the amount of stimulable phosphor contained in each of the stimulable phosphor layer regions 12 is constant, the amounts of radiation energy stored in the individual stimulable phosphor layer regions 12 differ from each other even if they are exposed to the same radiation energy and, therefore, dispersion in signal intensity is generated in biochemical analysis data. However, according to the above described embodiment, since the correction coefficient $\alpha i$ for correcting dispersion in signal intensities in biochemical analysis data caused by difference in an amount of stimulable phosphor depending upon the stimulable phosphor layer regions 4 is produced in advance for each of the stimulable phosphor layer regions 12 and stored in the memory 55 and digital data produced by scanning each of the stimulable phosphor layer regions 12 with the laser beam 24 are corrected using the correction coefficient $\alpha i$ read from the memory 55 based on a detection signal indicating the position of the optical head 35 input from the linear encoder 67, thereby producing biochemical analysis data, the dispersion in signal intensities in biochemical analysis data caused by difference in the amount of stimulable phosphor depending upon the stimulable phosphor layer regions 4 can be corrected and quantitative analysis can be performed with a high accuracy.

Figure 16:
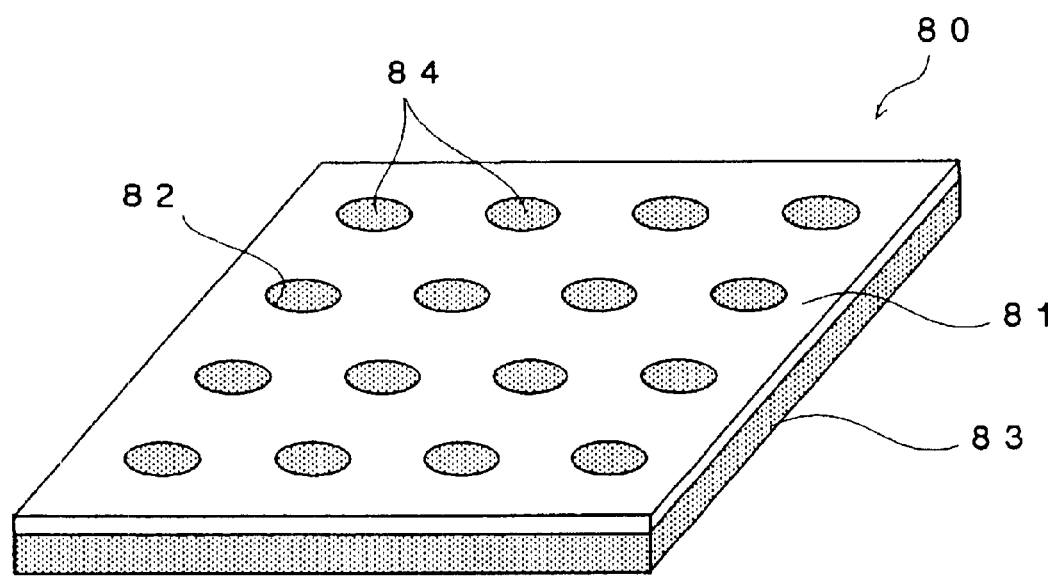
FIG. 16 is a schematic perspective view showing a biochemical analysis unit used for a biochemical analysis data producing method which is another preferred embodiment of the present invention.
Figure 17:
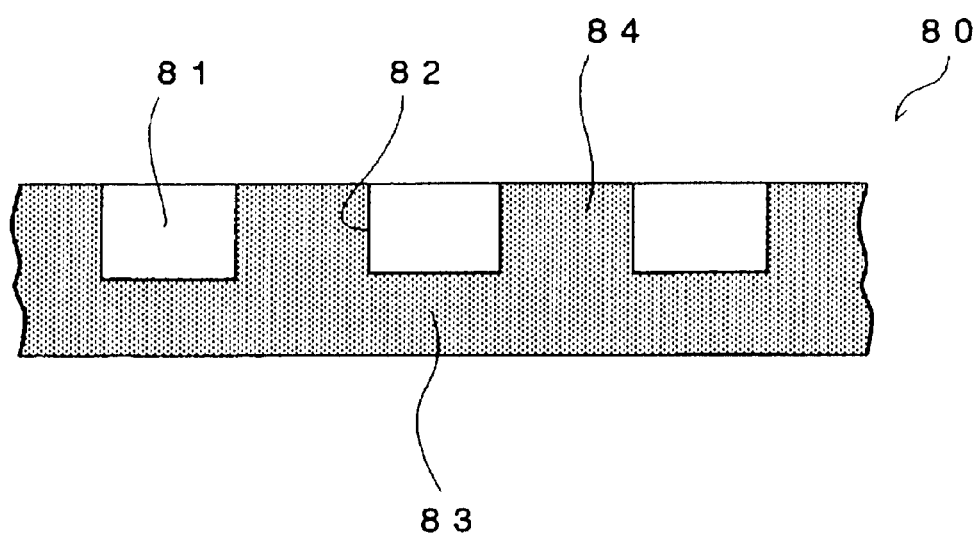
FIG. 17 is a schematic partial cross sectional view showing a biochemical analysis unit used for a biochemical analysis data producing method which is another preferred embodiment of the present invention.

FIG. 16 is a schematic perspective view showing a biochemical analysis unit used for a biochemical analysis data producing method which is another preferred embodiment of the present invention and FIG. 17 is a schematic partial cross sectional view thereof.

As shown in FIGS. 16 and 17, a biochemical analysis unit 80 includes a substrate 81 made of stainless steel and regularly formed with a number of substantially circular through-holes 82 and a number of absorptive regions 84 are dot-like and regularly formed by pressing an absorptive membrane 83 made of nylon-6 into a number of the through-holes 82 formed in the substrate 81 using a calender processing apparatus (not shown).

The surface of the substrate 81 is coated with an adhesive agent 85 and the absorptive membrane 83 is pressed into a number of the through-holes 82 formed in the substrate 81 via the adhesive agent, thereby firmly integrating the substrate 81 and the absorptive membrane 83 and improving the durability of the biochemical analysis unit 80.

Although not accurately shown in FIG. 16, in this embodiment, the through-holes 82 are formed in the substrate 81 so that substantially circular absorptive regions 84 having a size of about 0.07 cm$^2$ are regularly formed in the manner of a matrix of 120 columns×160 lines and, therefore, 19,200 absorptive regions 84 are formed.

As shown in FIG. 17, in this embodiment, the biochemical analysis unit 80 is formed by pressing the absorptive membrane into a number of the through-holes 82 formed in the substrate 81 so that the surface of the absorptive region 84 and the surface of the substrate 81 lie at the same height level.

Similarly to the embodiment shown in FIGS. 1 to 14, in this embodiment, a solution containing specific binding substances such as a plurality of cDNAs is spotted using the spotting device 5 in a number of the absorptive regions 84 formed in the biochemical analysis unit 80 and fixed therein.

Further, as shown in FIG. 3, the biochemical analysis unit 80 is set in the hybridization reaction vessel 8 accommodating a hybridization solution 9 containing a substance derived from a living organism labeled with a radioactive labeling substance and a substance derived from a living organism labeled with a fluorescent substance such as a fluorescent dye and the substance derived from a living organism labeled with a radioactive labeling substance and the substance derived from a living organism labeled with a fluorescent substance such as a fluorescent dye are selectively hybridized with the specific binding substances such as a plurality of cDNAs fixed in a number of the absorptive regions 84 formed in the biochemical analysis unit 80.

In this manner, radiation data and fluorescence data are recorded in a number of the absorptive regions 84 formed in the biochemical analysis unit 80.

Similarly to the previous embodiment, the fluorescence data recorded in a number of the absorptive regions 84 formed in the biochemical analysis unit 80 are read by the scanner shown in FIGS. 7 to 14 and biochemical analysis data are produced.

On the other hand, radiation data recorded in a number of the absorptive regions 84 formed in the biochemical analysis unit 80 are transferred to a stimulable phosphor sheet similarly to the embodiment shown in FIGS. 1 to 14 and read by the scanner shown in FIGS. 7 to 14, thereby producing biochemical analysis data.

Figure 18:
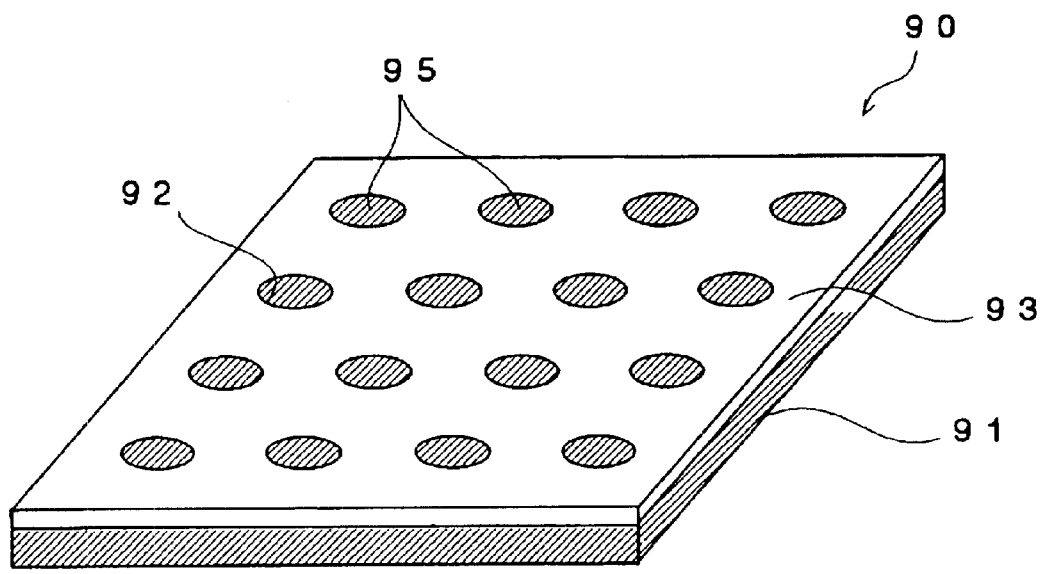
FIG. 18 is a schematic perspective view showing a stimulable phosphor sheet used in a biochemical analysis data producing method which is another preferred embodiment of the present invention.
Figure 19:
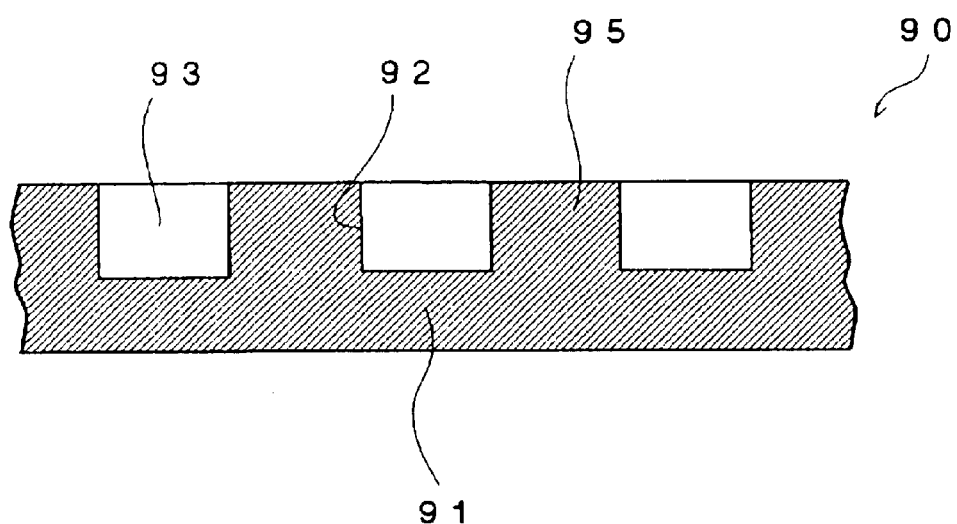
FIG. 19 is a schematic partial cross-sectional view showing a stimulable phosphor sheet used in a biochemical analysis data producing method which is another preferred embodiment of the present invention.

FIG. 18 is a schematic perspective view showing a stimulable phosphor sheet used in a biochemical analysis data producing method which is another preferred embodiment of the present invention and FIG. 19 is a schematic partial cross-sectional view thereof.

As shown in FIGS. 18 and 19, a stimulable phosphor sheet 90 according to this embodiment includes a stimulable phosphor membrane 91 containing stimulable phosphor and a stainless steel substrate 93 regularly formed with a number of through-holes 92 and the stimulable phosphor membrane 91 is pressed into a number of the through-holes 92 formed in the stainless steel substrate 93 using a calender processing apparatus (not shown), thereby dot-like forming a number of stimulable phosphor regions 95 at positions corresponding to a number of the through-holes 92 of the stainless steel substrate 93, The surface of the stainless steel substrate 93 is coated with an adhesive agent 96 and the stimulable phosphor membrane 91 is pressed into a number of the through-holes 92 formed in the stainless steel substrate 93 via the adhesive agent 96, thereby firmly integrating the stimulable phosphor membrane 91 and the stainless steel substrate 93 and improving the durability of the stimulable phosphor sheet 90.

A number of the through-holes 92 are formed in the stainless steel substrate 93 in the same pattern as that of a number of the absorptive regions 84 formed in the biochemical analysis unit 80 and the individual through-holes have the same size of that of the number of the absorptive regions 84.

Therefore, although not accurately shown in FIG. 18, in this embodiment, substantially circular stimulable phosphor layer regions 95 having a size of about 0.07 cm$^2$ are regularly formed in the manner of a matrix of 120 columns× 160 lines in the stainless steel substrate 93 and, therefore, 19,200 stimulable phosphor layer regions 94 are dot-like formed.

Further, as shown in FIG. 19, in this embodiment, the stimulable phosphor sheet 90 is formed by pressing the stimulable phosphor membrane 91 in the through-holes 92 formed in the stainless steel substrate 93 so that the surface of the stainless steel substrate 93 and the surfaces of the stimulable phosphor layer regions 95 lie at the same height level.

Figure 20:
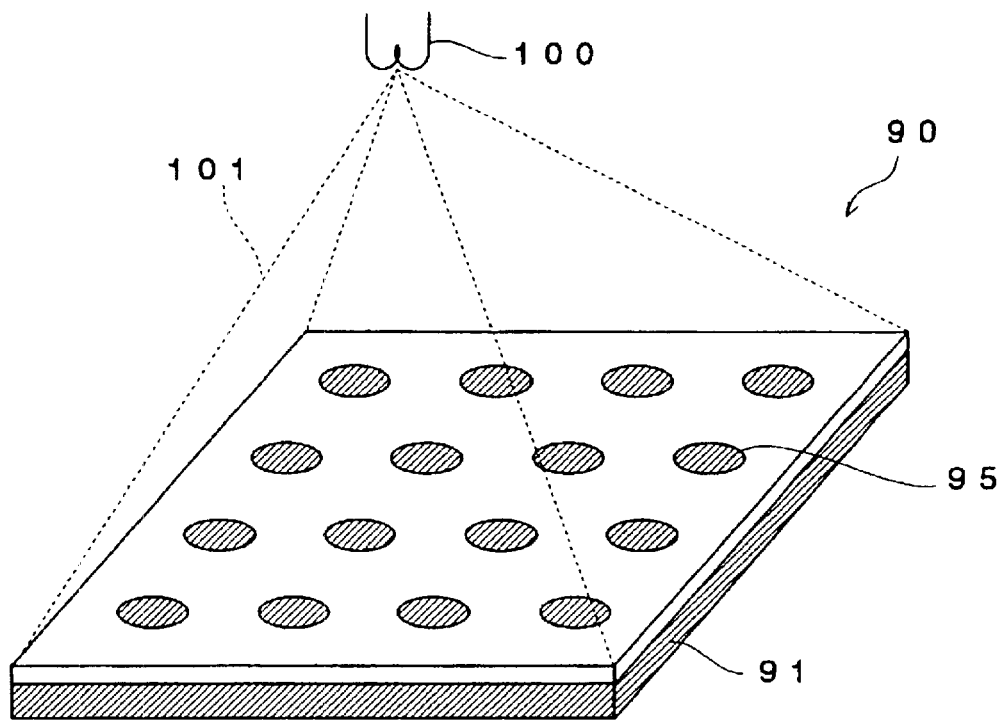
FIG. 20 is a schematic perspective view showing another example of an exposure device for exposing a number of stimulable phosphor layer regions formed in a stainless steel substrate of a stimulable phosphor sheet in order to produce correction data for each of stimulable phosphor layer regions.

FIG. 20 is a schematic perspective view showing another example of an exposure device for exposing a number of the stimulable phosphor layer regions 95 formed in the stainless steel substrate 93 of the stimulable phosphor sheet 90 in order to produce correction data for each of the stimulable phosphor layer regions 95.

As shown in FIG. 20, an exposure device is provided with an ultra-violet ray source 100 for emitting ultra-violet rays and a number of the stimulable phosphor layer regions 95 formed in the stimulable phosphor sheet 90 are exposed to ultra-violet rays 101 emitted from the ultra-violet ray source 100.

In this embodiment, since the energy of ultra-violet rays 101 to be projected onto all of the stimulable phosphor layer regions 95 is not the same, the relationship between the positions of the stimulable phosphor layer regions 95 formed in the stimulable phosphor sheet 90 and the amount of ultra-violet rays 101 to be projected thereonto is experimentally determined in advance and input by the user to the scanner through the keyboard 71 and light amount correction data are written in a memory 55.

After all of the stimulable phosphor layer regions 95 have been exposed to ultra-violet rays 101 emitted from the ultra-violet ray source 100 in this manner, similarly to the previous embodiment, the stimulable phosphor sheet 90 is placed on the glass plate 41 of the stage 40 and digital data are produced by the scanner.

When digital data are produced, the data processing apparatus 54 reads the light amount correction data from the memory 55 and normalizes the digital data so that the average value of the signal intensities for all of the stimulable phosphor layer regions 95 becomes 1, thereby producing a correction coefficient $\alpha i$ for each of the individual stimulable phosphor layer regions 95 wherein i indicates the position of the individual stimulable phosphor layer regions 95 and to write it in the memory 55.

After the correction coefficient $\alpha i$ for each of the individual stimulable phosphor layer regions 95 has been produced and stored in the memory 55, similarly to the previous embodiment, a number of the stimulable phosphor layer regions 95 formed in the stimulable phosphor sheet 90 are exposed to a radioactive labeling substance contained in a number of the absorptive regions 84 formed in the biochemical analysis unit 80, whereby radiation data are recorded in a number of the stimulable phosphor layer regions 95 formed in the stimulable phosphor sheet 90.

Figure 21:
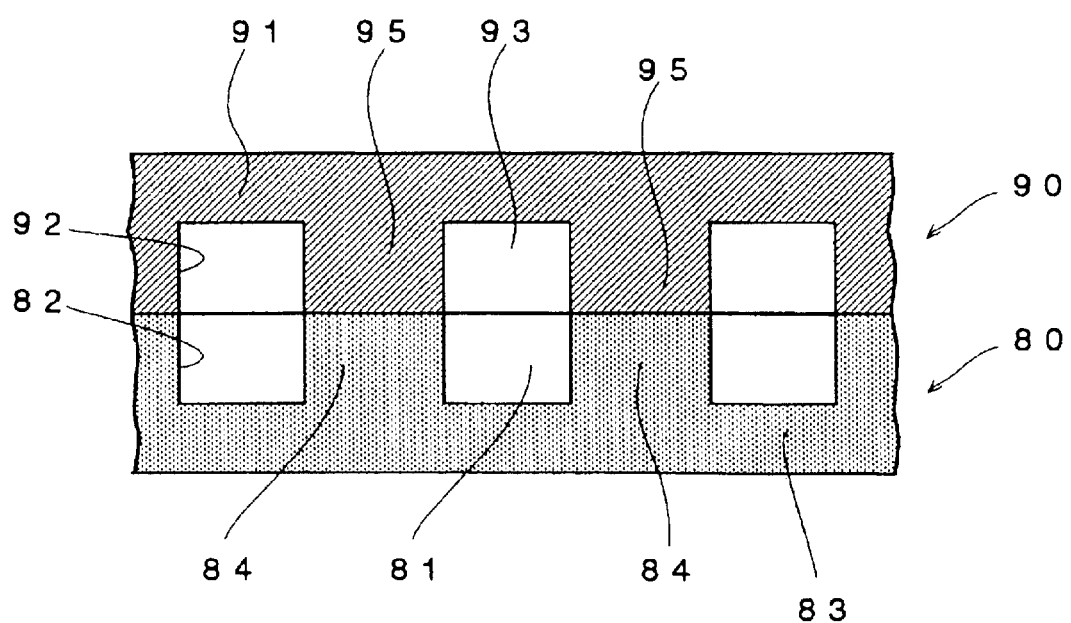
FIG. 21 is a schematic partial cross-sectional view showing a method for exposing a number of stimulable phosphor layer regions formed in a stimulable phosphor sheet shown in FIGS. 18 and 19 to a radioactive labeling substance contained in a number of absorptive regions formed in a biochemical analysis unit shown in FIGS. 16 and 17.

FIG. 21 is a schematic partial cross-sectional view showing a method for exposing a number of the stimulable phosphor layer regions 95 formed in the stimulable phosphor sheet 90 shown in FIGS. 18 and 19 to the radioactive labeling substance contained in a number of the absorptive regions 84 formed in the biochemical analysis unit 80 shown in FIGS. 16 and 17.

As shown in FIG. 21, when a number of the stimulable phosphor layer regions 95 formed in the stimulable phosphor sheet 90 are to be exposed to the radioactive labeling substance contained in a number of the absorptive regions 84 formed in the biochemical analysis unit 80, the stimulable phosphor sheet 90 is superposed on the biochemical analysis unit 80 in such a manner that each of the stimulable phosphor layer regions 95 formed in the stimulable phosphor sheet 90 faces a corresponding absorptive region 4 formed in the biochemical analysis unit 80.

In this embodiment, since the biochemical analysis unit 80 is formed by pressing the absorptive membrane 83 into a number of the through-holes 83 formed in the substrate 81 made of stainless steel, the biochemical analysis unit 80 hardly stretches or shrinks even when it is subjected to liquid processing such as hybridization and, therefore, it is possible to easily and accurately superpose the stimulable phosphor sheet 90 on the biochemical analysis unit 80 so that each of the stimulable phosphor layer regions 95 formed in the stimulable phosphor sheet 90 accurately faces the corresponding absorptive region 84 formed in the biochemical analysis unit 80, thereby exposing the stimulable phosphor layer regions 95.

In this manner, each of the stimulable phosphor layer regions 95 formed in the stimulable phosphor sheet 90 is kept to face the corresponding absorptive region 84 formed in the biochemical analysis unit 80 for a predetermined time period, whereby a number of the stimulable phosphor layer regions 95 formed in the stimulable phosphor sheet 90 are exposed to the radioactive labeling substance contained in a number of the absorptive regions 84 formed in the biochemical analysis unit 80.

During the exposure operation, electron beams ($\beta$ rays) are released from the radioactive labeling substance contained in the absorptive regions 84 of the biochemical analysis unit 80. However, since a number of the absorptive regions 84 of the biochemical analysis unit 80 are formed by pressing the absorptive membrane 83 made of nylon-6 into a number of the through-holes 82 formed in the substrate 81 made of stainless steel and the substrate 81 made of stainless steel capable of attenuating radiation energy is present around each of the absorptive regions 84, electron beams ($\beta$ rays) released from the radioactive labeling substance contained in the absorptive regions 84 of the biochemical analysis unit 80 can be efficiently prevented from scattering in the substrate 81 of the biochemical analysis unit 80. Further, since a number of the stimulable phosphor layer regions 95 of the stimulable phosphor sheet 90 are formed by pressing the stimulable phosphor membrane 91 into a number of the through-holes 92 formed in the stainless steel substrate 93 and the stainless steel substrate 93 capable of attenuating radiation energy is present around each of the stimulable phosphor layer regions 95, electron beams ($\beta$ rays) released from the radioactive labeling substance contained in the absorptive regions 84 of the biochemical analysis unit 80 can be efficiently prevented from scattering in the stainless steel substrate 93 of the stimulable phosphor sheet 90. Therefore, it is possible to selectively expose only the stimulable phosphor layer region 95 each of the absorptive regions 84 faces to the electron beams ($\beta$ rays) released from the radioactive labeling substance contained in each of the absorptive regions 84.

In this manner, radiation data of a radioactive labeling substance are recorded in a number of the stimulable phosphor layer regions 95 formed in the stimulable phosphor sheet 90 and the radiation data recorded in a number of the stimulable phosphor layer regions 95 formed in the stimulable phosphor sheet 90 are read by a scanner to produce biochemical analysis data.

Figure 22:
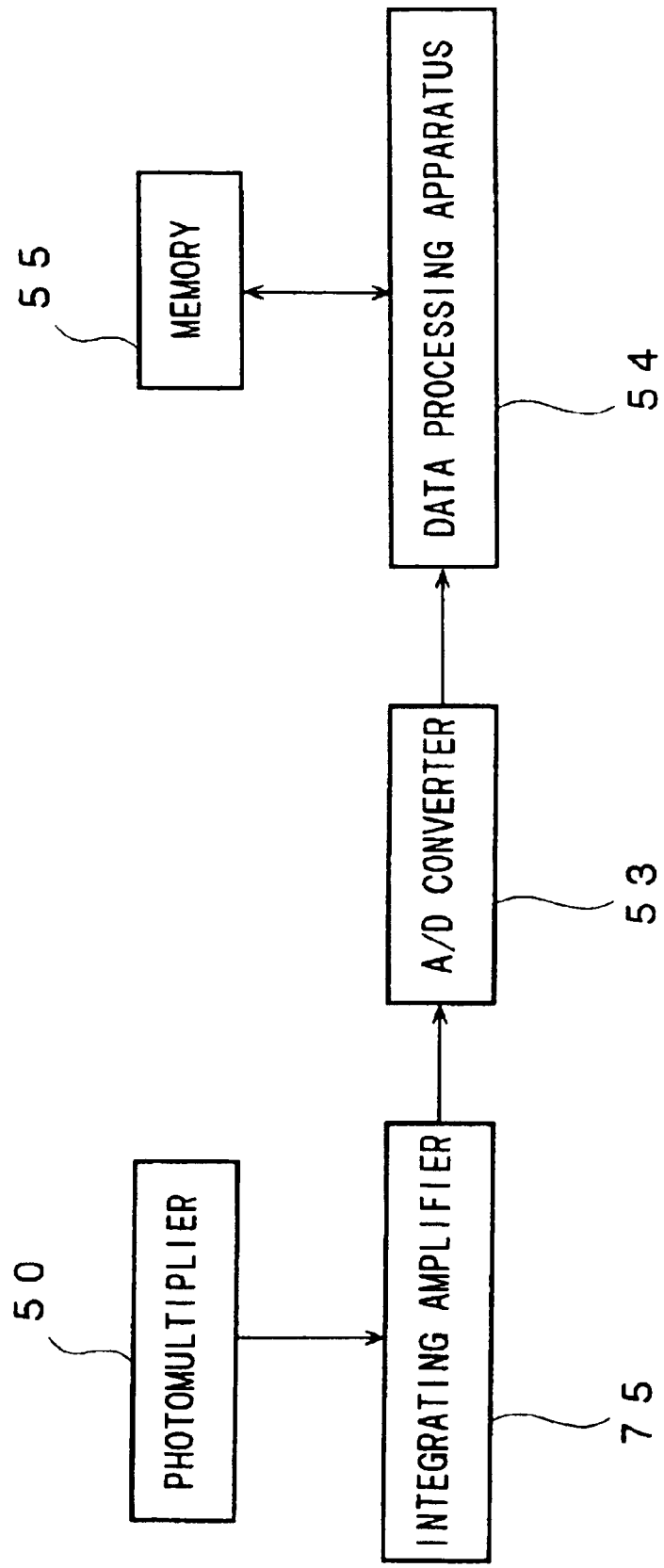
FIG. 22 is a block diagram of a photomultiplier, a data processing apparatus and peripheral devices thereof of a scanner which is another preferred embodiment of the present invention.

FIG. 22 is a block diagram of the photomultiplier 50, the data processing apparatus 54 and peripheral devices thereof of a scanner which is another preferred embodiment of the present invention.

As shown in FIG. 22, the scanner according to this embodiment includes an integrating amplifier 75 for integrating analog signals produced by the photomultiplier 50 and an integrated value of analog signals produced by the integrating amplifier 75 is digitized by the A/D converter 53 and stored in the memory 55 by the data processing apparatus 54.

In this embodiment, each of the stimulable phosphor layer regions 95 of the stimulable phosphor 90 is irradiated with the laser beam 24 to excite stimulable phosphors contained in the stimulable phosphor layer region 95 and stimulated emission released from the stimulable phosphor layer regions 95 is photoelectrically detected by the photomultiplier 50 to produce analog data. The thus produced analog data are integrated by the integrating amplifier 75.

When a predetermined time, for example, several microseconds, have passed after the first stimulating ray source 21 was turned on, the control unit 70 outputs a drive stop signal to the first laser stimulating ray source 21 and outputs analog data integrated by the integrating amplifier 75 to the A/D converter 53. The control unit 70 then causes the A/D converter 53 to digitize the integrated analog data and to output the digital data to the data processing apparatus 54.

When the digital data are input from the A/D converter 53, the data processing apparatus 54 reads the correction coefficient $\alpha i$ corresponding to the stimulable phosphor layer region 95 from the memory 55 based on a detection signal indicating the position of the optical head 35 input from the linear encoder 67, corrects the digital data to produce biochemical analysis data corresponding to the stimulable phosphor layer region 95 and stores the biochemical analysis data in the memory 55.

At the same time, the control unit 70 outputs a drive signal to the main scanning motor 65, thereby moving the optical head 35 by one pitch equal to the distance between neighboring stimulable phosphor layer regions 95 and when the control unit 70 judges based on a detection signal indicating the position of the optical head 35 input from the linear encoder 67 that the optical head 35 has been moved by one pitch equal to the distance between neighboring stimulable phosphor layer regions 95, it outputs a drive signal to the first stimulating ray source 21 to turn it on, thereby causing the laser beam 24 to excite stimulable phosphor contained in a neighboring stimulable phosphor layer region 95 formed in the stimulable phosphor sheet 90.

According to this embodiment, analog data produced by irradiating each of the stimulable phosphor layer regions 95 formed in the stimulable phosphor sheet 90 with the laser beam 24 to excite stimulable phosphor contained in the stimulable phosphor layer regions 95 and photoelectrically detecting stimulated emission 45 released from the stimulable phosphor layer regions 95 by the photomultiplier 50 are integrated by the integrating amplifier 75 and the integrated analog data are digitized by the A/D converter 53, thereby producing biochemical analysis data corresponding to each of the stimulable phosphor layer regions 95. Therefore, even when the radiation energy stored in the stimulable phosphor layer region 95 is low and the intensity of stimulated emission released from the stimulable phosphor layer region 95 is low, it is possible to produce biochemical analysis data having high signal intensity with high sensitivity.

Figure 23:
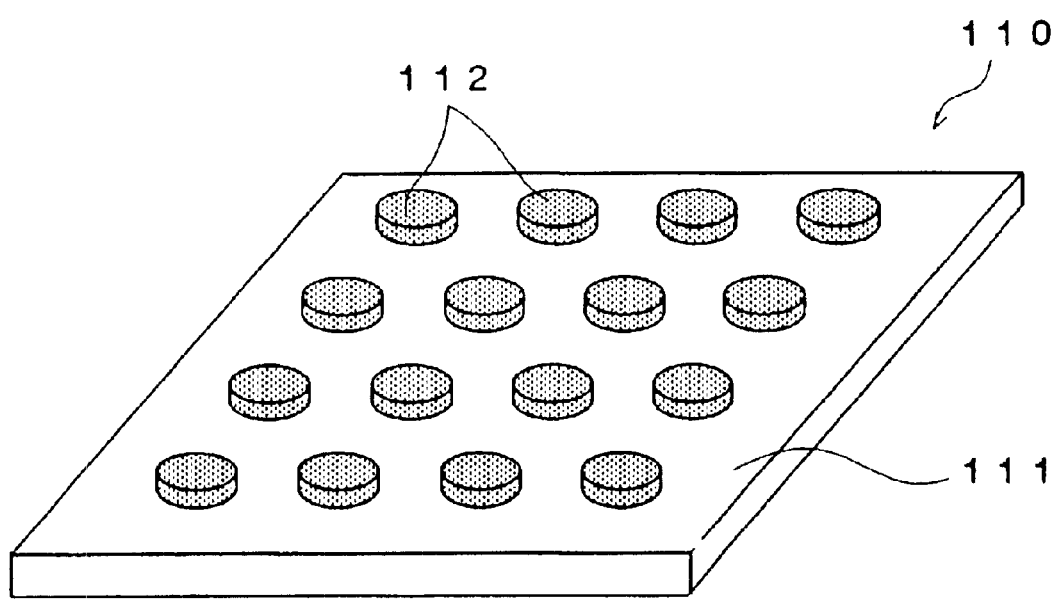
FIG. 23 is a schematic perspective view showing a stimulable phosphor sheet used in a biochemical analysis data producing method which is a further preferred embodiment of the present invention.

FIG. 23 is a schematic perspective view showing a stimulable phosphor sheet used in a biochemical analysis data producing method which is a further preferred embodiment of the present invention.

As shown in FIG. 23, a stimulable phosphor sheet 110 according to this embodiment includes a support 111 made of stainless steel and a number of stimulable phosphor layer regions 112 are regularly and dot-like formed on the surface of the support 111.

Although not accurately shown in FIG. 23, in this embodiment, substantially circular stimulable phosphor layer regions 112 having a size of about 0.07 cm$^2$ are regularly formed in the same pattern as that of a number of the absorptive regions 84 formed in the biochemical analysis unit 80 in the manner of a matrix of 120 columns×160 lines on the support 111 and, therefore, 19,200 stimulable phosphor layer regions 112 are dot-like formed.

Figure 24:
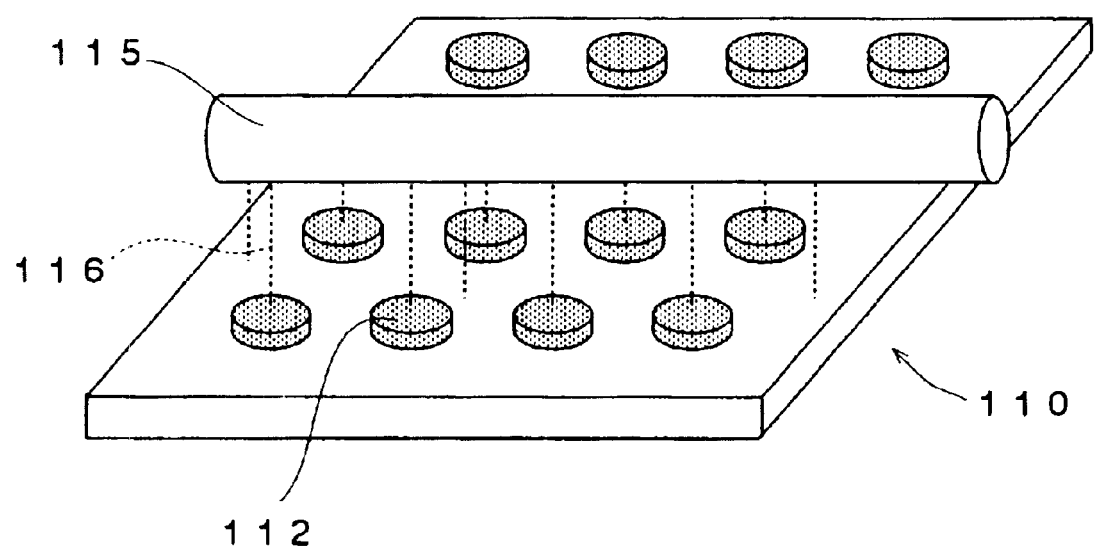
FIG. 24 is a schematic perspective view showing a further example of an exposure device for exposing a number of stimulable phosphor layer regions formed in a support of a stimulable phosphor sheet in order to produce correction data for each of stimulable phosphor layer regions.

FIG. 24 is a schematic perspective view showing a further example of an exposure device for exposing a number of the stimulable phosphor layer regions 112 formed on the support 111 of the stimulable phosphor sheet 110 in order to produce correction data for each of the stimulable phosphor layer regions 112.

As shown in FIG. 24, an exposure device includes a linear fluorescent lamp 115 for emitting ultra-violet rays and the fluorescent lamp 115 is constituted to be movable in a direction perpendicular to the axis thereof so that all of the stimulable phosphor layer regions 112 formed on the support 111 of the stimulable phosphor sheet 110 can be scanned with ultra-violet rays emitted from the fluorescent lamp 115.

In this embodiment, since the energy of ultra-violet rays 101 to be projected onto all of the stimulable phosphor layer regions 112 formed on the support 111 of the stimulable phosphor sheet 110 is not the same, the relationship between the positions of the stimulable phosphor layer regions 112 formed on the support 111 of the stimulable phosphor sheet 110 and the amount of the energy of the ultra-violet rays to be projected thereonto is experimentally determined in advance and input by the user to the scanner through the keyboard 71 and light amount correction data are written in a memory 55.

After all of the stimulable phosphor layer regions 112 are exposed to the ultra-violet rays emitted from the fluorescent lamp 115 in this manner, similarly to the previous embodiments, the stimulable phosphor sheet 110 is placed on the glass plate 41 of the stage 40 and digital data are produced by the scanner.

When digital data are produced, the data processing apparatus 54 reads the light amount correction data from the memory 55 and normalizes the digital data so that the average value of the signal intensities for all of the stimulable phosphor layer regions 112 becomes 1, thereby producing a correction coefficient $\alpha i$ for each of the individual stimulable phosphor layer regions 112 wherein i indicates the position of the individual stimulable phosphor layer regions 112 and to write it in the memory 55.

After the correction coefficient $\alpha i$ for each of the individual stimulable phosphor layer regions 112 is produced and stored in the memory 55, similarly to the previous embodiments, a number of the stimulable phosphor layer regions 112 formed on the support 11 of the stimulable phosphor sheet 110 are exposed to a radioactive labeling substance contained in a number of the absorptive regions 84 formed in the biochemical analysis unit 80, whereby radiation data are recorded in a number of the stimulable phosphor layer regions 112 formed on the support 111 of the stimulable phosphor sheet 110.

The radiation data recorded in a number of the stimulable phosphor layer regions 112 formed on the support 111 of the stimulable phosphor sheet 110 are read by a scanner, whereby biochemical analysis data are produced.

Figure 25:
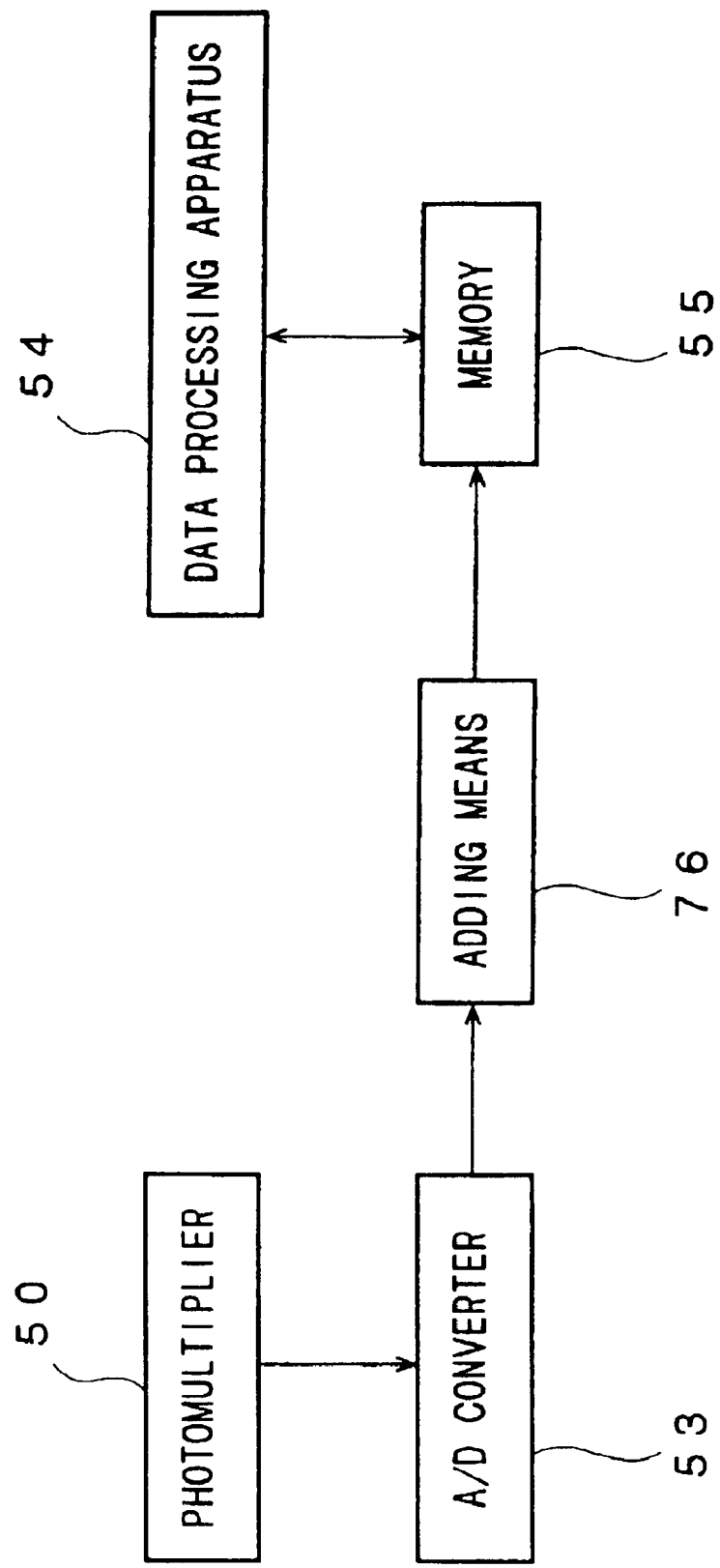
FIG. 25 is a block diagram of a photomultiplier, a data processing apparatus and peripheral devices thereof of a scanner which is a further preferred embodiment of the present invention.

FIG. 25 is a block diagram of the photomultiplier 50, the data processing apparatus 54 and peripheral devices thereof of a scanner which is a further preferred embodiment of the present invention.

As shown in FIG. 25, the scanner according to this embodiment includes an adding means 76 for adding digital data produced by the A/D converter 53 and a memory 55 for storing digital data added by the adding means 76.

In this embodiment, the control unit 70 is constituted so as to output an adding operation effecting signal to the adding means 76 at the same time it outputs a drive signal to the first laser stimulating ray source 21. Digital data produced by irradiating each of the stimulable phosphor layer regions 112 formed on the support 111 of the stimulable phosphor sheet 110 with the laser beam 24 to excite stimulable phosphor contained in the stimulable phosphor layer regions 112, photoelectrically detecting stimulated emission 45 released from the stimulable phosphor layer regions 112 by the photomultiplier 50 to produce analog data and digitizing the analog data by the A/D converter 53 are added by the adding means 76 and stored in the memory 55.

When a predetermined time, for example, several microseconds, have passed after the first stimulating ray source 21 was turned on, the control unit 70 outputs a drive stop signal to the first laser stimulating ray source 21 and outputs a data processing signal to the data processing apparatus 54.

When the data processing signal is input from the control unit 70, the data processing apparatus 54 reads the correction coefficient $\alpha i$ corresponding to the stimulable phosphor layer region 112 from the memory 55 together with the added value of digital data based on a detection signal indicating the position of the optical head 35 input from the linear encoder 67, corrects the digital data to produce biochemical analysis data corresponding to the stimulable phosphor layer region 112 and stores the biochemical analysis data in the memory 55.

At the same time, the control unit 70 outputs a drive signal to the main scanning motor 65, thereby moving the optical head 35 by one pitch equal to the distance between neighboring stimulable phosphor layer regions 112 and when the control unit 70 judges based on a detection signal indicating the position of the optical head 35 input from the linear encoder 67 that the optical head 35 has been moved by one pitch equal to the distance between neighboring stimulable phosphor layer regions 112, it outputs a drive signal to the first stimulating ray source 21 to turn it on, thereby causing the laser beam 24 to excite stimulable phosphor contained in a neighboring stimulable phosphor layer region 112 formed on the support 111 of the stimulable phosphor sheet 110.

According to this embodiment, digital data produced by irradiating each of the stimulable phosphor layer regions 112 formed on the support 111 of the stimulable phosphor sheet 110 with the laser beam 24 to excite stimulable phosphor contained in the stimulable phosphor layer regions 112, photoelectrically detecting stimulated emission 45 released from the stimulable phosphor layer regions 112 by the photomultiplier 50 to produce analog data and digitizing the analog data by the A/D converter 53 are added by the adding means 76, thereby producing biochemical analysis data corresponding to each of the stimulable phosphor layer regions 112. Therefore, even when the radiation energy stored in the stimulable phosphor layer region 112 is low and the intensity of stimulated emission released from the stimulable phosphor layer region 112 is low, it is possible to produce biochemical analysis data having high signal intensity with high sensitivity.

Figure 26:
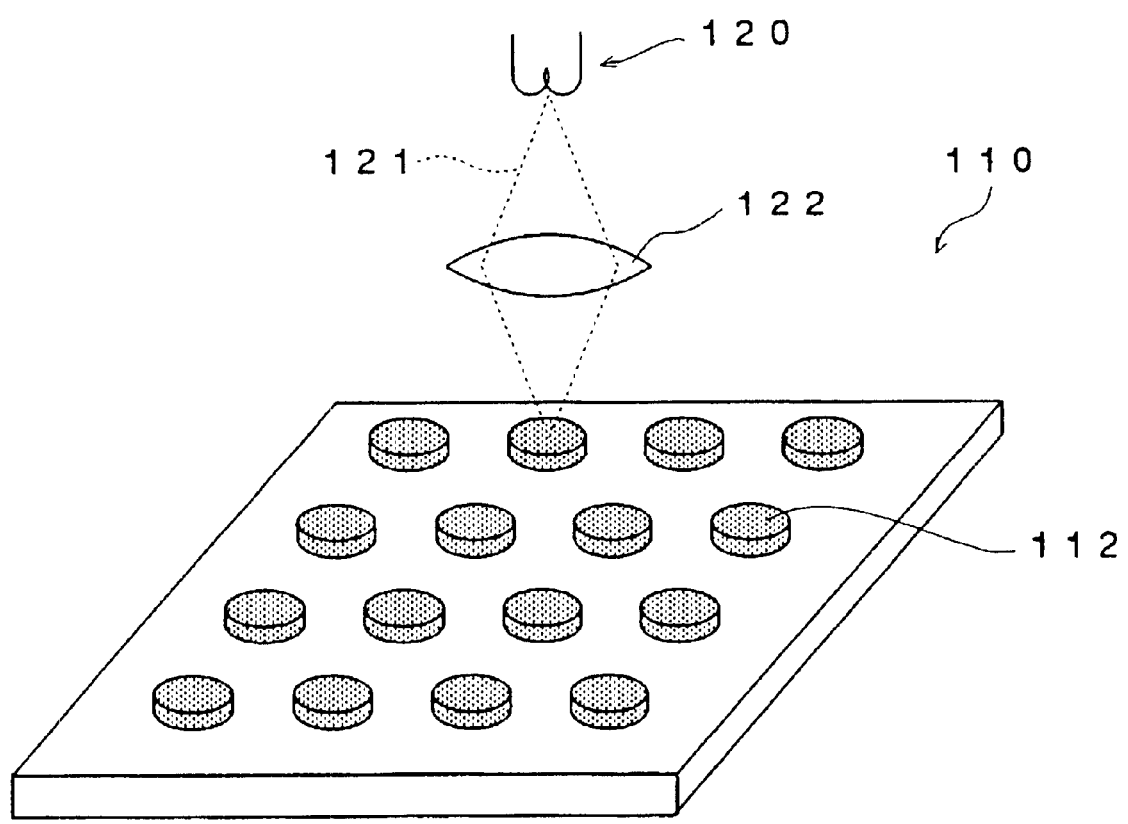
FIG. 26 is a schematic perspective view showing a further example of an exposure device for exposing a number of stimulable phosphor layer regions formed on a support of a stimulable phosphor sheet in order to produce correction data for each of stimulable phosphor layer regions.

FIG. 26 is a schematic perspective view showing a further example of an exposure device for exposing a number of the stimulable phosphor layer regions 112 formed on the support 111 of the stimulable phosphor sheet 110 in order to produce correction data for each of stimulable phosphor layer regions 112.

As shown in FIG. 26, an exposure device includes an ultraviolet ray source 120 for emitting ultra-violet rays 121 and a condenser lens 122 for condensing ultra-violet rays 121 emitted from the ultra-violet ray source 120 onto each of the stimulable phosphor layer regions 112 formed on the support 111 of the stimulable phosphor sheet 110. In this embodiment, the exposure device is constituted so that a stage (not shown) on which the stimulable phosphor sheet 110 is placed is moved by a scanning mechanism (not shown) in a main scanning direction indicated by an arrow X and a sub-scanning direction indicated by an arrow Y, whereby all of the stimulable phosphor layer regions 112 formed on the support 111 of the stimulable phosphor sheet 110 are exposed to ultra-violet rays 121 emitted from the ultra-violet ray source 120.

In this embodiment, since the energy of the ultra-violet rays projected onto the stimulable phosphor layer regions 112 formed on the support 111 of the stimulable phosphor sheet 110 is the same, it is possible to produce biochemical analysis data corresponding to each of the stimulable phosphor layer regions 112 formed on the support 111 of the stimulable phosphor sheet 110 by producing a correction coefficient $\alpha i$ for correcting digital data corresponding to each of the stimulable phosphor layer regions 112 formed on the support 111 of the stimulable phosphor sheet 110 based on digital data produced by irradiating each of the stimulable phosphor layer regions 112 of the stimulable phosphor sheet 110 with the laser beam 24 to excite stimulable phosphor contained therein and photoelectrically detecting stimulated emission 45 released from the stimulable phosphor without correcting the amount of light, and correcting the digital data obtained from each of the stimulable phosphor layer regions 112 of the stimulable phosphor sheet 110.

Figure 27:
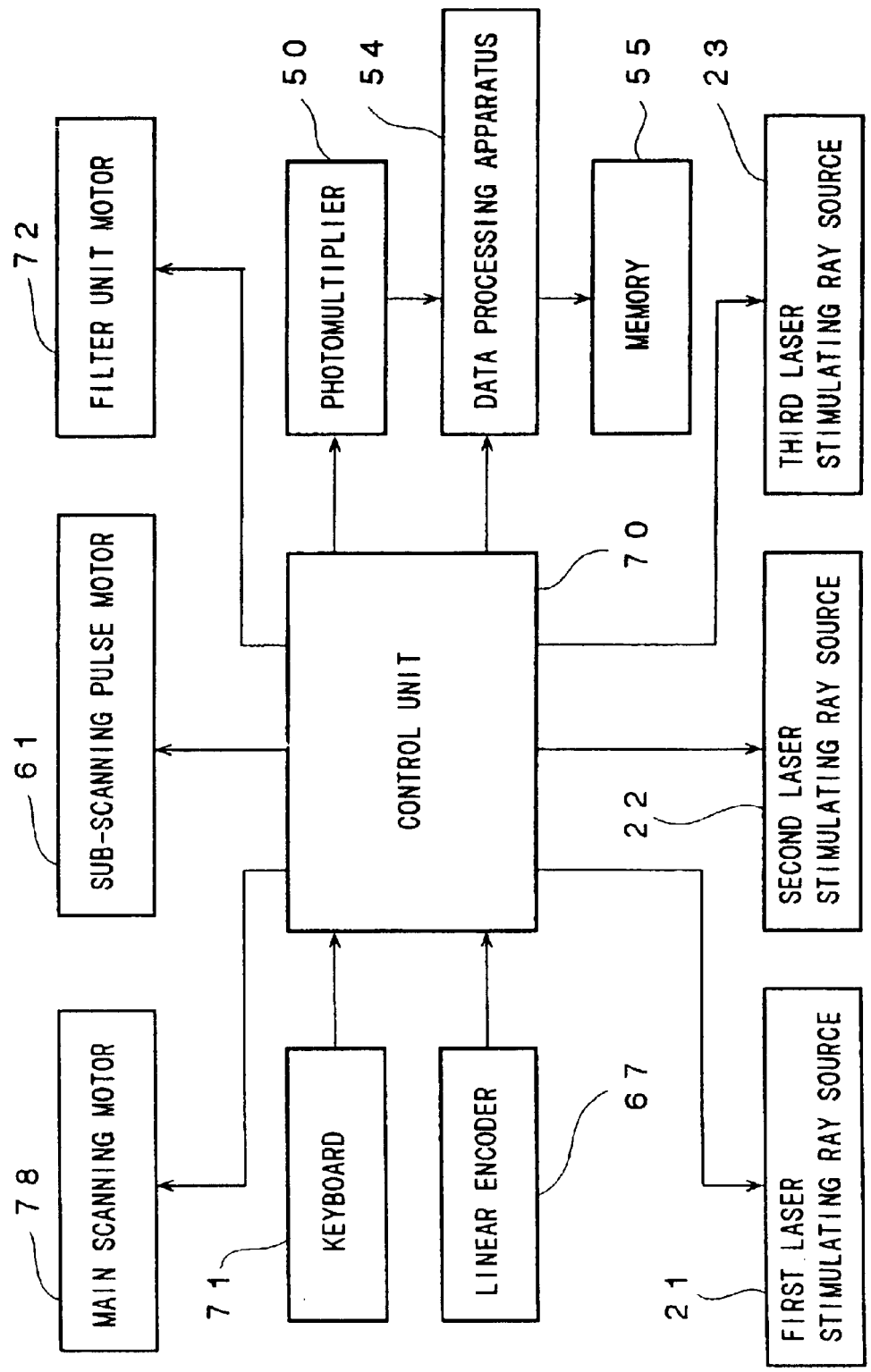
FIG. 27 is a block diagram of a control system, an input system, a drive system and a detection system of the scanner which is a further preferred embodiment of the present invention.

FIG. 27 is a block diagram of a control system, an input system, a drive system and a detection system of the scanner which is a further preferred embodiment of the present invention.

As shown in FIG. 27, the drive system of the scanner according to this embodiment includes a main scanning motor 78 for continuously driving the endless belt 66 to which the optical head 35 is fixed at a constant speed in the main scanning direction indicated by the arrow X in FIG. 12 instead of the main scanning stepping motor 65 of the scanner shown in FIG. 13.

In this embodiment, the control unit 70 is adapted to control the on and off operation of the first laser stimulating ray source 21, the second laser stimulating ray source 22 or the third laser stimulating ray source 23 in accordance with a detection signal indicating the position of the optical head 35 input from the linear encoder 67.

The thus constituted scanner according to this embodiment reads radiation data of a radioactive labeling substance recorded in a number of the stimulable phosphor layer regions 12 formed in the support 11 of the stimulable phosphor sheet 10 by exposing a number of the stimulable phosphor layer regions 12 to the radioactive labeling substance in the following manner.

The stimulable phosphor sheet 10 is first placed on the glass plate 41 of the stage 40.

An instruction signal indicating that the stimulable phosphor layer regions 12 formed in the support 11 of the stimulable phosphor sheet 10 are to be scanned with a laser beam 24 is then input by the user through the keyboard 71.

The instruction signal input through the keyboard is output to the control unit 70 and when the control unit 70 receives the instruction signal, it outputs a drive signal to the filter unit motor 72 in accordance with the instruction signal, thereby moving the filter unit 48 to locate the filter member 51d provided with the filter 52d having a property of transmitting only light having a wavelength corresponding to that of stimulated emission emitted from stimulable phosphor and cutting off light having a wavelength of 640 nm in the optical path of stimulated emission released from the stimulable phosphor layer regions 12.

The control unit 70 further outputs a drive signal to the main scanning motor 78 to move the optical head 35 in the main scanning direction and when it judges based on a detection signal indicating the position of the optical head 35 input from the linear encoder 67 that the optical head 35 has reached a position where a laser beam 24 can be projected onto a first stimulable phosphor layer region 12 among a number of the stimulable phosphor layer regions 12 formed in the support 11 of the stimulable phosphor sheet 10, it outputs a drive stop signal to the main scanning stepping motor 65 and a drive signal to the first stimulating ray source 21, thereby actuating it to emit a laser beam 24 having a wavelength of 640 nm.

A laser beam 24 emitted from the first laser stimulating source 21 passes through the collimator lens 25, thereby being made a parallel beam, and is reflected by the mirror 26.

The laser beam 24 reflected by the mirror 26 passes through the first dichroic mirror 27 and the second dichroic mirror 28 and advances to the mirror 29.

The laser beam 24 advancing to the mirror 29 is reflected by the mirror 29 and advances to the mirror 32 to be reflected thereby.

The laser beam 24 reflected by the mirror 32 passes through the hole 33 of the perforated mirror 34 and advances to the concave mirror 38.

The laser beam 24 advancing to the concave mirror 38 is reflected by the concave mirror 38 and enters the optical head 35.

The laser beam 24 entering the optical head 35 is reflected by the mirror 36 and condensed by the aspherical lens 37 onto the first stimulable phosphor layer region 12 of the stimulable phosphor sheet 10 placed on the glass plate 41 of a stage 40.

In this embodiment, since the stimulable phosphor layer regions 12 are formed by embedding stimulable phosphor in the through-holes 13 formed in the support 11 made of stainless steel, it is possible to effectively prevent the laser beam 24 from scattering in each of the stimulable phosphor layer regions 12 and entering the neighboring stimulable phosphor layer regions 12 to excite stimulable phosphor contained in the neighboring stimulable phosphor layer regions 12.

When the laser beam 24 impinges onto the first stimulable phosphor layer region 12 formed in the support 11 of the stimulable phosphor sheet 10, stimulable phosphor contained in the first stimulable phosphor layer region 12 formed in the stimulable phosphor sheet 10 is excited by the laser beam 24, thereby releasing stimulated emission 45 from the first stimulable phosphor layer region 12.

The stimulated emission 45 released from the first stimulable phosphor layer region 12 is condensed onto the mirror 36 by the aspherical lens 37 provided in the optical head 35 and reflected by the mirror 36 on the side of the optical path of the laser beam 24, thereby being made a parallel beam to advance to the concave mirror 38.

The stimulated emission 45 advancing to the concave mirror 38 is reflected by the concave mirror 38 and advances to the perforated mirror 34.

As shown in FIG. 8, the stimulated emission 45 advancing to the perforated mirror 34 is reflected downward by the perforated mirror 34 formed as a concave mirror and advances to the filter 52d of the filter unit 48.

Since the filter 52d has a property of transmitting only light having a wavelength corresponding to that of stimulated emission emitted from stimulable phosphor and cutting off light having a wavelength of 640 nm, light having a wavelength of 640 nm corresponding to that of the stimulating ray is cut off by the filter 52d and only light having a wavelength corresponding to that of stimulated emission passes through the filter 52d to be photoelectrically detected by the photomultiplier 50.

Analog data produced by photoelectrically detecting stimulated emission by the photomultiplier 50 are, converted by the A/D converter 53 to digital data to be forwarded to the data processing apparatus 54.

Since the main scanning motor 78 is constituted to continuously drive the endless belt 66 to which the optical head 35 is fixed at a constant speed in the main scanning direction indicated by the arrow X in FIG. 12, the optical head 35 is continuously moved by the main scanning motor 78 at a constant speed in the main scanning direction, whereby the laser beam 24 emitted from the first laser stimulating ray source 21 is continuously moved on the first stimulable phosphor layer region 12 to excite stimulable phosphor contained in the first stimulable phosphor layer region 12.

The control unit 70 constantly monitors the relative positional relationship between the laser beam 24 emitted from the first laser stimulating ray source 21 and the stimulable phosphor layer regions 12 formed in the support 11 of the stimulable phosphor sheet 11 and immediately before the optical head 35 reaches the position where the first stimulable phosphor layer region 12 can be no longer irradiated with the laser beam 24, the control unit 70 outputs a drive stop signal to the first laser stimulating ray source 21, thereby turning it off.

In this embodiment, the driving speed of the endless belt 66 by the main scanning motor 78 is set in such a manner that even when radiation energy stored in a stimulable phosphor layer region 12 is low, a digital signal having a sufficiently high signal intensity can be produced by continuously moving the laser beam 24 on the stimulable phosphor layer region 12 to excite stimulable phosphor contained in the stimulable phosphor layer region 12 and photoelectrically detecting stimulated emission 45 released from the stimulable phosphor layer region 12.

When digital data are input from the A/D converter, similarly to the previous embodiments, the data processing apparatus 54 reads the correction coefficient αi for the stimulable phosphor layer region 12 based on a detection signal indicating the position of the optical head 35 input from the linear encoder 67 to correct the digital data and stores the corrected digital data in the memory 55.

The optical head 35 is further moved in the main scanning direction indicated by the arrow X in FIG. 12 and when the control unit 70 judges based on a detection signal indicating the position of the optical head 35 input from the linear encoder 67 that the optical head 35 has been located the position where the second stimulable phosphor layer region 12 formed in the support 11 of the stimulable phosphor sheet 10 next to the first stimulable phosphor layer region 12 can be irradiated with the laser beam 24, it outputs a drive signal to the first stimulating ray source 21 to turn it on, thereby causing the first laser stimulating ray source 21 to emit the laser beam 24 having a wavelength of 640 nm.

A laser beam 24 emitted from the first laser stimulating source 21 passes through the collimator lens 25, thereby being made a parallel beam, and is reflected by the mirror 26.

The laser beam 24 reflected by the mirror 26 passes through the first dichroic mirror 27 and the second dichroic mirror 28 and advances to the mirror 29.

The laser beam 24 advancing to the mirror 29 is reflected by the mirror 29 and advances to the mirror 32 to be reflected thereby.

The laser beam 24 reflected by the mirror 32 passes through the hole 33 of the perforated mirror 34 and advances to the concave mirror 38.

The laser beam 24 advancing to the concave mirror 38 is reflected by the concave mirror 38 and enters the optical head 35.

The laser beam 24 entering the optical head 35 is reflected by the mirror 36 and condensed by the aspherical lens 37 onto the second stimulable phosphor layer region 12 of the stimulable phosphor sheet 10 placed on the glass plate 41 of a stage 40.

As a result, stimulable phosphor contained in the second stimulable phosphor layer region 12 is excited, whereby stimulated emission 45 is released from the second stimulable phosphor layer region 12 and similarly to the stimulated emission 45 released from the first stimulable phosphor layer region 12, the stimulated emission 45 is photoelectrically detected by the photomultiplier 50 to produce analog data.

The analog data produced by the photomultiplier 50 are output to the A/D converter 53 to be converted to digital data and the digital data are output to the data processing apparatus 54.

The optical head 35 is continuously moved by the main scanning motor 78 at a constant speed in the main scanning direction, whereby the laser beam 24 emitted from the first laser stimulating ray source 21 is continuously moved on the second stimulable phosphor layer region 12 to excite stimulable phosphor contained in the second stimulable phosphor layer region 12.

The control unit 70 constantly monitors the relative positional relationship between the laser beam 24 emitted from the first laser stimulating ray source 21 and the stimulable phosphor layer regions 12 formed in the support 11 of the stimulable phosphor sheet 11 and immediately before the optical head 35 reaches the position where the second stimulable phosphor layer region 12 can be no longer irradiated with the laser beam 24, the control unit 70 outputs a drive stop signal to the first laser stimulating ray source 21, thereby turning it off.

In this manner, the stimulable phosphor layer regions 12 included in a first line of the stimulable phosphor layer regions 12 formed in the support 11 of the stimulable phosphor sheet 10 are sequentially irradiated with the laser beam 24 by continuously moving the optical head 35 at a constant speed in the main scanning direction and repeating the on and off operation of the first laser stimulating ray source 21 based on a detection signal indicating the position of the optical head 35 input from the linear encoder 67, stimulated emission 45 released from the stimulable phosphor layer regions 12 included in a first line of the stimulable phosphor layer regions 12 is photoelectrically detected by photomultiplier 50 to produce analog data and the analog data are digitized by the A/D converter 53, thereby producing and forwarding digital data to the data processing apparatus 54.

When the control unit 70 judges based on a detection signal indicating the position of the optical head 35 input from the linear encoder 67 that the optical head 35 has been moved by one scanning line in the main scanning direction and that the stimulable phosphor layer regions 12 included in the first line of the stimulable phosphor layer regions 12 formed in the support 11 of the stimulable phosphor sheet 10 have been scanned with the laser beam 24, it outputs a drive signal to the main scanning motor 78, thereby returning the optical head 35 to its original position and outputs a drive signal to the sub-scanning pulse motor 61, thereby causing it to move the movable base plate 63 by one scanning line in the sub-scanning direction.

When the control unit 70 judges based on a detection signal indicating the position of the optical head 35 input from the linear encoder 67 that the optical head 35 has been returned to its original position and judges that the movable base plate 63 has been moved by one scanning line in the sub-scanning direction, similarly to the manner that the stimulable phosphor layer regions 12 included in the first line of the stimulable phosphor layer regions 12 formed in the support 11 of the stimulable phosphor sheet 10 were sequentially irradiated with the laser beam 24 emitted from the first laser stimulating ray source 21, the stimulable phosphor layer regions 12 included in a second line of the stimulable phosphor layer regions 12 formed in the support 11 of the stimulable phosphor sheet 10 are sequentially irradiated with the laser beam 24 emitted from the first laser stimulating ray source 21, thereby exciting stimulable phosphor contained in the stimulable phosphor layer regions 12 included in the second line and stimulated emission 45 released from the stimulable phosphor layer regions 12 is sequentially and photoelectrically detected by the photomultiplier 50 to produce analog data.

The analog data produced by photoelectrically detecting stimulated emission 45 by the photomultiplier 50 are converted by the A/D converter 53 to digital data and the digital data are forwarded to the data processing apparatus 54.

When all of the stimulable phosphor layer regions 12 formed in the support 11 of the stimulable phosphor sheet 10 have been scanned with the laser beam 24 to excite stimulable phosphor contained in the stimulable phosphor layer regions 12 and digital data produced by photoelectrically detecting stimulated emission 45 released from the stimulable phosphor layer regions 12 by the photomultiplier 50 to produce analog data and digitizing the analog data by the A/D converter 53 have been forwarded to the data processing apparatus 54, the control unit 70 outputs a drive stop signal to the first laser stimulating ray source 21, thereby turning it off.

According to this embodiment, only when the optical head 35 is located at positions where one of the stimulable phosphor layer regions 12 formed in the support 11 of the stimulable phosphor sheet 10 can be irradiated with a laser beam 24 emitted from the first laser stimulating ray source 21, the first laser stimulating ray source 21 is activated, thereby irradiating the stimulable phosphor layer region 12 with the laser beam 24. Therefore, since it is possible to reliably prevent the laser beam 24 from entering a neighboring stimulable phosphor layer region 12 to be next stimulated as the laser beam 24 is scanned and thus prevent stimulable phosphor contained in the neighboring stimulable phosphor layer region 12 from being excited to release radiation energy stored therein, biochemical analysis data having an excellent quantitative characteristic can be produced.

Figure 28:
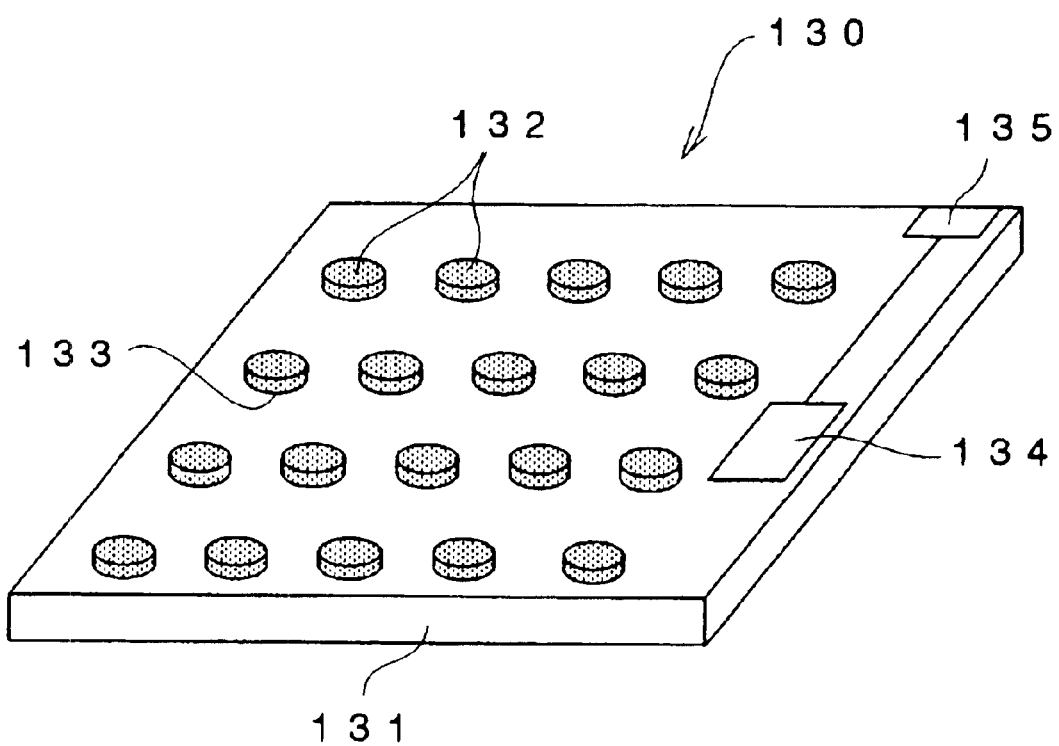
FIG. 28 is a schematic perspective view showing a stimulable phosphor sheet used in a biochemical analysis data producing method which is a further preferred embodiment of the present invention.

FIG. 28 is a schematic perspective view showing a stimulable phosphor sheet used in a biochemical analysis data producing method which is a further preferred embodiment of the present invention.

As shown in FIG. 28, a stimulable phosphor sheet 130 according to this embodiment includes a support 131 made of stainless steel and a number of stimulable phosphor layer regions 132 formed by embedding stimulable phosphor in a number of recesses 133 formed in the support 131.

In this embodiment, stimulable phosphor is embedded in a number of the recesses 133 so that the surfaces of the stimulable phosphor layer regions 132 lie above the surface of the support 131.

A number of the recesses 133 are formed in the support 131 according to the same regular pattern as that of a number of the absorptive regions 4 formed in the biochemical analysis unit 1 and so that each of them has a substantially circular shape and the same size as the absorptive region 4.

In this embodiment, an IC chip 134 is embedded at a region of the support 131 of the stimulable phosphor sheet 131 where no recess 133 is formed and the support 131 is provided with an interface 135 through which data recorded in the IC chip 134 can be output.

In this embodiment, correction data for correcting biochemical analysis data, and ID data inherent to the stimulable phosphor sheet 130, are recorded in the IC chip 134.

In this embodiment, prior to exposing a number of the stimulable phosphor layer regions 132 formed in the support 131 of the stimulable phosphor sheet 130 to the radioactive labeling substance selectively contained in a number of the absorptive regions 4 formed in the biochemical analysis unit 1, correction data are produced for correcting dispersion in signal intensity generated in biochemical analysis data owing to the fact that the amounts of radiation energy stored in the individual stimulable phosphor layer regions 132 differ from each other even if they are exposed to the same radiation energy because it is difficult to embed stimulable phosphor in a number of the recesses 133 formed in the support 131 so that the amount of stimulable phosphor contained in each of the stimulable phosphor layer regions 132 is the same,.

All of the stimulable phosphor layer regions 132 formed in the support 131 of the stimulable phosphor sheet 130 are exposed using a correlation sample containing $^{14}C$, tritium or the like for emitting uniform radiation energy.

After all of the stimulable phosphor layer regions 132 formed in the support 131 of the stimulable phosphor sheet 130 are exposed to uniform radiation energy in this manner, correction data are produced.

Figure 29:
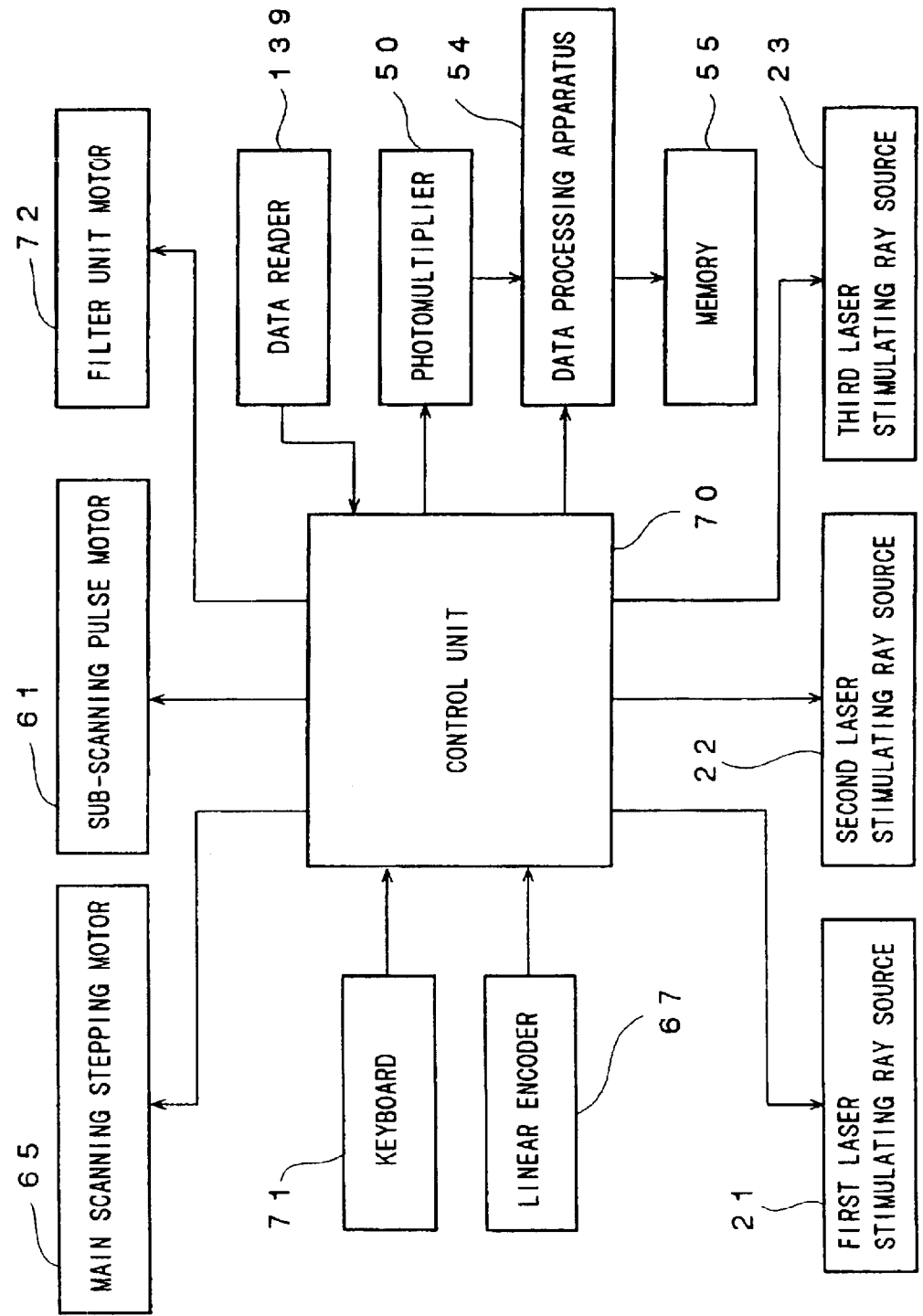
FIG. 29 is a block diagram of a control system, an input system, a drive system and a detection system of the scanner which is a further preferred embodiment of the present invention.

FIG. 29 is a block diagram of a control system, an input system, a drive system and a detection system of the scanner which is a further preferred embodiment of the present invention.

The scanner according to this embodiment has the same configuration as that of the scanner shown in FIGS. 7 to 14 except that it includes a data reader 139 for reading correction data and ID data recorded in the IC chip 134 embedded in the support 131 of the stimulable phosphor sheet 130.

When correction data are to be produced, the stimulable phosphor sheet 130 is placed by the operator on the glass plate 41 of the stage 40 of the scanner shown in FIG. 7.

An instruction signal indicating that correction data are to be produced is then input by the operator through the keyboard 71 and the instruction signal is output to the control unit 70.

When the control unit 70 receives the instruction signal, it outputs a drive signal to the filter unit motor 72 in accordance with the instruction signal, thereby moving the filter unit 48 to locate the filter member 51d provided with the filter 52d having a property of transmitting only light having a wavelength corresponding to that of stimulated emission emitted from stimulable phosphor and cutting off light having a wavelength of 640 nm in the optical path of stimulated emission released from the stimulable phosphor layer regions 132.

The control unit 70 further outputs a drive signal to the main scanning stepping motor 65 to move the optical head 35 in the main scanning direction and when it judges based on a detection signal indicating the position of the optical head 35 input from the linear encoder 67 that the optical head 35 has reached a position where a laser beam 24 can be projected onto a first stimulable phosphor layer region 132 among a number of the stimulable phosphor layer regions 132 formed in the support 131 of the stimulable phosphor sheet 130, it outputs a drive stop signal to the main scanning stepping motor 65 and a drive signal to the first stimulating ray source 21, thereby actuating it to emit a laser beam 24 having a wavelength of 640 nm.

Similarly to the embodiment shown in FIGS. 7 to 14, the laser beam 24 is led to the first stimulable phosphor layer region 132 of the stimulable phosphor sheet 130 placed on the glass plate 41 of the stage 40.

When the laser beam 24 impinges onto the first stimulable phosphor layer region 132 formed in the support 131 of the stimulable phosphor sheet 130, stimulable phosphor contained in the first stimulable phosphor layer region 132 formed in the stimulable phosphor sheet 130 is excited by the laser beam 24, thereby releasing stimulated emission 45 from the first stimulable phosphor layer region 132.

Similarly to the embodiment shown in FIGS. 7 to 14, the stimulated emission 45 released from the first stimulable phosphor layer region 132 formed in the support 131 of the stimulable phosphor sheet 130 is led to the photomultiplier 50 and photoelectrically detected by the photomultiplier 50.

When a predetermined time has passed after the first stimulating ray source 21 was turned on, the control unit 70 outputs a drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 132.

When the control unit 70 judges based on a detection signal indicating the position of the optical head 35 input from the linear encoder 67 that the optical head 35 has been moved by one pitch equal to the distance between neighboring stimulable phosphor layer regions 132, it outputs a drive signal to the first stimulating ray source 21 to turn it on, thereby causing the laser beam 24 to excite stimulable phosphor contained in a second stimulable phosphor layer region 132 formed in the support 131 of the stimulable phosphor sheet 130 next to the first stimulable phosphor layer region 132.

Similarly to the above, the second stimulable phosphor layer region 132 formed in the support 131 of the stimulable phosphor sheet 130 is irradiated with the laser beam 24 for a predetermined time and when stimulated emission 45 released from the second stimulable phosphor layer region 132 is photoelectrically detected by the photomultiplier 50, the control unit 70 outputs a drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 132.

In this manner, the on and off operation of the first stimulating ray source 21 is repeated in synchronism with the intermittent movement of the optical head 35 and when the control unit 70 judges based on a detection signal indicating the position of the optical head 35 input from the linear encoder 67 that the optical head 35 has been moved by one scanning line in the main scanning direction and that the stimulable phosphor layer regions 132 included in a first line of the stimulable phosphor layer regions 132 formed in the support 131 of the stimulable phosphor sheet 130 have been scanned with the laser beam 24, it outputs a drive signal to the main scanning stepping motor 65, thereby returning the optical head 35 to its original position and outputs a drive signal to the sub-scanning pulse motor 61, thereby causing it to move the movable base plate 63 by one scanning line in the sub-scanning direction.

When the control unit 70 judges based on a detection signal indicating the position of the optical head 35 input from the linear encoder 67 that the optical head 35 has been returned to its original position and judges that the movable base plate 63 has been moved by one scanning line in the sub-scanning direction, similarly to the manner that the stimulable phosphor layer regions 132 included in the first line of the stimulable phosphor layer regions 132 formed in the support 131 of the stimulable phosphor sheet 130 were sequentially irradiated with the laser beam 24 emitted from the first laser stimulating ray source 21, the stimulable phosphor layer regions 132 included in a second line of the stimulable phosphor layer regions 132 formed in the support 131 of the stimulable phosphor sheet 130 are sequentially irradiated with the laser beam 24 emitted from the first laser stimulating ray source 21, thereby exciting stimulable phosphor contained in the stimulable phosphor layer regions 132 included in the second line and stimulated emission 45 released from the stimulable phosphor layer regions 132 is sequentially and photoelectrically detected by the photomultiplier 50.

When all of the stimulable phosphor layer regions 132 formed in the support 131 of the stimulable phosphor sheet 130 have been scanned with the laser beam 24 in this manner, the first laser stimulating ray source 21 is turned off and analog data produced by photoelectrically detecting stimulated emission by the photomultiplier 50 are converted by the A/D converter 53 to digital data to be forwarded to the data processing apparatus 54.

Since the digital data have been produced by exposing a number of the stimulable phosphor layer regions 132 formed in the support 131 of the stimulable phosphor sheet 130 using the correlation sample containing $^{14}C$, tritium or the like for emitting uniform radiation energy, the signal intensities corresponding to the individual stimulable phosphor layer regions 12 ought to be equal to each other in rerum natura. However, in the case where the stimulable phosphor layer regions 132 cannot be formed by embedding stimulable phosphor in the recesses 133 so that all of them contain the same amount of stimulable phosphor, even if they are exposed to the same radiation energy, since the radiation energy stored in the individual stimulable phosphor layer regions 132 differs depending upon the amount of stimulable phosphor contained therein, the signal intensities for the individual stimulable phosphor layer regions 132 are not equal to each other. Therefore, when the stimulable phosphor sheet 130 is superposed on the biochemical analysis unit 1, thereby exposing a number of the stimulable phosphor layer regions 132 formed in the support 131 of the stimulable phosphor sheet 130 to the radioactive labeling substance contained in a number of the absorptive regions 4 formed in the substrate 2 of the biochemical analysis unit 1, the stimulable phosphor layer regions 132 are scanned with the laser beam 24, the stimulated emission 45 released therefrom is detected to produce analog data and the analog data are digitized to produce digital data for biochemical analysis, it is impossible to perform quantitative analysis with a high accuracy based on the digital data.

Therefore, in this embodiment, the data processing apparatus 54 is constituted so as to normalize the digital data produced by exposing all of the stimulable phosphor layer regions 132 formed in the support 131 of the stimulable phosphor sheet 130 using the correlation sample containing $^{14}C$, tritium or the like for emitting uniform radiation energy so that the average value of the signal intensities for all of the stimulable phosphor, layer regions 132 becomes 1, thereby producing correction data and the operator writes the correction data produced by the data processing apparatus 54 in the IC chip 134 embedded in the support 131 of the stimulable phosphor sheet 130 together with ID data of the stimulable phosphor sheet 130.

After the correction data and the ID data have been written in the IC chip 134 in this manner, the stimulable phosphor sheet 130 is delivered to the user.

Figure 30:
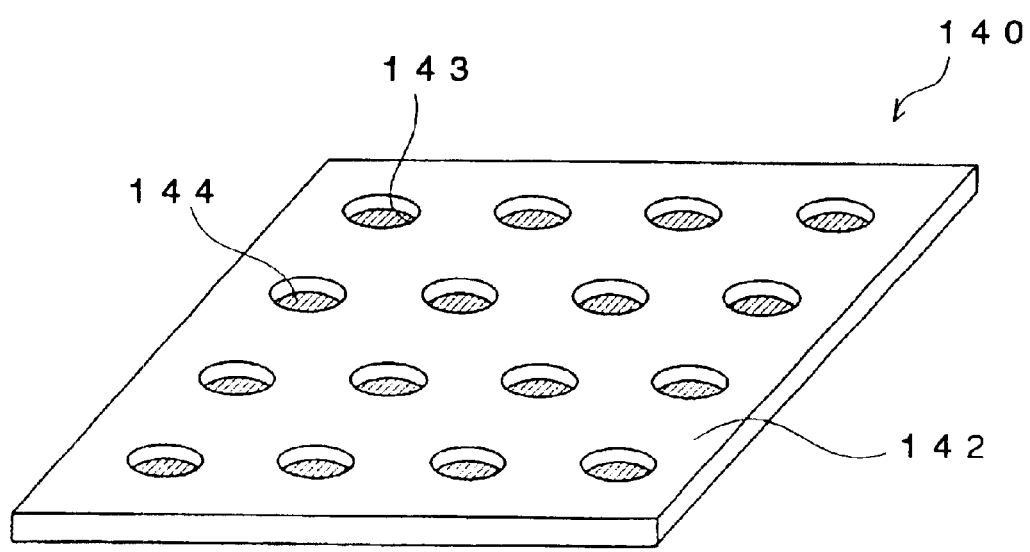
FIG. 30 is a schematic perspective view showing a biochemical analysis unit used for a biochemical analysis data producing method which is a further preferred embodiment of the present invention.

FIG. 30 is a schematic perspective view showing a biochemical analysis unit used for a biochemical analysis data producing method which is a further preferred embodiment of the present invention.

As shown in FIG. 30, a biochemical analysis unit 140 includes a substrate 142 made of stainless steel and formed with a number of substantially circular through-holes 143 at a high density and a number of absorptive regions 144 are formed by embedding nylon-6 in the through-holes 143.

Although not accurately shown in FIG. 30, in this embodiment, the through-holes 143 are formed in the substrate 142 so that substantially circular absorptive regions 144 having a size of about 0.07 $cm^2$ are regularly formed in the manner of a matrix of 120 columns×160 lines and, therefore, 19,200 absorptive regions 144 are formed.

In this embodiment, the absorptive regions 144 are formed so that the surfaces thereof lie below the surface of the substrate 142.

When biochemical analysis data are to be produced, a solution containing specific binding substances such as a plurality of cDNAs is spotted in a number of absorptive regions 144 formed in the substrate 142 of the biochemical analysis unit 140 using the spotting device 5, for example.

Figure 31:
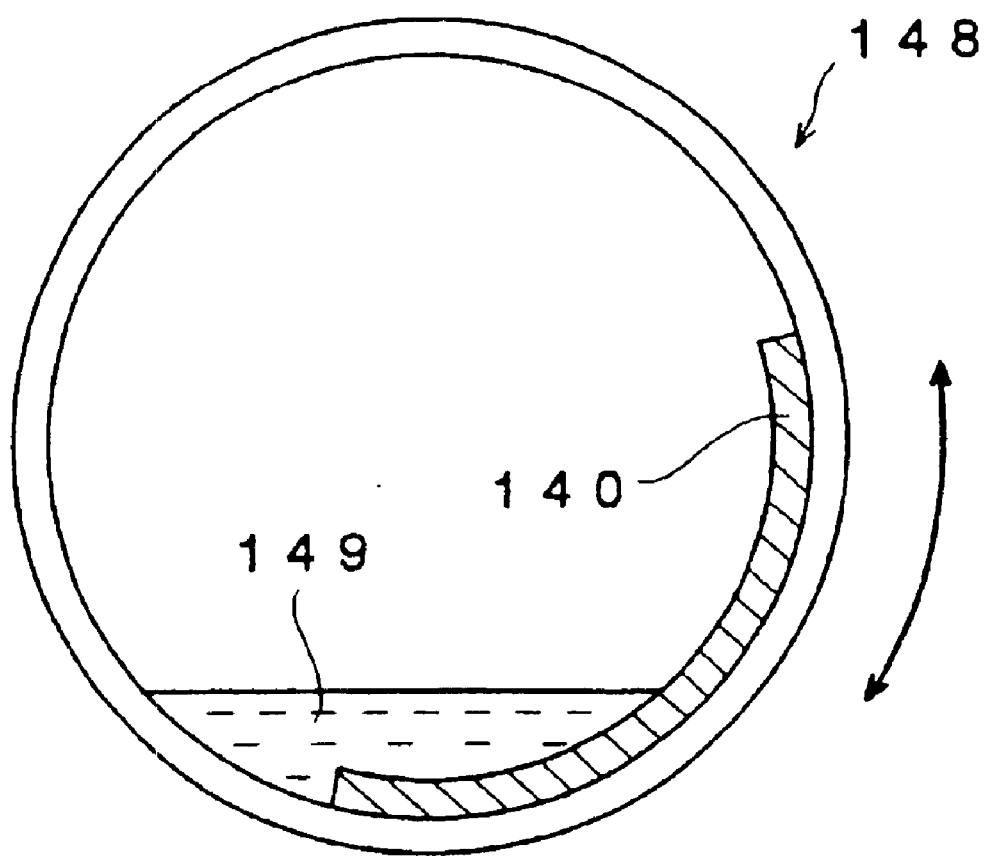
FIG. 31 is a schematic longitudinal cross sectional view showing a hybridization reaction vessel.

FIG. 31 is a schematic longitudinal cross sectional view showing a hybridization reaction vessel.

As shown in FIG. 31, a hybridization reaction vessel 148 is formed cylindrically and accommodates a hybridization reaction solution 149 containing a substance derived from a living organism labeled with a labeling substance therein.

In this embodiment, a hybridization reaction solution 149 containing a substance derived from a living organism labeled with a radioactive labeling substance and a substance derived from a living organism labeled with a fluorescent substance such as a fluorescent dye are prepared and accommodated in the hybridization reaction vessel 138.

When hybridization is to be performed, the biochemical analysis unit 140 containing specific binding substances such as a plurality of cDNAs spotted into a number of the absorptive regions 144 is accommodated in the hybridization reaction vessel 148. In this embodiment, since the substrate 142 is formed of stainless steel having flexibility, the biochemical analysis unit 140 can, as shown in FIG. 31, be bent and accommodated in the hybridization reaction vessel 148 along the inner wall surface thereof.

As indicated by the arrows in FIG. 31, the hybridization reaction vessel 148 is constituted so as to be rotatable about a shaft by a drive means (not shown) and since the biochemical analysis unit 140 is bent and accommodated in the hybridization vessel 148 along the inner wall surface thereof, even when the hybridization vessel 148 accommodates only a small amount of hybridization reaction solution 149, specific binding substances spotted in a number of the absorptive regions 144 can be selectively hybridized with a substance derived from a living organism labeled with a radioactive labeling substance and a substance derived from a living organism labeled with a fluorescent substance and contained in the hybridization reaction solution 149 by rotating the hybridization reaction vessel 148.

The stimulable phosphor sheet 130 delivered to the user is then superposed on the thus prepared biochemical analysis unit 1, whereby stimulable phosphor contained in a number of the stimulable phosphor layer regions 132 formed in the support 131 of the stimulable phosphor sheet 130 is exposed to the radioactive labeling substance contained in a number of the absorptive regions 4 formed in the substrate 2 of the biochemical analysis unit 1.

Figure 32:
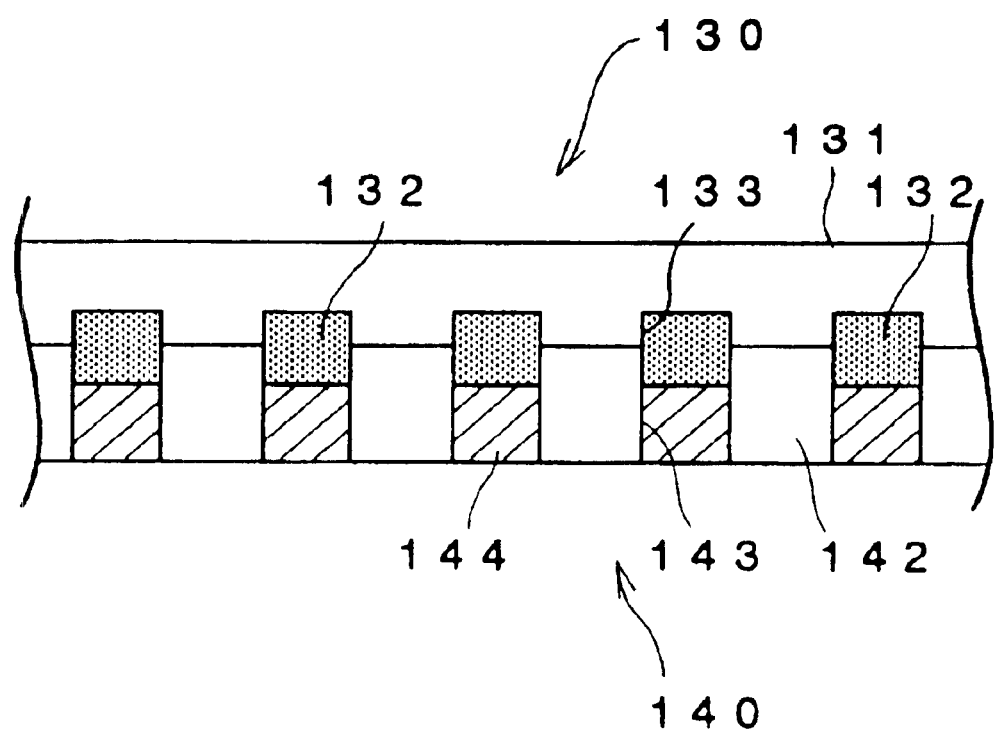
FIG. 32 is a schematic partial cross-sectional view showing a method for exposing a number of stimulable phosphor layer regions formed in a support of a stimulable phosphor sheet shown in FIG. 28 to a radioactive labeling substance contained in a number of absorptive regions formed in a substrate of a biochemical analysis unit shown in FIG. 30.

FIG. 32 is a schematic partial cross-sectional view showing a method for exposing a number of the stimulable phosphor layer regions 132 formed in the support 131 of the stimulable phosphor sheet 130 shown in FIG. 28 to the radioactive labeling substance contained in a number of the absorptive regions 144 formed in the substrate 142 of the biochemical analysis unit 140 shown in FIG. 30.

As shown in FIG. 32, when a number of the stimulable phosphor layer regions 132 formed in the support 131 of the stimulable phosphor sheet 130 are to be exposed to the radioactive labeling substance contained in a number of the absorptive regions 144 formed in the substrate 142 of the biochemical analysis unit 140, the stimulable phosphor sheet 130 is superposed on the biochemical analysis unit 140 in such a manner that a number of the stimulable phosphor layer regions 132 formed by embedding stimulable phosphor in the recesses 133 formed in the support 131 of the stimulable phosphor sheet 130 are located within the corresponding through-holes 143 formed in the substrate 142 of the biochemical analysis unit 140 and face the absorptive regions 144 in the corresponding through-holes 143.

During the exposure operation, electron beams (β rays) are released from the radioactive labeling substance contained in the absorptive regions 144 of the biochemical analysis unit 140. However, since a number of the absorptive regions 144 of the biochemical analysis unit 140 are formed spaced apart from each other in the substrate 142 made of stainless steel and the substrate 142 capable of attenuating radiation energy is present around each of the absorptive regions 144, electron beams (β rays) released from the radioactive labeling substance contained in the absorptive regions 144 of the biochemical analysis unit 140 can be efficiently prevented from scattering in the substrate 142 of the biochemical analysis unit 140. Further, since the stimulable phosphor sheet 130 is superposed on the biochemical analysis unit 140 so that a number of the stimulable phosphor layer regions 132 are located within the corresponding through-holes 143 formed in the substrate 142 of the biochemical analysis unit 140, it is possible to cause electron beams (β rays) released from the radioactive labeling substance contained in each of the absorptive regions 144 formed in the substrate 142 of the biochemical analysis unit 140 to enter only the stimulable phosphor layer region 132 the absorptive region 144 faces and since a number of the stimulable phosphor layer regions 132 of the stimulable phosphor sheet 130 are formed by embedding stimulable phosphor in a number of the recesses 133 formed spaced apart from each other in the support 131 made of stainless steel capable of attenuating radiation energy, electron beams (β rays) released from the radioactive labeling substance contained in the absorptive regions 144 formed in the substrate 142 of the biochemical analysis unit 140 are efficiently prevented from scattering in the support 131 of the stimulable phosphor sheet 130. Therefore, it is possible to selectively expose only the stimulable phosphor layer region 132 each of the absorptive regions 144 faces to the electron beams (β rays) released from the radioactive labeling substance contained in each of the absorptive regions 144.

Thus, radiation data of the radioactive labeling substance are recorded in a number of the stimulable phosphor layer regions 132 formed in the support 131 of the stimulable phosphor sheet 130.

When the exposure operation has been completed, the stimulable phosphor sheet 130 is placed by the user on the glass plate 41 of the stage 40 of the scanner.

The stage 40 is formed with the data reader 139 at a position where it establishes connection with the interface 135 provided in the stimulable phosphor sheet 130 when the stimulable phosphor sheet 130 is placed thereon and the correction data and ID data recorded in the IC chip 134 embedded in the support 131 of the stimulable phosphor sheet 130 are read by the data reader 139 and stored in the memory 55.

An instruction signal indicating that a number of the stimulable phosphor layer regions 132 formed in the support 131 of the stimulable phosphor sheet 130 are to be scanned with a laser beam 24 is then input by the user through the keyboard 71.

The instruction signal input through the keyboard 71 is output to the control unit 70 and when the control unit 70 receives the instruction signal, it outputs a drive signal to the filter unit motor 72 in accordance with the instruction signal, thereby moving the filter unit 48 to locate the filter member 51d provided with the filter 52d having a property of transmitting only light having a wavelength corresponding to that of stimulated emission emitted from stimulable phosphor and cutting off light having a wavelength of 640 nm in the optical path of stimulated emission.

The control unit 70 further outputs a drive signal to the main scanning stepping motor 65 to move the optical head 35 in the main scanning direction and when it judges based on a detection signal indicating the position of the optical head 35 input from the linear encoder 67 that the optical head 35 has reached a position where a laser beam 24 can be projected onto a first stimulable phosphor layer region 12 among a number of the stimulable phosphor layer regions 12 formed in the support 11 of the stimulable phosphor sheet 10, it outputs a drive stop signal to the main scanning stepping motor 65 and a drive signal to the first stimulating ray source 21, thereby actuating it to emit a laser beam 24 having a wavelength of 640 nm.

Similarly to the embodiment shown in FIGS. 7 to 14, the laser beam 24 is led to the first stimulable phosphor layer region 132 of the stimulable phosphor sheet 130 placed on the glass plate 41 of the stage 40.

As a result, stimulable phosphor contained in the first stimulable phosphor layer region 132 formed in the stimulable phosphor sheet 130 is excited by the laser beam 24, thereby releasing stimulated emission 45 from the first stimulable phosphor layer region 132.

Similarly to the embodiment shown in FIGS. 7 to 14, the stimulated emission 45 released from the first stimulable phosphor layer region 132 formed in the support 131 of the stimulable phosphor sheet 130 is led to the photomultiplier 50 and photoelectrically detected by the photomultiplier 50.

When a predetermined time has passed after the first stimulating ray source 21 was turned on, the control unit 70 outputs a drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 132.

When the control unit 70 judges based on a detection signal indicating the position of the optical head 35 input from the linear encoder 67 that the optical head 35 has been moved by one pitch equal to the distance between neighboring stimulable phosphor layer regions 132, it outputs a drive signal to the first stimulating ray source 21 to turn it on, thereby causing the laser beam 24 to excite stimulable phosphor contained in a second stimulable phosphor layer region 132 formed in the support 131 of the stimulable phosphor sheet 130 next to the first stimulable phosphor layer region 132.

Similarly to the above, the second stimulable phosphor layer region 132 formed in the support 131 of the stimulable phosphor sheet 130 is irradiated with the laser beam 24 for a predetermined time and when stimulated emission 45 released from the second stimulable phosphor layer region 132 is photoelectrically detected by the photomultiplier 50, the control unit 70 outputs a drive stop signal to the first stimulating ray source 21, thereby turning it off and outputs a drive signal to the main scanning stepping motor 65, thereby moving the optical head 35 by one pitch equal to the distance between neighboring stimulable phosphor layer regions 132.

In this manner, the on and off operation of the first stimulating ray source 21 is repeated in synchronism with the intermittent movement of the optical head 35 and when the control unit 70 judges based on a detection signal indicating the position of the optical head 35 input from the linear encoder 67 that the optical head 35 has been moved by one scanning line in the main scanning direction and that the stimulable phosphor layer regions 132 included in a first line of the stimulable phosphor layer regions 132 formed in the support 131 of the stimulable phosphor sheet 130 have been scanned with the laser beam 24, it outputs a drive signal to the main scanning stepping motor 65, thereby returning the optical head 35 to its original position and outputs a drive signal to the sub-scanning pulse motor 61, thereby causing it to move the movable base plate 63 by one scanning line in the sub-scanning direction.

When the control unit 70 judges based on a detection signal indicating the position of the optical head 35 input from the linear encoder 67 that the optical head 35 has been returned to its original position and judges that the movable base plate 63 has been moved by one scanning line in the sub-scanning direction, similarly to the manner that the stimulable phosphor layer regions 132 included in the first line of the stimulable phosphor layer regions 132 formed in the support 131 of the stimulable phosphor sheet 130 were sequentially irradiated with the laser beam 24 emitted from the first laser stimulating ray source 21, the stimulable phosphor layer regions 132 included in a second line of the stimulable phosphor layer regions 132 formed in the support 131 of the stimulable phosphor sheet 130 are sequentially irradiated with the laser beam 24 emitted from the first laser stimulating ray source 21, thereby exciting stimulable phosphor contained in the stimulable phosphor layer regions 132 included in the second line and stimulated emission 45 released from the stimulable phosphor layer regions 132 is sequentially and photoelectrically detected by the photomultiplier 50.

When all of the stimulable phosphor layer regions 132 formed in the support 131 of the stimulable phosphor sheet 130 have been scanned with the laser beam 24 in this manner, the first laser stimulating ray source 21 is turned off and analog data produced by photoelectrically detecting stimulated emission by the photomultiplier 50 are converted by the A/D converter 53 to digital data to be forwarded to the data processing apparatus 54.

As described above, since it is difficult to embed stimulable phosphor in a number of the recesses 133 formed in the support 131 so that the amount of stimulable phosphor contained in each of the stimulable phosphor layer regions 132 is the same and amounts of radiation energy stored in the individual stimulable phosphor layer regions 132 differ from each other even if they are exposed to the same radiation energy, the thus produced digital data contain dispersion in signal intensities. Therefore, when the data processing apparatus 54 receives the digital data, it reads the correction data read from the IC chip 134 by the data reader 139 and stored in the memory 55 and corrects the digital data using the thus read correction data.

Thus, quantitative analysis is performed in a desired manner based on the digital data subjected to the correction of dispersion in signal intensities caused by the fact that the stimulable phosphor layer regions 132 could not be formed by embedding stimulable phosphor in a number of the recesses 133 in such a manner that amounts of stimulable phosphor contained in all of the stimulable phosphor layer regions 132 are the same.

According to this embodiment, when a number of the stimulable phosphor layer regions 132 formed in the support 131 of the stimulable phosphor sheet 130 are exposed to the radioactive labeling substance contained in a number of absorptive regions 144 formed in the substrate 132 of the biochemical analysis unit 130, although electron beams (β rays) having high energy are released from the radioactive labeling substance contained in the absorptive regions 4 of the biochemical analysis unit 1, since a number of the absorptive regions 144 of the biochemical analysis unit 140 are formed spaced apart from each other in the substrate 142 made of stainless steel and the substrate 142 capable of attenuating radiation energy is present around each of the absorptive regions 144, electron beams (β rays) released from the radioactive labeling substance contained in the absorptive regions 144 of the biochemical analysis unit 140 can be efficiently prevented from scattering in the substrate 142 of the biochemical analysis unit 140. Further, since the stimulable phosphor sheet 130 is superposed on the biochemical analysis unit 140 so that a number of the stimulable phosphor layer regions 132 are located within the corresponding through-holes 143 formed in the substrate 142 of the biochemical analysis unit 140, it is possible to cause electron beams (β rays) released from the radioactive labeling substance contained in each of the absorptive regions 144 formed in the substrate 142 of the biochemical analysis unit 140 to enter only the stimulable phosphor layer region the absorptive region 144 faces and since a number of the stimulable phosphor layer regions 132 of the stimulable phosphor sheet 130 are formed by embedding stimulable phosphor in a number of the recesses 133 formed spaced apart from each other in the support 131 made of stainless steel capable of attenuating radiation energy, electron beams (β rays) released from the radioactive labeling substance contained in the absorptive regions 144 formed in the substrate 142 of the biochemical analysis unit 140 are efficiently prevented from scattering in the support 131 of the stimulable phosphor sheet 130. Therefore, since it is possible to selectively expose only the stimulable phosphor layer region 132 each of the absorptive regions 144 faces to the electron beams (β rays) released from the radioactive labeling substance contained in each of the absorptive regions 144, it is possible to effectively prevent noise caused by exposing stimulable phosphor contained in the stimulable phosphor layer region 132 to be exposed to a radioactive labeling substance contained in the corresponding absorptive region 144 of the biochemical analysis unit 140 to electron beams (β rays) released from the radioactive labeling substance contained in the neighboring absorptive regions 144 from being generated in biochemical analysis data and to produce biochemical analysis data having an excellent quantitative characteristic.

Further, in the case where a number of stimulable phosphor layer regions 132 are formed by embedding stimulable phosphor in a number of recesses 133 formed in the support 131 of the stimulable phosphor sheet 130, since it is difficult to embed stimulable phosphor in a number of the recesses 133 formed in the support 131 so that the amount of stimulable phosphor contained in each of the stimulable phosphor layer regions 132 is constant, the amounts of radiation energy stored in the individual stimulable phosphor layer regions 132 differ from each other even if they are exposed to the same radiation energy and, therefore, dispersion in signal intensity is generated in biochemical analysis data. However, according to this embodiment, since correction data for correcting such dispersion in signal intensities are produced and recorded in the IC chip 134 embedded in the support 131 of the stimulable phosphor sheet 130 in advance, the correction data recorded in the IC chip 134 are read by the data reader 139 via the interface 135 prior to scanning a number of the stimulable phosphor layer regions 132 of the stimulable phosphor sheet 130 with a laser beam 24 and digital data produced by scanning a number of the stimulable phosphor layer regions 132 of the stimulable phosphor sheet 130 with the laser beam 24 are corrected based on the correction data, quantitative analysis can be performed with a high accuracy.

Furthermore, according to this embodiment, since ID data inherent to the stimulable phosphor sheet 10 are recorded in the IC chip 134 embedded in the support 131 of the stimulable phosphor sheet 130, the biochemical analysis data produced based on the stimulable phosphor sheet 10 can be easily handled.

Figure 33:
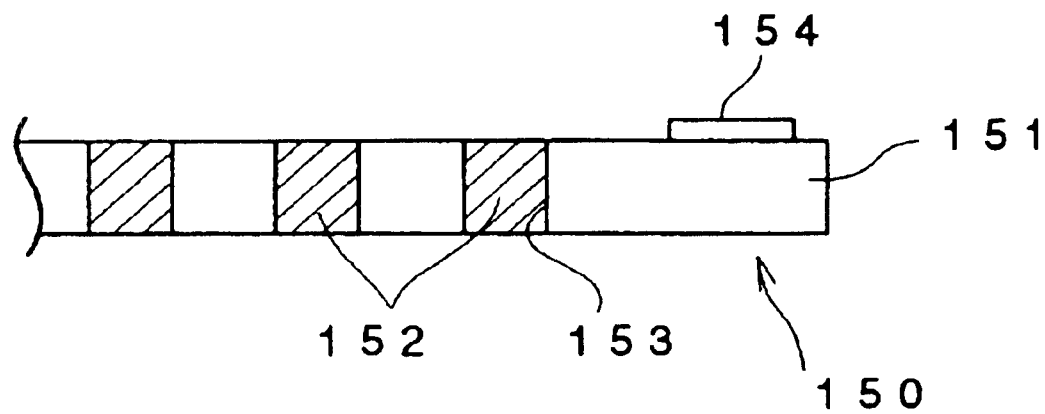
FIG. 33 is a schematic perspective view showing a stimulable phosphor sheet used in a biochemical analysis data producing method which is a further preferred embodiment of the present invention.

FIG. 33 is a schematic perspective view showing a stimulable phosphor sheet used in a biochemical analysis data producing method which is a further preferred embodiment of the present invention.

As shown in FIG. 33, a stimulable phosphor sheet 150 includes a support 151 made of silicon nitride and a number of stimulable phosphor layer regions 152 formed by embedding stimulable phosphor in a number of through-holes 153 formed in the support 151 in the same pattern as that of the absorptive regions 144 of the biochemical analysis unit 140 shown in FIG. 30 so that each of them has the same size as that of the absorptive region 144 and a substantially circular shape.

Therefore, the stimulable phosphor sheet 150 is formed so that each of the stimulable phosphor layer regions 152 of the stimulable phosphor sheet 150 faces only the corresponding absorptive region 144 formed in the substrate 142 of the biochemical analysis unit 140 when the stimulable phosphor sheet 150 is superposed on the biochemical analysis unit 140.

In this embodiment, a magnetic tape 154 is fixed to a region of the support 151 of the stimulable phosphor sheet 150 where no through-hole 153 is formed and correction data for correcting biochemical analysis data, and ID data inherent to the stimulable phosphor sheet 150, are recorded in the magnetic tape 154.

Figure 34:
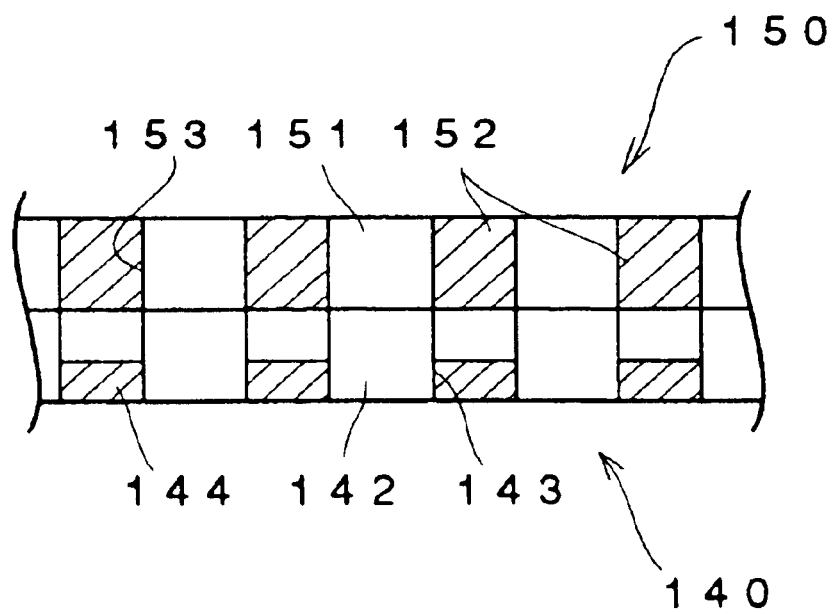
FIG. 34 is a schematic partial cross-sectional view showing a method for exposing a number of stimulable phosphor layer regions formed in a stimulable phosphor sheet shown in FIG. 33 to a radioactive labeling substance contained in a number of absorptive regions formed in a biochemical analysis unit shown in FIG. 30.

FIG. 34 is a schematic partial cross-sectional view showing a method for exposing a number of the stimulable phosphor layer regions 152 formed in the support 151 of the stimulable phosphor sheet 150 shown in FIG. 33 to a radioactive labeling substance contained in a number of the absorptive regions 144 formed in the substrate 142 of the biochemical analysis unit 140 shown in FIG. 30.

As shown in FIG. 34, when a number of the stimulable phosphor layer regions 152 formed in the support 151 of the stimulable phosphor sheet 150 are to be exposed to a radioactive labeling substance contained in a number of the absorptive regions 144 formed in the substrate 142 of the biochemical analysis unit 140, the stimulable phosphor sheet 150 is superposed on the biochemical analysis unit 140 in such a manner that each of the stimulable phosphor layer regions 152 formed by embedding stimulable phosphor in the through-holes 153 formed in the support 151 of the stimulable phosphor sheet 150 is located within the corresponding through-hole 143 formed in the substrate 142 of the biochemical analysis unit 140 and faces the corresponding absorptive region 144 therein.

During the exposure operation, electron beams (β rays) are released from the radioactive labeling substance contained in the absorptive regions 144 of the biochemical analysis unit 140. However, since a number of the absorptive regions 144 of the biochemical analysis unit 140 are formed spaced apart from each other in the substrate 142 made of stainless steel and the substrate 142 capable of attenuating radiation energy is present around each is of the absorptive regions 144, electron beams (β rays) released from the radioactive labeling substance contained in the absorptive regions 144 of the biochemical analysis unit 140 can be efficiently prevented from scattering in the substrate 142 of the biochemical analysis unit 140. Further, since the stimulable phosphor sheet 150 is superposed on the biochemical analysis unit 140 so that a number of the stimulable phosphor layer regions 152 are located within the corresponding through-holes 153 formed in the substrate 152 of the biochemical analysis unit 140, it is possible to cause electron beams (β rays) released from the radioactive labeling substance contained in each of the absorptive regions 144 formed in the substrate 142 of the biochemical analysis unit 140 to enter only the stimulable phosphor layer region 152 the absorptive region 144 faces and since a number of the stimulable phosphor layer regions 152 of the stimulable phosphor sheet 150 are formed by embedding stimulable phosphor in a number of the through-holes 153 formed spaced apart from each other in the support 131 made of silicon nitride capable of attenuating radiation energy, electron beams (β rays) released from the radioactive labeling substance contained in the absorptive regions 144 formed in the substrate 142 of the biochemical analysis unit 140 are efficiently prevented from scattering in the support 151 of the stimulable phosphor sheet 150. Therefore, since it is possible to selectively expose only the stimulable phosphor layer region 152 each of the absorptive regions 144 faces to the electron beams (β rays) released from the radioactive labeling substance contained in each of the absorptive regions 144, it is possible to effectively prevent noise caused by exposing stimulable phosphor contained in the stimulable phosphor layer region 152 to be exposed to a radioactive labeling substance contained in the corresponding absorptive region 144 of the biochemical analysis unit 140 to electron beams (β rays) released from the radioactive labeling substance contained in the neighboring absorptive regions 144 from being generated in biochemical analysis data and to produce biochemical analysis data having an excellent quantitative characteristic.

Figure 35:
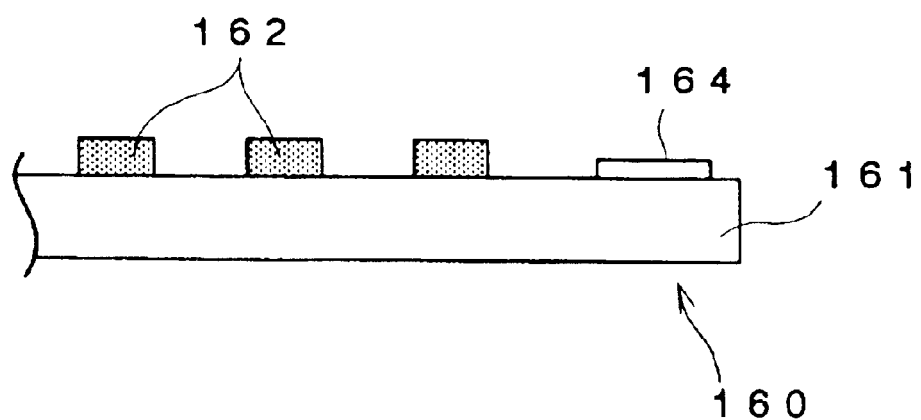
FIG. 35 is a schematic perspective view showing a stimulable phosphor sheet used in a biochemical analysis data producing method which is a further preferred embodiment of the present invention.

FIG. 35 is a schematic perspective view showing a stimulable phosphor sheet used in a biochemical analysis data producing method which is a further preferred embodiment of the present invention.

As shown in FIG. 35, a stimulable phosphor sheet 160 includes a support 161 made of polyethylene terephthalate and a number of stimulable phosphor layer regions 162 regularly formed on the support 161.

In this embodiment, a number of the stimulable phosphor layer regions 162 are formed on the support 161 according to the same regular pattern as that of a number of the through-holes 143, namely, as that of a number of the absorptive regions 144 formed in the substrate 142 of the biochemical analysis unit 140 shown in FIG. 30 so that each of them has the same size as that of the through-hole 143, namely, as that of the absorptive region 144, and a substantially circular shape. Therefore, when the stimulable phosphor sheet 160 is superposed on the biochemical analysis unit 140, each of stimulable phosphor layer regions 162 formed on the support 161 of the stimulable phosphor sheet 160 faces only the corresponding absorptive region 144 formed in the substrate 142 of the biochemical analysis unit 140.

In this embodiment, a bar code 164 is fixed to a region of the support 161 of the stimulable phosphor sheet 160 where no stimulable phosphor layer region 162 is formed and correction data for correcting biochemical analysis data, and ID data inherent to the stimulable phosphor sheet 160, are recorded in the bar code 164.

Figure 36:
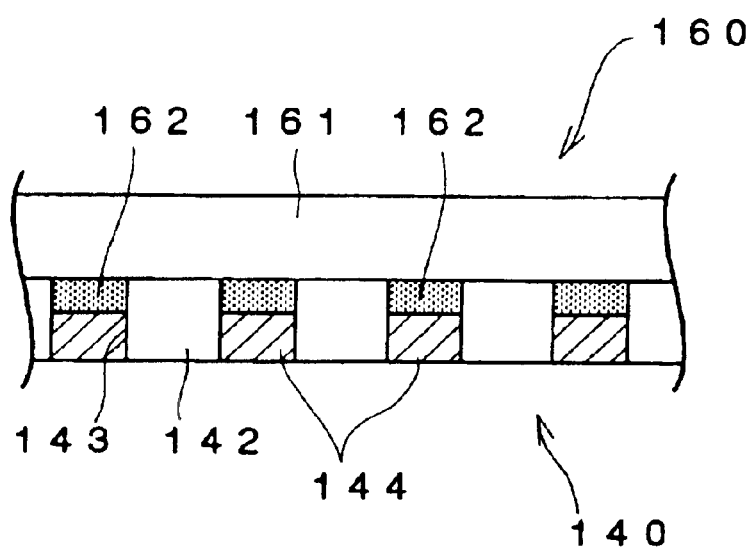
FIG. 36 is a schematic partial cross-sectional view showing a method for exposing a number of stimulable phosphor layer regions formed in a stimulable phosphor sheet shown in FIG. 35 to a radioactive labeling substance contained in a number of absorptive regions formed in a biochemical analysis unit shown in FIG. 30.

FIG. 36 is a schematic partial cross-sectional view showing a method for exposing a number of the stimulable phosphor layer regions 162 formed on the support 161 of the stimulable phosphor sheet 160 shown in FIG. 35 to a radioactive labeling substance contained in a number of the absorptive regions 144 formed in the substrate 142 of the biochemical analysis unit 140 shown in FIG. 30.

As shown in FIG. 36, when a number of the stimulable phosphor layer regions 162 formed on the support 161 of the stimulable phosphor sheet 160 are exposed to a radioactive labeling substance contained in a number of the absorptive regions 144 formed in the substrate 142 of the biochemical analysis unit 140, the stimulable phosphor sheet 160 is superposed on the biochemical analysis unit 140 in such a manner that each of the stimulable phosphor layer regions 162 formed on the support 161 of the stimulable phosphor sheet 160 is located within the corresponding through-hole 143 formed in the substrate 142 of the biochemical analysis unit 140 and faces the corresponding absorptive region 144 therein.

During the exposure operation, electron beams (β rays) are released from the radioactive labeling substance contained in the absorptive regions 144 of the biochemical analysis unit 140. However, since a number of the absorptive regions 144 of the biochemical analysis unit 140 are formed spaced apart from each other in the substrate 142 made of stainless steel and the substrate 142 capable of attenuating radiation energy is present around each of the absorptive regions 144, electron beams (β rays) released from the radioactive labeling substance contained in the absorptive regions 144 of the biochemical analysis unit 140 can be efficiently prevented from scattering in the substrate 142 of the biochemical analysis unit 140. Further, since the stimulable phosphor sheet 150 is superposed on the biochemical analysis unit 140 so that a number of the stimulable phosphor layer regions 152 are located within the corresponding through-holes 153 formed in the substrate 152 of the biochemical analysis unit 140, it is possible to cause electron beams (β rays) released from the radioactive labeling substance contained in each of the absorptive regions 144 formed in the substrate 142 of the biochemical analysis unit 140 to enter only the stimulable phosphor layer region 152 the absorptive region 144 faces and since the support 161 of the stimulable phosphor sheet 160 is made of polyethylene terephthalate capable of attenuating radiation energy, electron beams (β rays) released from the radioactive labeling substance contained in the absorptive regions 144 formed in the substrate 142 of the biochemical analysis unit 140 are efficiently prevented from scattering in the support 161 of the stimulable phosphor sheet 160. Therefore, since it is possible to selectively expose only the stimulable phosphor layer region 162 each of the absorptive regions 144 faces to the electron beams (β rays) released from the radioactive labeling substance contained in each of the absorptive regions 144, it is possible to effectively prevent noise caused by exposing stimulable phosphor contained in the stimulable phosphor layer region 162 to be exposed to a radioactive labeling substance contained in the corresponding absorptive region 144 of the biochemical analysis unit 140 to electron beams (β rays) released from the radioactive labeling substance contained in the neighboring absorptive regions 144 from being generated in biochemical analysis data and to produce biochemical analysis data having an excellent quantitative characteristic.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, as specific binding substances, cDNAs each of which has a known base sequence and is different from the others are used. However, specific binding substances usable in the present invention are not limited to cDNAs but all specific binding substances capable of specifically binding with a substance derived from a living organism such as a cell, virus, hormone, tumor marker, enzyme, antibody, antigen, abzyme, other protein, a nuclear acid, cDNA, DNA, RNA or the like and whose sequence, base length, composition and the like are known, can be employed in the present invention as a specific binding substance.

Further, the absorptive regions 4, 144 of the biochemical analysis unit 1, 140 are formed by embedding nylon-6 in a number of the through-holes 3, 143 formed in the substrate 2, 142 made of stainless steel in the embodiments shown in FIGS. 1 and 30 and the absorptive regions 84 of the biochemical analysis unit 80 are formed by pressing the absorptive membrane 83 made of nylon-6 in a number of the through-holes 82 formed in the substrate 81 made of stainless steel in the embodiment shown in FIGS. 16 and 17. However, absorptive material for forming the absorptive regions 4, 84, 144 of the biochemical analysis unit 1, 80, 144 is not limited to nylon-6 and other kinds of absorptive materials can be employed instead for forming the absorptive regions 4, 84, 144 of the biochemical analysis unit 1, 80, 140. A porous material or a fiber material may be preferably used as the absorptive material for forming the absorptive regions 4, 84, 144 of the biochemical analysis unit 1, 80, 140 and the absorptive regions 4, 84, 144 of the biochemical analysis unit 1, 80, 140 may be formed by combining a porous material and a fiber material. A porous material for forming the absorptive regions 4, 84, 144 of the biochemical analysis unit 1, 80, 140 may be any type of an organic material or an inorganic material and may be an organic/inorganic composite material. An organic porous material used for forming the absorptive regions 4, 84, 144 of the biochemical analysis unit 1, 80, 140 is not particularly limited but a carbon porous material such as an activated carbon or a porous material capable of forming a membrane filter can be preferably used. Illustrative examples of porous materials capable of forming a membrane filter include nylons such as nylon-6, nylon-6,6, nylon-4,10; cellulose derivatives such as nitrocellulose, acetyl cellulose, butyric-acetyl cellulose; collagen; alginic acids such as alginic acid, calcium alginate, alginic acid/poly-L-lysine polyionic complex; polyolefins such as polyethylene, polypropylene; polyvinyl chloride; polyvinylidene chloride; polyfluoride such as polyvinylidene fluoride, polytetrafluoride; and copolymers or composite materials thereof. An inorganic porous material used for forming the absorptive regions 4, 84, 144 of the biochemical analysis unit 1, 80, 140 is not particularly limited. Illustrative examples of inorganic porous materials preferably usable in the present invention include metals such as platinum, gold, iron, silver, nickel, aluminum and the like; metal oxides such as alumina, silica, titania, zeolite and the like; metal salts such as hydroxy apatite, calcium sulfate and the like; and composite materials thereof. A fiber material used for forming the absorptive regions 4, 84, 144 of the biochemical analysis unit 1, 80, 140 is not particularly limited. Illustrative examples of fiber materials preferably usable in the present invention include nylons such as nylon-6, nylon-6,6, nylon-4,10; and cellulose derivatives such as nitrocellulose, acetyl cellulose, butyric-acetyl cellulose.

Moreover, in the above described embodiments, although the substrate 2, 81, 142 of the biochemical analysis unit 1, 80, 140 is made of stainless steel, it is not absolutely necessary to make the substrate 2, 81, 142 of the biochemical analysis unit 1, 80, 140 of stainless steel. In the case where the absorptive regions 4, 84, 144 are formed in the holes formed spaced apart from each other in the substrate 2, 81, 142, the substrate 2, 81, 142 of the biochemical analysis unit 1, 80, 140 is preferably formed of material capable of attenuating radiation energy but the material for forming the substrate 2, 81, 142 of the biochemical analysis unit 1, 80, 140 is not particularly limited. The substrate 2, 81, 142 of the biochemical analysis unit 1, 80, 140 can be formed of either inorganic compound material or organic compound material and is preferably formed of metal material, ceramic material or plastic material. Illustrative examples of inorganic compound materials include metals such as gold, silver, copper, zinc, aluminum, titanium, tantalum, chromium, steel, nickel, cobalt, lead, tin, selenium and the like; alloys such as brass, stainless, bronze and the like; silicon materials such as silicon, amorphous silicon, glass, quartz, silicon carbide, silicon nitride and the like; metal oxides such as aluminum oxide, magnesium oxide, zirconium oxide and the like; and inorganic salts such as tungsten carbide, calcium carbide, calcium sulfate, hydroxy apatite, gallium arsenide and the like. High molecular compounds are preferably used as organic compound material and illustrative examples thereof include polyolefins such as polyethylene, polypropylene and the like; acrylic resins such as polymethyl methacrylate, polybutylacrylate/polymethyl methacrylate copolymer and the like; polyacrylonitrile; polyvinyl chloride; polyvinylidene chloride; polyvinylidene fluoride; polytetrafluoroethylene; polychlorotrifluoroethylene; polycarbonate; polyesters such as polyethylene naphthalate, polyethylene terephthalate and the like; nylons such as nylon-6, nylon-6,6, nylon-4,10 and the like; polyimide; polysulfone; polyphenylene sulfide; silicon resins such as polydiphenyl siloxane and the like; phenol resins such as novolac and the like; epoxy resin; polyurethane; polystyrene, butadienestyrene copolymer; polysaccharides such as cellulose, acetyl cellulose, nitrocellulose, starch, calcium alginate, hydroxypropyl methyl cellulose and the like; chitin; chitosan; urushi (Japanese lacquer); polyamides such as gelatin, collagen, keratin and the like; and copolymers of these high molecular materials.

Furthermore, in the above-described embodiments, the absorptive regions 4, 84, 144 of the biochemical analysis unit 1, 80, 140 are formed in the through-holes 3, 82, 143 formed spaced apart from each other in the substrate 2, 81, 142, but it is not absolutely necessary to form the absorptive regions 4, 84, 144 of the biochemical analysis unit 1, 80, 140 in the through-holes 3, 82, 143 formed spaced apart from each other in the substrate 2, 81, 142 and the absorptive regions may be instead formed spaced apart from each other by spotting a solution containing specific binding substances such as a plurality of cDNAs.

Moreover, in the above described embodiments, although 19,200 of substantially circular absorptive regions 4, 84, 144 having a size of about 0.07 $cm^2$ are regularly formed in the biochemical analysis unit 1, 80, 140 in the manner of a matrix of 120 columns×160 lines, the number or size of the absorptive regions 4, 84, 144 may be arbitrarily selected in accordance with the purpose. Preferably, 10 or more of the absorptive regions 4, 84, 144 having a size of 5 $cm^2$ or less are formed in the biochemical analysis unit 1, 80, 140 at a density of 10/$cm^2$ or less.

Furthermore, in the above described embodiments, although 19,200 of substantially circular absorptive regions 4, 84, 144 having a size of about 0.07 $cm^2$ are regularly formed in the biochemical analysis unit 1, 80, 140 in the manner of a matrix of 120 columns×160 lines, it is not absolutely necessary to regularly form the absorptive regions 4, 84, 144 in the biochemical analysis unit 1.

Moreover, in the above described embodiments, although each of the absorptive regions 4, 84, 144 are formed substantially circular, the shape of each of the absorptive regions 4, 84, 144 is not limited to substantially a circular shape and may be arbitrarily selected.

Further, in the embodiment shown in FIGS. 18 and 19, although the stimulable phosphor layer regions 95 of the stimulable phosphor sheet 90 are formed by pressing the stimulable phosphor membrane 91 in a number of the through-holes 92 formed in the stainless steel substrate 93 using a calender processing apparatus, it is not absolutely necessary to form the stimulable phosphor layer regions 95 by pressing the stimulable phosphor membrane 91 in the through-holes 92 formed in the stainless steel substrate 93 using a calender processing apparatus and the stimulable phosphor membrane 91 may be pressed in the through-holes 92 formed in the stainless steel substrate 93 by other means. Moreover, the stimulable phosphor layer regions 95 may be formed by charging stimulable phosphor in the through-holes 92 formed in the stainless steel substrate 93 by an appropriate method instead of the press-fit method.

Furthermore, the stimulable phosphor layer regions 12 of the stimulable phosphor sheet 10 are formed by embedding stimulable phosphor in a number of the through-holes 13 formed in the support 11 made of stainless steel in the embodiment shown in FIGS. 4 and 5, the stimulable phosphor layer regions 95 of the stimulable phosphor sheet 90 are formed by pressing the stimulable phosphor membrane 91 in a number of the through-holes 92 formed in the stainless steel substrate 93 in the embodiment shown in FIGS. 18 and 19, the stimulable phosphor layer regions 132 of the stimulable phosphor sheet 130 are formed by embedding stimulable phosphor in a number of the recesses 133 formed in the substrate 131 made of stainless steel in the embodiment shown in FIG. 28, and the stimulable phosphor layer regions 152 of the stimulable phosphor sheet 150 are formed by embedding stimulable phosphor in a number of the through-holes 153 formed in the support 151 made of silicon nitride in the embodiment shown in FIG. 33. However, it is not absolutely necessary to form the support 11, 131, 151 of the stimulable phosphor sheet 10, 130, 150 or the substrate 93 of the stimulable phosphor sheet 90 of stainless steel or silicon nitride and the support 11, 131, 151 of the stimulable phosphor sheet 10, 130, 150 or the substrate 93 of the stimulable phosphor sheet 90 can be made of other material. The support 11, 131, 151 of the stimulable phosphor sheet 10, 130, 150 or the substrate 93 of the stimulable phosphor sheet 90 is preferably made of material capable of attenuating radiation energy but the material for forming the support 11, 131, 151 of the stimulable phosphor sheet 10, 130, 150 or the substrate 93 of the stimulable phosphor sheet 90 is not particularly limited. The support 11, 131, 151 of the stimulable phosphor sheet 10, 130, 150 or the substrate 93 of the stimulable phosphor sheet 90 can be formed of either inorganic compound material or organic compound material and is preferably formed of metal material, ceramic material or plastic material. Illustrative examples of inorganic compound materials include metals such as gold, silver, copper, zinc, aluminum, titanium, tantalum, chromium, steel, nickel, cobalt, lead, tin, selenium and the like; alloys such as brass, stainless, bronze and the like; silicon materials such as silicon, amorphous silicon, glass, quartz, silicon carbide, silicon nitride and the like; metal oxides such as aluminum oxide, magnesium oxide, zirconium oxide and the like; and inorganic salts such as tungsten carbide, calcium carbide, calcium sulfate, hydroxy apatite, gallium arsenide and the like. High molecular compounds are preferably used as organic compound material and illustrative examples thereof include polyolefins such as polyethylene, polypropylene and the like; acrylic resins such as polymethyl methacrylate, polybutylacrylate/polymethyl methacrylate copolymer and the like; polyacrylonitrile; polyvinyl chloride; polyvinylidene chloride; polyvinylidene fluoride; polytetrafluoroethylene; polychlorotrifluoroethylene; polycarbonate; polyesters such as polyethylene naphthalate, polyethylene terephthalate and the like; nylons such as nylon-6, nylon-6,6, nylon-4,10 and the like; polyimide; polysulfone; polyphenylene sulfide; silicon resins such as polydiphenyl siloxane and the like; phenol resins such as novolac and the like; epoxy resin; polyurethane; polystyrene, butadienestyrene copolymer; polysaccharides such as cellulose, acetyl cellulose, nitrocellulose, starch, calcium alginate, hydroxypropyl methyl cellulose and the like; chitin; chitosan; urushi (Japanese lacquer); polyamides such as gelatin, collagen, keratin and the like; and copolymers of these high molecular materials.

Moreover, the stimulable phosphor layer regions 112 of the stimulable phosphor sheet 110 are formed on the surface of the support 111 made of stainless steel capable of attenuating radiation energy in the embodiment shown in FIG. 23 and the stimulable phosphor layer regions 162 of the stimulable phosphor sheet 160 are formed on the surface of the support 161 made of polyethylene terephthalate capable of attenuating radiation energy in the embodiment shown in FIG. 35. However, in the case where the stimulable phosphor layer regions 112, 162 are formed on the surface of the support 111, 161, it is not absolutely necessary for the support 111, 161 to be capable of attenuating radiation energy.

Further, although the stimulable phosphor membrane 91 and the stainless steel substrate 93 are adhered to each other using an adhesive agent 96 in the embodiment shown in FIGS. 18 and 19, it is not absolutely necessary to use an adhesive agent 96.

Furthermore, in the embodiment shown in FIGS. 4 and 5, embodiment shown in FIGS. 18 and 19, embodiment shown in FIG. 23, embodiment shown in FIG. 28, embodiment shown in FIG. 33 and embodiment shown in FIG. 35, correspondingly to the absorptive regions 4, 84, 144 of the biochemical analysis unit 1, 80, 140, 19,200 substantially circular stimulable phosphor layer regions 12, 95, 112, 132, 152, 162 having a size of about 0.07 cm$^2$ are regularly formed in the stimulable phosphor sheet 10, 90, 110, 130, 150, 160 in the manner of a matrix of 120 columns×160 lines. However, the shape of each of the stimulable phosphor layer regions 12, 95, 112, 132, 152, 162 is not limited to substantially a circular shape and may be arbitrarily selected.

Moreover, in the embodiment shown in FIGS. 4 and 5, embodiment shown in FIGS. 18 and 19, embodiment shown in FIG. 23, embodiment shown in FIG. 28, embodiment shown in FIG. 33 and embodiment shown in FIG. 35, correspondingly to the absorptive regions 4, 84, 144 of the biochemical analysis unit 1, 80, 140, 19,200 substantially circular stimulable phosphor layer regions 12, 95, 112, 132, 152, 162 having a size of about 0.07 cm$^2$ are regularly formed in the stimulable phosphor sheet 10, 90, 110, 130, 150, 160 in the manner of a matrix of 120 columns×160 lines. However, the number or size of the stimulable phosphor layer regions 12, 95, 112, 132, 152, 162 may be arbitrarily selected in accordance with the purpose. Preferably, 10 or more of the stimulable phosphor layer regions 12, 95, 112, 132, 152, 162 having a size of 5 cm$^2$ or less are formed in the stimulable phosphor sheet 10, 90, 110, 130, 150, 160 at a density of 10/cm$^2$ or less.

Further, in the embodiment shown in FIGS. 4 and 5, embodiment shown in FIGS. 18 and 19, embodiment shown in FIG. 23, embodiment shown in FIG. 28, embodiment shown in FIG. 33 and embodiment shown in FIG. 35, correspondingly to the absorptive regions 4, 84, 144 of the biochemical analysis unit 1, 80, 140, 19,200 substantially circular stimulable phosphor layer regions 12, 95, 112, 132, 152, 162 having a size of about 0.07 cm$^2$ are regularly formed in the stimulable phosphor sheet 10, 90, 110, 130, 150, 160 in the manner of a matrix of 120 columns×160 lines. However, it is sufficient for the stimulable phosphor layer regions 12, 95, 112, 132, 152, 162 to be formed in the same pattern as that of the absorptive regions 4, 84, 144 of the corresponding biochemical analysis unit 1, 80, 140 and it is not absolutely necessary to regularly form the stimulable phosphor layer regions 12, 95, 112, 132, 152, 162.

Furthermore, in the above described embodiments, although each of the stimulable phosphor layer regions 12, 95, 112, 132, 152, 162 of the stimulable phosphor sheet 10, 90, 110, 130, 150, 160 has the same size as that of each of the absorptive regions 4, 84, 144 of the corresponding biochemical analysis unit 1, 80, 140, it is not absolutely necessary to form each of the stimulable phosphor layer regions 12, 95, 112, 132, 152, 162 of the stimulable phosphor sheet 10, 90, 110, 130, 150, 160 so as to have the same size as that of each of the absorptive regions 4, 84, 144 of the corresponding biochemical analysis unit 1, 80, 140 and each of the stimulable phosphor layer regions 12, 95, 112, 132, 152, 162 of the stimulable phosphor sheet 10, 90, 110, 130, 150, 160 is preferably formed so as to have a size equal to or larger than each of the absorptive regions 4, 84, 144 of the corresponding biochemical analysis unit 1, 80, 140.

Further, in the above described embodiments, a hybridization reaction solution 9, 149 containing a substance derived from a living organism labeled with a radioactive labeling substance and a substance derived from a living organism labeled with a fluorescent substance such as a fluorescent dye is prepared and the substance derived from a living organism is selectively hybridized with the specific binding substances contained in a number of the absorptive regions 4, 84, 144 of the biochemical analysis unit 1, 80, 140. However, it is not absolutely necessary for substances derived from a living organism contained in a hybridization solution 9, 149 to be labeled with a radioactive labeling substance and a fluorescent substance and it is sufficient for substances derived from a living organism contained in a hybridization solution 9, 149 to be labeled with at least a radioactive labeling substance.

Furthermore, in the above described embodiments, specific binding substances are hybridized with substances derived from a living organism labeled with a radioactive labeling substance and a fluorescent substance. However, it is not absolutely necessary to hybridize substances derived from a living organism with specific binding substances and substances derived from a living organism may be specifically bound with specific binding substances by means of antigen-antibody reaction, receptor-ligand reaction or the like instead of hybridization.

Moreover, in the above described embodiments, biochemical analysis data are produced by reading radiation data of a radioactive labeling substance recorded in a number of the stimulable phosphor layer regions 12 formed in the stimulable phosphor sheet 10 and fluorescence data of a fluorescent substance such as a fluorescent dye recorded in a number of the absorptive regions 4 formed in the biochemical analysis unit 1 using the scanner shown in FIGS. 7 to 14. However, it is not absolutely necessary to produce biochemical analysis data by reading radiation data of a radioactive labeling substance and fluorescence data of a fluorescent substance using a single scanner and biochemical analysis data may be produced by reading radiation data of a radioactive labeling substance and fluorescence data of a fluorescent substance using separate scanners.

Further, although in the embodiment shown in FIGS. 7 to 14, the embodiment shown in FIG. 22 and the embodiment shown in FIG. 25, the on and off operation of the first laser stimulating ray source 21 is controlled by the control unit 70 in synchronism with the intermittent movement of the optical head 35, if the moving speed of the optical head 35 in the main scanning direction is determined so that the laser beam 24 quickly passes portions between neighboring stimulable phosphor layer regions 12, 95, 112 in the main scanning direction, biochemical analysis data may be produced by merely intermittently moving the optical head 35 while the first laser stimulating ray source 21 is kept on, thereby sequentially scanning a number of the stimulable phosphor layer regions 12, 95, 112 with the laser beam 24 and photoelectrically detecting stimulated emission 45 released from the stimulable phosphor layer regions 12, 95, 112.

Furthermore, in the embodiment shown in FIG. 22, although analog signals output from the photomultiplier 50 are integrated using the integrating amplifier 75 in the case of intermittently moving the optical head 35 in the main scanning direction and controlling the on and off operation of the first laser stimulating ray source 21, analog signals output from the photomultiplier 50 may be integrated using the integrating amplifier 75 in the embodiment shown in FIG. 27 where the optical head 35 is continuously moved at a constant speed in the main scanning direction.

Moreover, in the embodiment shown in FIG. 25, although digital signals output from the A/D converter 53 are added using the adding means 76 in the case of intermittently moving the optical head 35 in the main scanning direction and controlling the on and off operation of the first laser stimulating ray source 21, digital signals output from the A/D converter 53 may be added using the adding means 76 in the embodiment shown in FIG. 27 where the optical head 35 is continuously moved at a constant speed in the main scanning direction.

Further, although the scanner shown in FIGS. 7 to 14 includes the first laser stimulating ray source 21, the second laser stimulating ray source 22 and the third laser stimulating ray source 23, it is not absolutely necessary for the scanner to include three laser stimulating ray sources.

Furthermore, although the scanner shown in FIGS. 7 to 14 includes the first laser stimulating ray source 21 for emitting a laser beam 24 having a wavelength of 640 nm, the second laser stimulating ray source 22 for emitting a laser beam 24 having a wavelength of 532 nm and the third laser stimulating ray source 23 for emitting a laser beam 24 having a wavelength of 473 nm, it is not absolutely necessary to employ a laser stimulating ray source as a stimulating ray source and an LED (light emitting diode) light source may be employed as a stimulating ray source instead of a laser stimulating ray source. Further, it is possible to employ a halogen lamp as a stimulating ray source and to provide a spectral filter to cut wavelength components which cannot contribute to the excitation of stimulable phosphor.

Moreover, the scanner shown in FIGS. 7 to 14 is constituted so that all of the stimulable phosphor layer regions 12 of the stimulable phosphor sheet 10 or all of the absorptive regions 4 of the biochemical analysis unit 1 are scanned with a laser beam 24 to excite stimulable phosphor or a fluorescent substance such as a fluorescent dye by moving the optical head 35 using a scanning mechanism in the main scanning direction indicated by the arrow X direction and the sub-scanning direction indicated by the arrow Y in FIG. 13. However, all of the stimulable phosphor layer regions 12 of the stimulable phosphor sheet 10 or all of the absorptive regions 4 of the biochemical analysis unit 1 may be scanned with a laser beam 24 to excite stimulable phosphor or a fluorescent substance such as a fluorescent dye by moving the stage 40 in the main scanning direction indicated by the arrow X direction and the sub-scanning direction indicated by the arrow Y in FIG. 13, while holding the optical head 35 stationary, or moving the optical head 35 in the main scanning direction indicated by the arrow X direction or the sub-scanning direction indicated by the arrow Y in FIG. 13 and moving the stage 40 in the sub-scanning direction indicated by the arrow Y or the main scanning direction indicated by the arrow X in FIG. 13.

Further, the scanner shown in FIGS. 7 to 14 employs the photomultiplier 50 as a light detector to photoelectrically detect fluorescent light or stimulated. However, it is sufficient for the light detector used in the present invention to be able to photoelectrically detect fluorescent light or stimulated emission and it is possible to employ a light detector such as a line CCD or a two-dimensional CCD instead of the photomultiplier 50.

Furthermore, in the above-described embodiments, a solution containing specific binding substances such as cDNAs are spotted using the spotting device 5 including an injector 6 and a CCD camera 7 so that when the tip end portion of the injector 6 and the center of the absorptive region 4 into which a solution containing specific binding substances is to be spotted are determined to coincide with each other as a result of viewing them using the CCD camera 7, the solution containing the specific binding substances such as cDNA is spotted from the injector 6. However, the solution containing specific binding substances such as cDNAs can be spotted by detecting the positional relationship between a number of the absorptive regions 4 formed in the biochemical analysis unit 1 and the tip end portion of the injector 6 in advance and two-dimensionally moving the biochemical analysis unit 1 or the tip end portion of the injector 6 so that the tip end portion of the injector 6 coincides with each of the absorptive regions 4.

Moreover, the exposure device provided with the planar β-ray source 18 for uniformly emitting β rays in the embodiment shown in FIG. 15, the exposure device provided with the ultra-violet ray source 100 for emitting ultra-violet rays in the embodiment shown in FIG. 20, the exposure device provided with the linear fluorescent lamp 115 for emitting ultra-violet rays in the embodiment shown in FIG. 24, or the exposure device provided with the ultra-violet ray source 120 for emitting ultra-violet rays 121 and the condenser lens 122 for condensing ultra-violet rays 121 emitted from the ultra-violet ray source 120 onto each of the stimulable phosphor layer regions 112 formed in the stimulable phosphor sheet 110 in the embodiment shown in FIG. 26, is used for producing a correction coefficient αi for correcting digital data obtained from the individual stimulable phosphor layer regions 12, 95, 112. However, the exposure device for producing the correction coefficient αi for correcting digital data obtained from the individual stimulable phosphor layer regions 12, 95, 112 is not limited to such types of the exposure devices and a flash lamp, a stroboscopic lamp, an X-ray source, a soft X-ray source or the like may be used as an exposure device.

Further, in the above described embodiments, radiation data of the radioactive labeling substance recorded in a number of the stimulable phosphor layer regions 12, 95, 112, 132, 152, 162 of the stimulable phosphor sheet 10, 90, 110, 130, 150, 160 and fluorescence data of the fluorescent substance such as a fluorescent dye recorded in a number of the absorptive regions 4, 84, 144 of the biochemical analysis unit 1, 80, 140 are read by the scanner to produce biochemical analysis data. However, radiation data of the radioactive labeling substance recorded in a number of the stimulable phosphor layer regions 12, 95, 112, 132, 152, 162 of the stimulable phosphor sheet 10, 90, 110, 130, 150, 160 and fluorescence data of the fluorescent substance such as a fluorescent dye recorded in a number of the absorptive regions 4, 84, 144 of the biochemical analysis unit 1, 80, 140 may be read by a solid state sensor such as a CCD area sensor, a CCD line sensor or the like instead of the scanner to produce biochemical analysis data.

Furthermore, correction data are produced and stored in the memory 55 of the scanner by exposing a number of the stimulable phosphor layer regions 12, 95, 112 of the stimulable phosphor sheet 10, 90, 110 using the exposure device provided with the planar P-ray source 18 for uniformly emitting β rays in the embodiment shown in FIG. 15, the exposure device provided with the ultra-violet ray source 100 for emitting ultra-violet rays in the embodiment shown in FIG. 20, the exposure device provided with the linear fluorescent lamp 115 for emitting ultra-violet rays in the embodiment shown in FIG. 24 or the exposure device provided with the ultra-violet ray source 120 for emitting ultra-violet rays 121 and the condenser lens 122 for condensing ultra-violet rays 121 emitted from the ultra-violet ray source 120 onto each of the stimulable phosphor layer regions 112 formed in the stimulable phosphor sheet 110 in the embodiment shown in FIG. 26. However, correction data may be produced and stored in the memory 55 by providing a standard light source such an ultra-violet ray source, a flash lamp, a stroboscopic lamp or the like or a standard radiation source such as an X-ray source, a soft X-ray source, a β-ray source or the like in the scanner, irradiating the stimulable phosphor sheet 10, 90, 110 placed on the stage 40 of the scanner with light from the standard light source or radiation from the standard radiation source, exposing a number of the stimulable phosphor layer regions 12, 95, 112 of the stimulable phosphor sheet 10, 90, 110, then irradiating a number of the stimulable phosphor layer regions 12, 95, 112 of the stimulable phosphor sheet 10, 90, 110 with a laser beam 24 emitted from the first laser stimulating ray source 21 to excite stimulable phosphor contained in the stimulable phosphor layer regions 12, 95, 112 and photoelectrically detecting stimulated emission 45 released from the stimulable phosphor by the photomultiplier 50.

Moreover, correction data are produced and stored in the memory 55 of the scanner by exposing a number of the stimulable phosphor layer regions 12, 95, 112 of the stimulable phosphor sheet 10, 90, 110 using the exposure device provided with the planar P-ray source 18 for uniformly emitting β rays in the embodiment shown in FIG. 15, the exposure device provided with the ultra-violet ray source 100 for emitting ultra-violet rays in the embodiment shown in FIG. 20, the exposure device provided with the linear fluorescent lamp 115 for emitting ultra-violet rays in the embodiment shown in is FIG. 24 or the exposure device provided with the ultra-violet ray source 120 for emitting ultra-violet rays 121 and the condenser lens 122 for condensing ultra-violet rays 121 emitted from the ultra-violet ray source 120 onto each of the stimulable phosphor layer regions 112 formed in the stimulable phosphor sheet 110 in the embodiment shown in FIG. 26. However, it is possible for the supplier of the stimulable phosphor sheet 10, 90, 110 to produce correction data, store them in a memory medium such as a CDROM, a floppy disk or the like and supply the memory medium such as a CDROM, a floppy disk or the like storing the correction data together with the stimulable phosphor sheet 10, 90, 110 to the user and for the user to write the correction data stored in the memory medium such as a CDROM, a floppy disk or the like in the memory 55 of the scanner.

Further, in the embodiments, although ID data inherent to the stimulable phosphor sheet 130, 150, 160 are recorded in the IC chip 134, the magnetic tape 154 and the bar code 164 formed in the support 131, 151, 161 together with the correction data, it is not absolutely necessary to record the ID data in the IC chip 134, the magnetic tape 154 and the bar code 164.

Furthermore, in the above described embodiments, the hybridization reaction solution 9 containing a substance derived from a living organism and labeled with a radioactive labeling substance and a substance derived from a living organism and labeled with a fluorescent substance such as a fluorescent dye is prepared and the substance derived from a living organism and labeled with the radioactive labeling substance and the substance derived from a living organism and labeled with the fluorescent substance such as a fluorescent dye are selectively hybridized with specific binding substances contained in a number of the absorptive regions 4 of the biochemical analysis unit 1, whereby radiation data and fluorescent data are recorded in a number of the absorptive regions 4 of the biochemical analysis unit 1. The radiation data recorded in a number of the absorptive regions 4 of the biochemical analysis unit 1 are transferred onto a number of the stimulable phosphor layer regions 12, 95 formed in the stimulable phosphor sheet 10, 90 and the radiation data transferred onto a number of the stimulable phosphor layer regions 12, 95 of the stimulable phosphor sheet 10, 90 are read by the scanner shown in FIGS. 7 to 14, thereby oroducing biochemical analysis data. However, it is also possible to produce biochemical analysis data by preparing a hybridization reaction solution 9 containing a substance derived from a living organism and labeled with a labeling substance which generates chemiluminescent emission when it contacts a chemiluminescent substrate, hybridizing the substance derived from a living organism and labeled with the labeling substance which generates chemiluminescent emission when it contacts a chemiluminescent substrate with specific binding substances contained in a number of the absorptive regions 4 of the biochemical analysis unit 1, thereby recording chemiluminescent data in a number of the absorptive regions 4 of the biochemical analysis unit 1, causing a chemiluminescent substrate to come into contact with a number of the absorptive regions 4 of the biochemical analysis unit 1, thereby causing a number of the absorptive regions 4 of the biochemical analysis unit 1 to release chemiluminescent emission, superposing the stimulable phosphor sheet 10, 90 on the biochemical analysis unit 1 formed with a number of the absorptive regions 4 releasing chemiluminescent emission, exposing a number of the stimulable phosphor layer regions 12, 95 of the stimulable phosphor sheet 10, 90 to chemiluminescent emission released from a number of the absorptive regions 4 of the biochemical analysis unit 1, thereby storng the energy of chemiluminescent emission in a number of the stimulable phosphor layer regions 12, 95 of the stimulable phosphor sheet 10, 90, scanning the stimulable phosphor layer regions 12, 95 of the stimulable phosphor sheet 10, 90 with the laser beam 24 using the scanner shown in FIGS. 7 to 14, photoelectrically detecting stimulated emission 45 released from the stimulable phosphor layer regions 12, 95 of the stimulable phosphor sheet 10, 90 to read the chemiluminescent data. In the case where the stimulable phosphor layer regions 12, 95 of the stimulable phosphor sheet 10, 90 are exposed to chemiluminescent emission released from a number of the absorptive regions 4 of the biochemical analysis unit 1, since a number of the absorptive regions 4 of the biochemical analysis unit 1 are formed by charging nylon-6 in a number of the through-holes 3 formed in the substrate 2 made of stainless steel capable of attenuating light energy and a number of the stimulable phosphor layer regions 12, 95 of the stimulable phosphor sheet 10, 90 are formed by charging stimulable phosphor in the through-holes 13, 92 formed in the support 11 or the stainless steel substrate 93 made of stainless steel capable of attenuating light energy, it is also possible to effectively prevent chemiluminescent emission released from a number of the absorptive regions 4 of the biochemical analysis unit 1 from being scattered in the substrate 2 of the biochemical analysis unit 1, the support 11 of the stimulable phosphor sheet 10 or the stainless steel substrate 93 of the stimulable phosphor sheet 90. Therefore, it is possible to effectively prevent noise from being generated in biochemical analysis data produced by photoelectrically detecting stimulated emission released from the stimulable phosphor layer in response to the stimulation with a stimulating ray and to produce biochemical analysis data having a high quantitative accuracy. In the present invention, in the case where chemiluminescent data are to be recorded in a number of the stimulable phosphor regions 12, 95, 112, 132, 152, 162 of the stimulable phosphor sheet 10, 90, 110, 130, 150, 160, correction data are preferably produced using a flash lamp and a stroboscopic lamp as an exposure device.

According to the present invention, it is possible to provide a biochemical analysis data producing method and apparatus and a stimulable phosphor sheet used therefor, which can read radiation data or chemiluminescent data and produce biochemical analysis data having excellent quantitative characteristics with high resolution even in the case of forming at a high density on the surface of a carrier such as a membrane filter a plurality of spot-like regions containing specific binding substances which can specifically bind with a substance derived from a living organism and whose sequence, base length, composition and the like are known and selectively labeling the plurality of spot-like regions with a radioactive labeling substance, thereby recording radiation data therein or in the case of forming at a high density on the surface of a carrier such as a membrane filter a plurality of spot-like regions containing specific binding substanceswhich can specifically bind with a, substance derived from a living organism and whose sequence, base length, composition and the like are known and selectively labeling the plurality of spot-like regions with a labeling substance which generates chemiluminescent emission when it contacts a chemiluminescent substrate, thereby recording chemiluminescent data therein.

What is claimed is:

1. A biochemical analysis data producing method comprising steps of irradiating a stimulable phosphor sheet including a support in which a plurality of stimulable phosphor layer regions are formed spaced apart from each other with light emitted from a standard light source or radiation emitted from a standard radiation source to expose the plurality of stimulable phosphor layer regions, irradiating the plurality of stimulable phosphor layer regions with a stimulating ray to excite stimulable phosphor contained in the plurality of stimulable phosphor layer regions, photoelectrically detecting stimulated emission released from the plurality of stimulable phosphor layer regions to produce correction data for the individual stimulable phosphor layer regions, superposing the stimulable phosphor sheet on a biochemical analysis unit including a plurality of spot-like regions formed in the same pattern as that of the plurality of stimulable phosphor layer regions of the stimulable phosphor sheet and selectively containing a radioactive labeling substance, exposing the plurality of stimulable phosphor layer regions to the radioactive labeling substance selectively contained in the plurality of spot-like regions, scanning the plurality of stimulable phosphor layer regions with a stimulating ray to excite stimulable phosphor contained in the plurality of stimulable phosphor layer regions, photo-electrically detecting stimulated emission released from the plurality of stimulable phosphor layer regions to produce biochemical analysis data, and correcting the thus produced biochemical analysis data using the correction data for the individual stimulable phosphor layer regions.

2. A biochemical analysis data producing method in accordance with claim 1 wherein the standard light source is constituted by a light source selected from a group consisting of an ultra-violet ray source, a flash lamp and a stroboscopic lamp.

3. A biochemical analysis data producing method in accordance with claim 1 wherein the standard radiation source is constituted by a radiation source selected from a group consisting of an X-ray source, a soft X-ray source and a β-ray source.

4. A biochemical analysis data producing method in accordance with claim 1 wherein the support of the stimulable phosphor sheet is made of a material capable of attenuating radiation energy.

5. A biochemical analysis data producing method in accordance with claim 1 wherein the support of the stimulable phosphor sheet has a property of reducing the energy of radiation to $\frac{1}{5}$ or less when the radiation travels in the support by a distance equal to that between neighboring stimulable phosphor layer regions.

6. A biochemical analysis data producing method in accordance with claim 1 wherein the plurality of stimulable phosphor layer regions of the stimulable phosphor sheet are uniformly exposed to light emitted from a standard light source or radiation emitted from a standard radiation source.

7. A biochemical analysis data producing method in accordance with claim 1 wherein the standard light source or the standard radiation source is constituted as a planar light source or a planar radiation source.

8. A biochemical analysis data producing method in accordance with claim 1 wherein the standard light source or the standard radiation source is constituted as a linear light source or a linear radiation source and the plurality of stimulable phosphor layer regions of the stimulable phosphor sheet are linearly scanned with a line beam emitted from the standard light source or the standard radiation source, thereby exposing the plurality of stimulable phosphor layer regions.

9. A biochemical analysis data producing method in accordance with claim 1 wherein the plurality of stimulable phosphor layer regions of the stimulable phosphor sheet are two-dimensionally scanned with light emitted from the standard light source or radiation emitted from the standard radiation source, thereby exposing the plurality of stimulable phosphor layer regions.

10. A biochemical analysis data producing method in accordance with claim 1 wherein the correction data for the individual stimulable phosphor layer regions are stored in a biochemical analysis data producing apparatus and biochemical analysis data are corrected by the biochemical analysis data producing apparatus.

11. A biochemical analysis data producing method in accordance with claim 1 wherein the correction data for the individual stimulable phosphor layer regions are stored in a recording medium and the correction data for the individual stimulable phosphor layer regions are read from the recording medium by the biochemical analysis data producing apparatus, whereby biochemical analysis data are corrected.

12. A biochemical analysis data producing method in accordance with claim 1 wherein the plurality of stimulable phosphor layer regions of the stimulable phosphor sheet are formed by charging stimulable phosphor in holes formed in the support.

13. A biochemical analysis data producing method in accordance with claim 1 wherein the plurality of stimulable phosphor layer regions of the stimulable phosphor sheet are formed by pressing a stimulable phosphor membrane containing stimulable phosphor in through-holes formed in the support.

14. A biochemical analysis data producing method in accordance with claim 1 wherein the support of the stimulable phosphor sheet is formed with 10 or more stimulable phosphor layer regions.

15. A biochemical analysis data producing method in accordance with claim 1 wherein each of the plurality of stimulable phosphor layer regions is formed in the support of the stimulable phosphor sheet to have a size of less than 5 mm$^2$.

16. A biochemical analysis data producing method in accordance with claim 1 wherein the plurality of stimulable phosphor layer regions are formed in the stimulable phosphor sheet at a density of 10 or more per cm$^2$.

17. A biochemical analysis data producing method in accordance with claim 1 wherein the biochemical analysis unit includes a substrate made of material capable of attenuating radiation energy and a plurality of absorptive regions formed spaced apart from each other in the substrate and constituting the plurality of spot-like regions and the plurality of absorptive regions are formed in the substrate in the same pattern as that of the plurality of stimulable phosphor layer regions of the stimulable phosphor sheet.

18. A biochemical analysis data producing method in accordance with claim 1 wherein the plurality of absorptive regions of the biochemical analysis unit are formed by charging absorptive material in a plurality holes formed in the substrate.

19. A biochemical analysis data producing method in accordance with claim 1 wherein the plurality of absorptive regions of the biochemical analysis unit are formed by pressing an absorptive membrane containing absorptive material in a plurality through-holes formed in the substrate.

20. A biochemical analysis data producing method in accordance with claim 18 wherein the plurality of absorptive regions of the biochemical analysis unit are formed of a porous material.

21. A biochemical analysis data producing method in accordance with claim 19 wherein the plurality of absorptive regions of the biochemical analysis unit are formed of a porous material.

22. A biochemical analysis data producing method in accordance with claim 18 wherein the plurality of absorptive regions of the biochemical analysis unit are formed of bundles of a fiber material.

23. A biochemical analysis data producing method in accordance with claim 19 wherein the plurality of absorptive regions of the biochemical analysis unit are formed of bundles of a fiber material.

24. A biochemical analysis data producing method in accordance with claim 1 wherein the substrate of the biochemical analysis unit is made of a material having a property of reducing the energy of radiation to $\frac{1}{5}$ or less when the radiation travels in the substrate by a distance equal to that between neighboring absorptive regions.

25. A biochemical analysis data producing method in accordance with claim 24 wherein the substrate of the biochemical analysis unit is made of a material selected from a group consisting of a metal material, a ceramic material and a plastic material.

26. A biochemical analysis data producing method in accordance with claim 1 wherein the plurality of spot-like regions are selectively labeled with a radioactive labeling substance by spotting specific binding substances whose sequence, base length, composition and the like are known therein and specifically binding a substance derived from an living organism labeled with the radioactive labeling substance with the specific binding substances.

* * * * *